(12) United States Patent
Honeycutt

(10) Patent No.: US 11,722,811 B2
(45) Date of Patent: *Aug. 8, 2023

(54) MAGNETIC EARPHONES HOLDER

(71) Applicant: Snik LLC, Berkeley, CA (US)

(72) Inventor: Rob Honeycutt, Berkeley, CA (US)

(73) Assignee: Snik LLC, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/588,012

(22) Filed: Jan. 28, 2022

(65) Prior Publication Data

US 2022/0150615 A1 May 12, 2022

Related U.S. Application Data

(63) Continuation of application No. 17/200,424, filed on Mar. 12, 2021, now Pat. No. 11,272,281, which is a continuation of application No. 15/961,667, filed on Apr. 24, 2018, now Pat. No. 10,951,968, which is a continuation-in-part of application No. 15/601,083, filed on May 22, 2017, now Pat. No. 10,225,640, which is a continuation-in-part of application No. 15/596,979, filed on May 16, 2017, now Pat. No. 10,631,074, which is a continuation-in-part of application No. 15/456,981, filed on Mar. 13, 2017, now Pat. No. 10,942,097.

(Continued)

(51) Int. Cl.
*H04R 1/10* (2006.01)
*H04W 76/10* (2018.01)

(52) U.S. Cl.
CPC ......... *H04R 1/1041* (2013.01); *H04R 1/1016* (2013.01); *H04R 1/1025* (2013.01); *H04R 1/1058* (2013.01); *H04W 76/10* (2018.02); *H04R 2420/07* (2013.01)

(58) Field of Classification Search
None
See application file for complete search history.

(56) References Cited

U.S. PATENT DOCUMENTS

| 630,544 A | 8/1899 | Kissman |
| 3,392,729 A | 7/1968 | Lenoir |

(Continued)

FOREIGN PATENT DOCUMENTS

| CN | 2439147 Y | 7/2001 |
| CN | 1338231 A | 3/2002 |

(Continued)

OTHER PUBLICATIONS

Jabra PRO 920 Duo User Manual, www.jabra.com, GN Netcom A/S, 2015.

(Continued)

*Primary Examiner* — Paul W Huber
(74) *Attorney, Agent, or Firm* — Haverstock & Owens, A Law Corporation

(57) ABSTRACT

One or more earbuds comprise one or more external connectors for removably coupling the earbuds with an additional article. The one or more earbuds are additionally able to comprise magnets for removably coupling with each other. In some embodiment, the one or more earbuds are configured to removably couple with a base unit. Based on a coupling and decoupling of the one or more earbuds with the base unit, a signal is sent to control a remotely located electronic device.

30 Claims, 56 Drawing Sheets

Related U.S. Application Data

(60) Provisional application No. 62/324,806, filed on Apr. 19, 2016, provisional application No. 62/332,981, filed on May 6, 2016.

(56) References Cited

U.S. PATENT DOCUMENTS

| | | | |
|---|---|---|---|
| 3,604,069 A | 9/1971 | Jensen | |
| 3,753,201 A | 8/1973 | Ohman | |
| 3,849,843 A | 11/1974 | Alberts | |
| 4,346,501 A | 8/1982 | Saiya | |
| 4,562,621 A | 1/1986 | Takeshima et al. | |
| 4,901,355 A | 2/1990 | Moore | |
| 5,090,096 A | 2/1992 | Tereda | |
| 5,499,927 A | 3/1996 | Ohno et al. | |
| 5,511,289 A | 4/1996 | Melia | |
| 5,511,292 A | 4/1996 | Covi et al. | |
| 5,671,508 A | 9/1997 | Murai | |
| 5,713,110 A | 2/1998 | Covi et al. | |
| D395,815 S | 7/1998 | Walters et al. | |
| 5,831,513 A | 11/1998 | Lue | |
| 5,892,564 A | 4/1999 | Rahn | |
| 6,301,050 B1 | 10/2001 | DeLeon | |
| 6,431,500 B1 | 8/2002 | Jacobs et al. | |
| 6,438,248 B1 | 8/2002 | Kamimura et al. | |
| 6,526,635 B2 | 3/2003 | Nasu et al. | |
| D479,978 S | 9/2003 | Watabe et al. | |
| D480,942 S | 10/2003 | Ishida et al. | |
| 6,801,140 B2 | 10/2004 | Mantyjarvi et al. | |
| 7,013,492 B2 | 3/2006 | Hugh et al. | |
| 7,103,188 B1 | 9/2006 | Jones | |
| 7,311,526 B2 | 12/2007 | Rohrbach et al. | |
| 7,317,809 B2 | 1/2008 | Almqvist | |
| 7,416,099 B2 | 8/2008 | deLeon et al. | |
| 7,418,103 B2 | 8/2008 | Sargaison | |
| 7,436,974 B2 | 10/2008 | Harper | |
| 7,464,893 B2 | 12/2008 | Spjut | |
| 7,479,949 B2 | 1/2009 | Jobs et al. | |
| 7,503,101 B2 | 3/2009 | Sieger | |
| 7,519,192 B1 | 4/2009 | Laycock et al. | |
| 7,559,123 B1 | 7/2009 | Yang | |
| 7,594,724 B2 | 9/2009 | Purcell | |
| 7,673,348 B2 | 3/2010 | Williams | |
| 7,693,295 B2 | 4/2010 | Harper | |
| 7,706,821 B2 | 4/2010 | Konchitsky | |
| 7,817,808 B2 | 10/2010 | Konchitsky et al. | |
| 7,825,626 B2 | 11/2010 | Kozisek | |
| 7,903,826 B2 | 3/2011 | Boersma | |
| 7,915,512 B2 | 3/2011 | Fratti | |
| D636,756 S | 4/2011 | Fahrendorff | |
| 7,986,791 B2 | 7/2011 | Bostick | |
| 8,086,281 B2 | 12/2011 | Rabu et al. | |
| 8,086,288 B2 | 12/2011 | Klein | |
| 8,139,809 B2 | 3/2012 | Jubelirer et al. | |
| 8,155,340 B2 | 4/2012 | Garudadr et al. | |
| 8,185,084 B2 | 5/2012 | Terlizzi | |
| 8,189,843 B2 | 5/2012 | Harper | |
| 8,199,947 B2 | 6/2012 | Rass | |
| 8,218,782 B2 | 7/2012 | Asada et al. | |
| 8,225,465 B2 | 7/2012 | Honeycutt | |
| 8,285,208 B2 | 10/2012 | Terlizzi | |
| 8,290,545 B2 | 10/2012 | Terlizzi | |
| 8,331,579 B2 | 12/2012 | Kato | |
| 8,391,524 B2 | 3/2013 | Gozen | |
| 8,401,219 B2 | 3/2013 | Hankey et al. | |
| 8,411,041 B2 | 4/2013 | Lee et al. | |
| 8,498,679 B2 | 7/2013 | Yu | |
| 8,539,649 B2 | 9/2013 | Honeycutt | |
| 8,621,724 B2 | 1/2014 | Honeycutt | |
| 8,655,003 B2 | 2/2014 | Duisters et al. | |
| 8,655,005 B2 | 2/2014 | Birger | |
| 8,695,170 B2 | 4/2014 | Honeycutt | |
| 8,891,798 B1 | 11/2014 | Laffon de Mazieres | |
| 8,898,170 B2 | 11/2014 | Haughay, Jr. | |
| 9,167,329 B2 | 10/2015 | Honeycutt | |
| 9,257,850 B2 | 2/2016 | Sato | |
| 9,536,560 B2 | 1/2017 | Jehan | |
| 9,568,994 B2 | 2/2017 | Jehan | |
| 9,579,060 B1 | 2/2017 | Lisy | |
| 9,591,395 B2 | 3/2017 | Burgett et al. | |
| 9,609,420 B2 | 3/2017 | Azmi | |
| 9,750,462 B2 | 9/2017 | LeBoeuf | |
| 9,769,556 B2 | 9/2017 | Honeycutt | |
| 9,915,378 B2 | 3/2018 | Honeycutt | |
| 10,104,486 B2 | 10/2018 | Dohmen | |
| 10,225,640 B2 | 3/2019 | Honeycutt | |
| 10,225,819 B2 | 3/2019 | Jang | |
| 2001/0046304 A1 | 11/2001 | Rast | |
| 2003/0019015 A1 | 1/2003 | Hugh et al. | |
| 2003/0074712 A1 | 4/2003 | Liao | |
| 2003/0224839 A1 | 12/2003 | Takahashi | |
| 2004/0096079 A1 | 5/2004 | Chang et al. | |
| 2004/0107887 A1 | 6/2004 | Kinkead | |
| 2004/0204165 A1 | 10/2004 | Huang | |
| 2004/0204208 A1 | 10/2004 | Thompson | |
| 2005/0069147 A1 | 3/2005 | Bjerre | |
| 2005/0130593 A1 | 6/2005 | Michalak | |
| 2005/0248717 A1 | 11/2005 | Howell et al. | |
| 2006/0008106 A1 | 1/2006 | Harper | |
| 2006/0029234 A1 | 2/2006 | Sargaison | |
| 2006/0045304 A1 | 3/2006 | Lee | |
| 2006/0059666 A1 | 3/2006 | Senink | |
| 2006/0107822 A1 | 5/2006 | Bowen | |
| 2006/0153394 A1 | 7/2006 | Beasley | |
| 2007/0074712 A1 | 4/2007 | Fielding, Jr. | |
| 2007/0080186 A1 | 4/2007 | De Leon et al. | |
| 2007/0086617 A1 | 4/2007 | Loh | |
| 2007/0093279 A1 | 4/2007 | Janik | |
| 2007/0116316 A1 | 5/2007 | Goldberg | |
| 2007/0127747 A1 | 6/2007 | Doyle | |
| 2007/0160249 A1 | 7/2007 | LeGette et al. | |
| 2007/0234523 A1 | 10/2007 | Laks | |
| 2007/0253584 A1 | 11/2007 | Rass | |
| 2007/0254271 A1 | 11/2007 | Burlik | |
| 2007/0291974 A1 | 12/2007 | Eisenbraun | |
| 2008/0001014 A1 | 1/2008 | Spjut | |
| 2008/0029288 A1 | 2/2008 | Chen et al. | |
| 2008/0058037 A1 | 3/2008 | Dunn | |
| 2008/0089539 A1 | 4/2008 | Ishil | |
| 2008/0096726 A1 | 4/2008 | Riley | |
| 2008/0107287 A1 | 5/2008 | Beard | |
| 2008/0123258 A1 | 5/2008 | Singh | |
| 2008/0130910 A1 | 6/2008 | Jobling et al. | |
| 2008/0157991 A1 | 7/2008 | Raghunath | |
| 2008/0198141 A1 | 8/2008 | Lee et al. | |
| 2008/0240486 A1 | 10/2008 | Garcia et al. | |
| 2008/0289151 A1 | 11/2008 | Chan | |
| 2008/0298606 A1 | 12/2008 | Johnson et al. | |
| 2008/0317274 A1 | 12/2008 | Kim | |
| 2009/0024748 A1 | 1/2009 | Goldspink et al. | |
| 2009/0034748 A1 | 2/2009 | Sibbald | |
| 2009/0097689 A1 | 4/2009 | Prest | |
| 2009/0154739 A1 | 6/2009 | Zellner | |
| 2009/0175456 A1 | 7/2009 | Johnson | |
| 2009/0177097 A1 | 7/2009 | Ma | |
| 2009/0178253 A1 | 7/2009 | Yang | |
| 2009/0196436 A1 | 8/2009 | Westenbroek | |
| 2009/0226013 A1 | 9/2009 | Burge | |
| 2009/0245549 A1 | 10/2009 | Jubelirer et al. | |
| 2009/0036119 A1 | 12/2009 | Smith et al. | |
| 2009/0320247 A1 | 12/2009 | Honeycutt | |
| 2010/0020892 A1 | 1/2010 | Brown | |
| 2010/0020982 A1 | 1/2010 | Brown et al. | |
| 2010/0020998 A1 | 1/2010 | Brown et al. | |
| 2010/0022281 A1 | 1/2010 | Cohen et al. | |
| 2010/0022283 A1 | 1/2010 | Terlizzi | |
| 2010/0115732 A1 | 5/2010 | Honeycutt | |
| 2010/0150370 A1 | 6/2010 | Bales et al. | |
| 2010/0159741 A1 | 6/2010 | Rothbaum | |
| 2010/0166207 A1 | 7/2010 | Masuyama | |
| 2010/0170066 A1 | 7/2010 | Honeycutt | |
| 2010/0172522 A1 | 7/2010 | Mooring | |
| 2010/0217099 A1 | 8/2010 | LeBoeuf et al. | |
| 2010/0217102 A1 | 8/2010 | LeBoeuf et al. | |

(56) References Cited

U.S. PATENT DOCUMENTS

| | | |
|---|---|---|
| 2010/0250669 A1 | 9/2010 | Pan |
| 2010/0275418 A1 | 11/2010 | Ingram |
| 2010/0276315 A1 | 11/2010 | Corry |
| 2011/0010894 A1 | 1/2011 | Honeycutt |
| 2011/0117840 A1 | 5/2011 | Li |
| 2011/0117972 A1 | 5/2011 | Smith |
| 2011/0162883 A1 | 7/2011 | Grosset et al. |
| 2011/0270601 A1 | 11/2011 | Karapetian |
| 2011/0286615 A1 | 11/2011 | Olodort et al. |
| 2011/0287806 A1 | 11/2011 | Vasudevan |
| 2012/0021540 A1 | 1/2012 | Takahashi |
| 2012/0101819 A1 | 4/2012 | Heiman |
| 2012/0114154 A1 | 5/2012 | Abrahamsson |
| 2012/0171964 A1 | 7/2012 | Tang et al. |
| 2012/0189136 A1 | 7/2012 | Brown |
| 2012/0197093 A1 | 8/2012 | LeBoeuf et al. |
| 2012/0201412 A1 | 8/2012 | Del Prete |
| 2012/0203077 A1 | 8/2012 | He et al. |
| 2012/0238215 A1 | 9/2012 | Kari et al. |
| 2012/0255146 A1 | 10/2012 | Honeycutt |
| 2013/0028461 A1 | 1/2013 | Harper |
| 2013/0120919 A1 | 5/2013 | Erickson |
| 2013/0129110 A1 | 5/2013 | Harper |
| 2013/0214998 A1 | 8/2013 | Andes |
| 2013/0216085 A1 | 8/2013 | Honeycutt |
| 2013/0238829 A1 | 9/2013 | Laycock |
| 2013/0248661 A1 | 9/2013 | Honeycutt |
| 2013/0343585 A1 | 12/2013 | Bennett |
| 2013/0344924 A1 | 12/2013 | Sorensen |
| 2014/0043213 A1 | 2/2014 | Park et al. |
| 2014/0082892 A1 | 3/2014 | Honeycutt |
| 2014/0098206 A1 | 4/2014 | Rosella |
| 2014/0116085 A1 | 5/2014 | Lam |
| 2014/0165338 A1 | 6/2014 | Honeycutt |
| 2014/0198929 A1 | 7/2014 | Honeycutt |
| 2014/0243617 A1 | 8/2014 | LeBoeuf |
| 2014/0314247 A1 | 10/2014 | Zhang |
| 2015/0011898 A1 | 1/2015 | Romesburg |
| 2015/0063587 A1 | 3/2015 | Park |
| 2015/0083619 A1 | 3/2015 | Kenard |
| 2015/0195639 A1 | 7/2015 | Azmi |
| 2015/0230019 A1 | 8/2015 | Sakai |
| 2015/0256010 A1 | 9/2015 | Scandurra |
| 2015/0257662 A1 | 9/2015 | Lee et al. |
| 2016/0007111 A1 | 1/2016 | Honeycutt |
| 2016/0044401 A1 | 2/2016 | Lee |
| 2016/0057530 A1 | 2/2016 | Anderson |
| 2016/0098138 A1 | 4/2016 | Park |
| 2016/0196758 A1 | 7/2016 | Causevic et al. |
| 2016/0277824 A1 | 9/2016 | Ushakov |
| 2016/0292270 A1 | 10/2016 | Negi |
| 2017/0048613 A1 | 2/2017 | Smus |
| 2017/0093079 A1 | 3/2017 | Wagman |
| 2017/0094391 A1 | 3/2017 | Panecki et al. |
| 2017/0124276 A1 | 5/2017 | Tee |
| 2017/0150488 A1 | 5/2017 | Young |
| 2017/0180534 A1 | 6/2017 | Kamstrup |
| 2017/0280223 A1 | 9/2017 | Cavarra |
| 2017/0303026 A1 | 10/2017 | Honeycutt |
| 2017/0318375 A1 | 11/2017 | Honeycutt |
| 2017/0318376 A1 | 11/2017 | Honeycutt |
| 2017/0353782 A1 | 12/2017 | Honeycutt |
| 2018/0156361 A1 | 6/2018 | Honeycutt |
| 2018/0242064 A1 | 8/2018 | Honeycutt |

FOREIGN PATENT DOCUMENTS

| | | |
|---|---|---|
| CN | 1890855 A | 1/2007 |
| CN | 2888595 Y | 4/2007 |
| CN | 200943618 Y | 9/2007 |
| CN | 200965597 Y | 10/2007 |
| CN | 201011738 Y | 1/2008 |
| CN | 201054770 Y | 4/2008 |
| CN | 201123112 Y | 9/2008 |
| CN | 101374366 Y | 2/2009 |
| CN | 101848406 A | 9/2010 |
| CN | 101938564 A | 1/2011 |
| DE | 102007015828 A1 | 10/2008 |
| EP | 1179307 A2 | 2/2002 |
| EP | 3451693 A1 | 6/2019 |
| GB | 2460200 A | 11/2009 |
| GB | 2461477 A | 6/2010 |
| JP | H01140842 A | 6/1989 |
| JP | 2002330803 | 11/2002 |
| JP | 2003198719 A | 7/2003 |
| JP | 2003524354 A | 8/2003 |
| JP | 2004214996 A | 7/2004 |
| JP | 2005-318267 A | 11/2005 |
| JP | 2006336803 | 12/2006 |
| JP | 1305823 | 7/2007 |
| JP | 200855050 | 3/2008 |
| JP | 3141560 | 4/2008 |
| JP | 2009212918 A | 9/2009 |
| JP | 2010157897 A | 7/2010 |
| JP | 2011526456 A | 10/2011 |
| KR | 200228427 D1 | 6/2001 |
| KR | 200252682 D1 | 11/2001 |
| KR | 10-2007-0093529 A | 9/2007 |
| KR | 10-0796806 | 1/2008 |
| KR | 10-0813067 | 3/2008 |
| KR | 10-2008-0038807 A | 5/2008 |
| KR | 10-2009-0008972 A | 1/2009 |
| KR | 10-2009-0016976 A | 2/2009 |
| TW | M277220 A | 10/2005 |
| WO | 2002080714 A1 | 10/2002 |
| WO | 2003103255 A1 | 12/2003 |
| WO | 2004107887 A1 | 12/2004 |
| WO | 2009158075 A1 | 12/2009 |
| WO | WO2010083828 A1 | 7/2010 |
| WO | 2010142290 A | 12/2010 |
| WO | 2011001433 A2 | 1/2011 |
| WO | 2011/121169 A1 | 10/2011 |
| WO | 2016080890 A1 | 5/2016 |

OTHER PUBLICATIONS

Notice of Allowance dated Sep. 27, 2022 in U.S. Appl. No. 17/230,773.

Declaration of Rob Honeycutt, executed on Oct. 7, 2010 and 2 Pages.

Office Action from Japanese Patent Application No. 2014-558859.

English Translation of Office Action from Japanese Patent Application No. 2014-55859.

International Search Report and Written Opinion from PCT Application No. PCT/US2017/027139.

International Search Report with Written Opinions for PCT Patent App. No. PCT/US18/32808.

Japanese Decision of Rejection dated May 23, 2018 from Japanese Patent Application 2014-558859.

Office Action dated Jan. 28, 2019, from the Chinese Application No. 201711191174.

International Preliminary Report for the International Application PCT/US2018/032808 dated Nov. 28, 2019.

U.S. Appl. No. 62/235,205 (specification and drawings), filed Sep. 30, 2015.

Second Office Action dated Nov. 4, 2019 from the Chinese Application No. 201711191174.0.

Kyle Russell, Forget Tangled Wires: We're Really Excited for These Magnetic Earbuds, Business Insider, https://www.businessinsider.com/magnetic-earbuds-dont-get-tangled-2014-1, Jan. 14, 2014.

Robert Nelson, Jabra Rox Wireless Bluetooth earbuds unveiled, Android Community, https://androidcommunity.com/jabra-rox-wireless-bluetooth-earbuds-unveiled-20131112/, Nov. 12, 2013.

Lose the Jack With Jabra Rox Wireless, https://www.jabra.com/cp/us/pressreleasearchive/2013/press-release-12-11-2013, Dec. 11, 2013.

Jabra Rox Wireless User Manual, jabra.com/roxwireless, 2013.

Jabra Rox Wireless Technical Specifications, jabra.com/roxwireless.

Jabra Rox Wireless Datasheet, jabra.com.

(56) References Cited

OTHER PUBLICATIONS

ReSound Launches New Vea for Budget-conscious Consumers, The Hearing Review, https://www.hearingreview.com/hearing-products/hearing-aids/resound-launches-new-vea- . . . , Jul. 8, 2012.
ReSound User Guide Resound Custom and Remote Microphone Hearing Instruments, gnresound.com.
Kelvin Sze, Acronym GT-J14 Gore-Tex Jacket Magnetic Earbuds Holder, http://itechnews.net/2009/10/04/acronym-gt-i14-gore-tex-jacket-magnetic-earbuds-holder/, Oct. 4, 2009.
ReSound Vea User Guide Behind-The-Ear (BTE) Models: Standard Tube, Thin Tube.
Bluetooth Earbuds w/Magnetic Docking. Made in USA., elroy, Kickstarter campaign, Mar. 10, 2013.
Jacquelyn Tanner, Elroy Is Smarter Than Your Average Bluetooth Earbuds, Top Mobile Trends, Mar. 19, 2013.
A. Goldman, Handbook of Modern Ferromagnetic Materials, Springer US (1999) (second printing with corrections, 2002, Chapters 1 & 2, pp. i-xix and 1-40.
McGraw-Hill Dictionary of Scientific and Technical Terms (5th ed. 1994), p. 38.
Acronym GT-J14 Gore-Tex Jacket Magnetic (Year:2014).
Decision Instituting Inter Partes Review, dated Mar. 9, 2021, in IPR2020-01324, U.S. Pat. No. 9,167,329 B2.
Decision Instituting Inter Partes Review, dated Mar. 9, 2021, in IPR2020-01325, U.S. Pat. No. 9,167,329 B2.
Decision Instituting Inter Partes Review, dated Mar. 9, 2021, in IPR2020-01427, U.S. Pat. No. 9,769,556 B2.
Decision Instituting Inter Partes Review, dated Mar. 9, 2021, in IPR2020-01428, U.S. Pat. No. 9,769,556 B2.
Decision Instituting Inter Partes Review, dated Mar. 9, 2021, in IPR2020-01429, U.S. Pat. No. 9,769,556 B2.
Notice of Allowance dated Oct. 3, 2022 in U.S. Appl. No. 17/230,694.

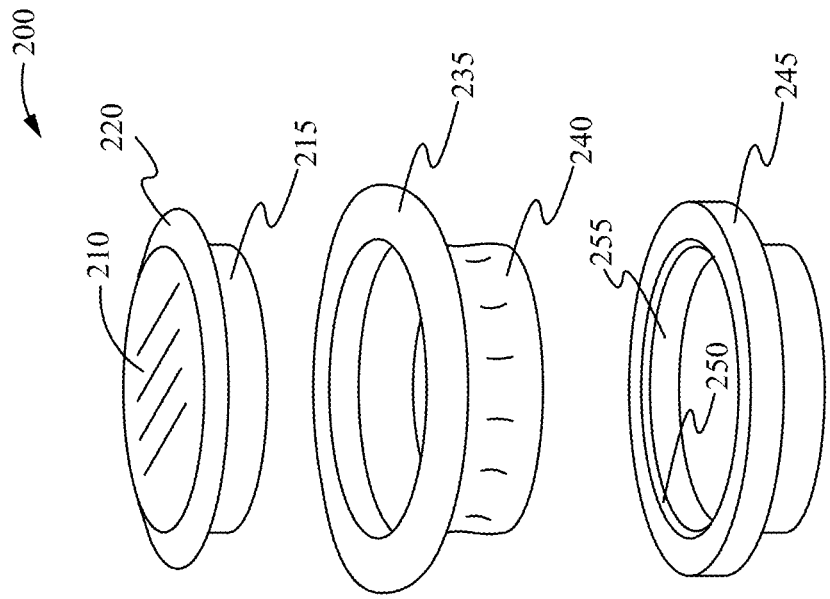
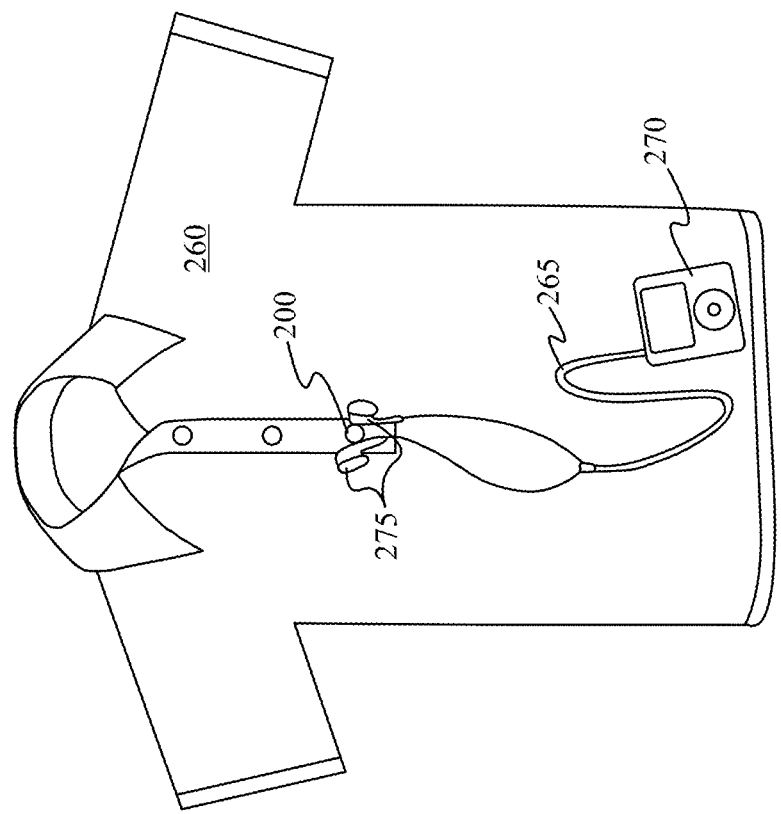

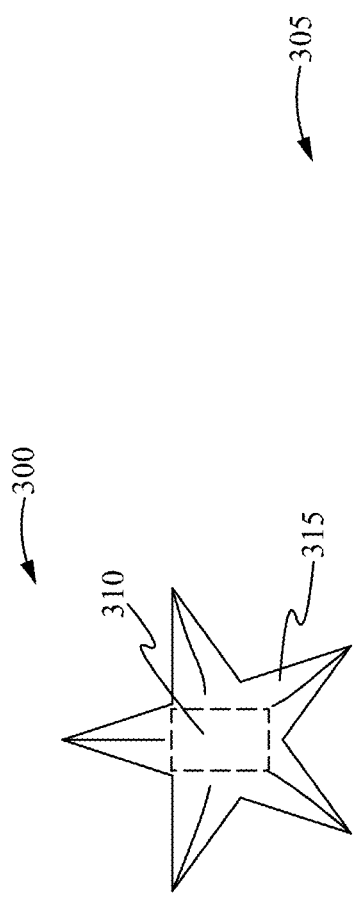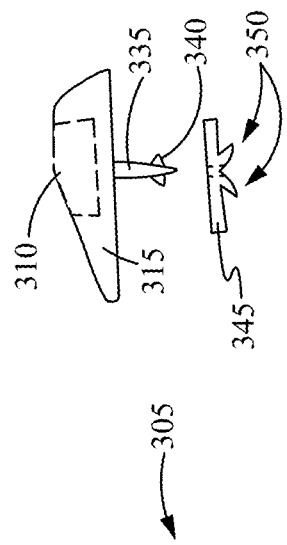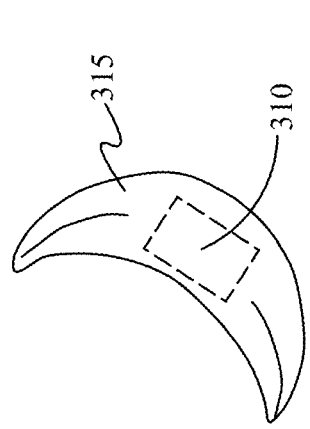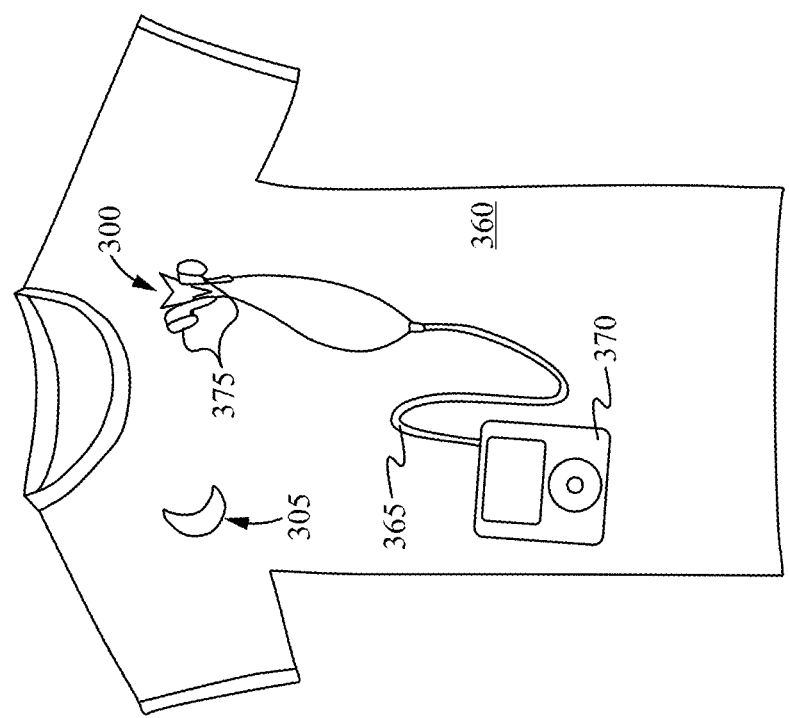
Fig. 3B
Fig. 3C
Fig. 3D
Fig. 3A

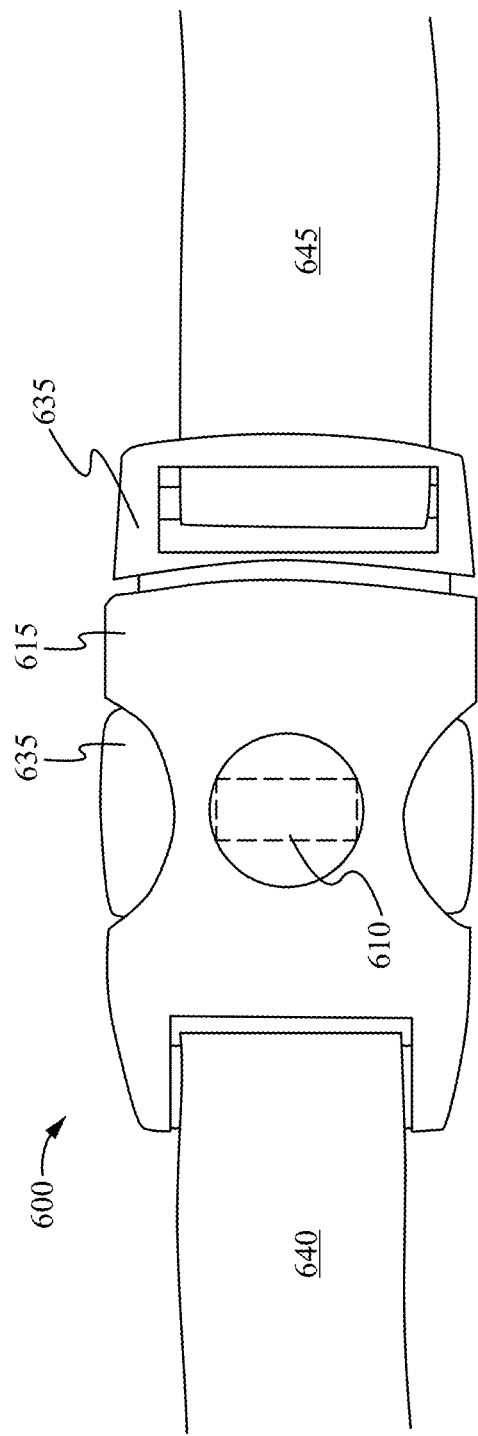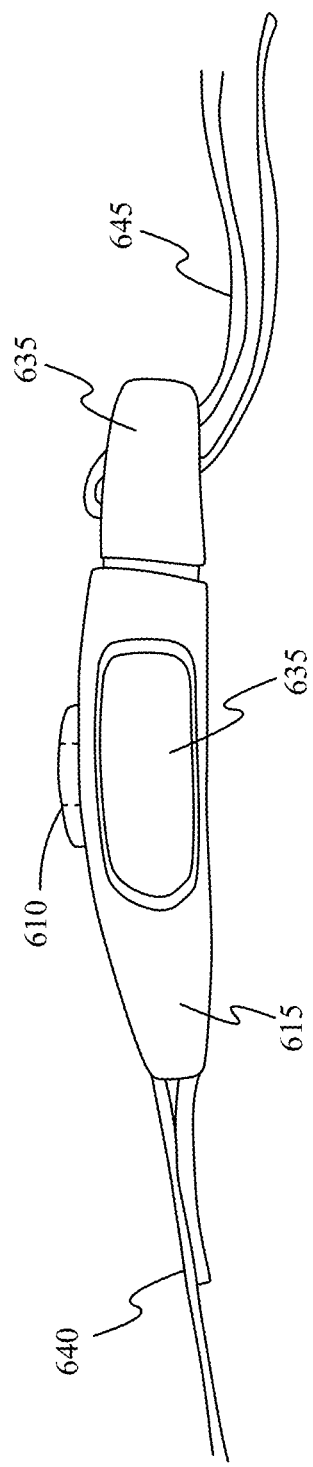
Fig. 6A
Fig. 6B

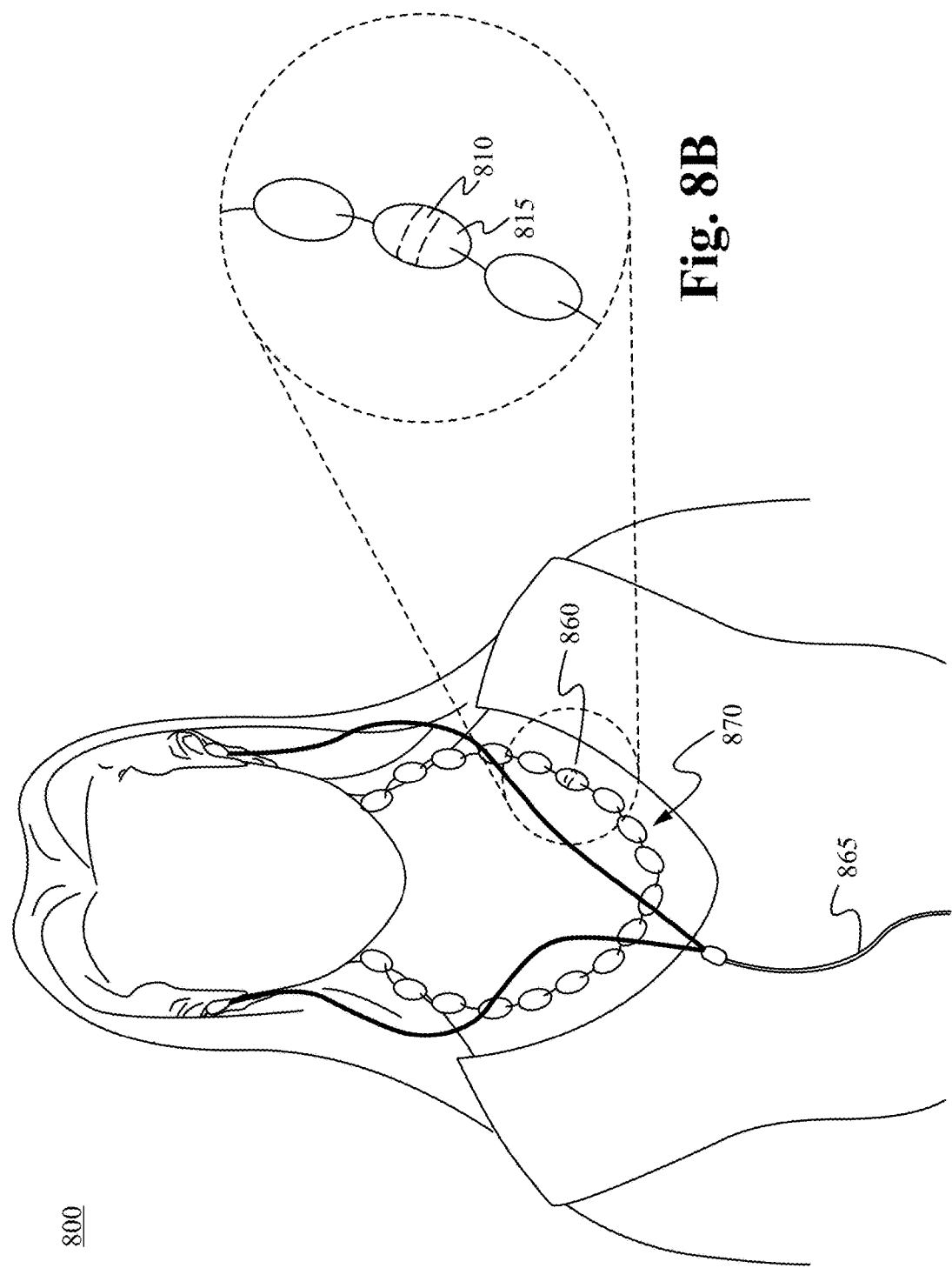

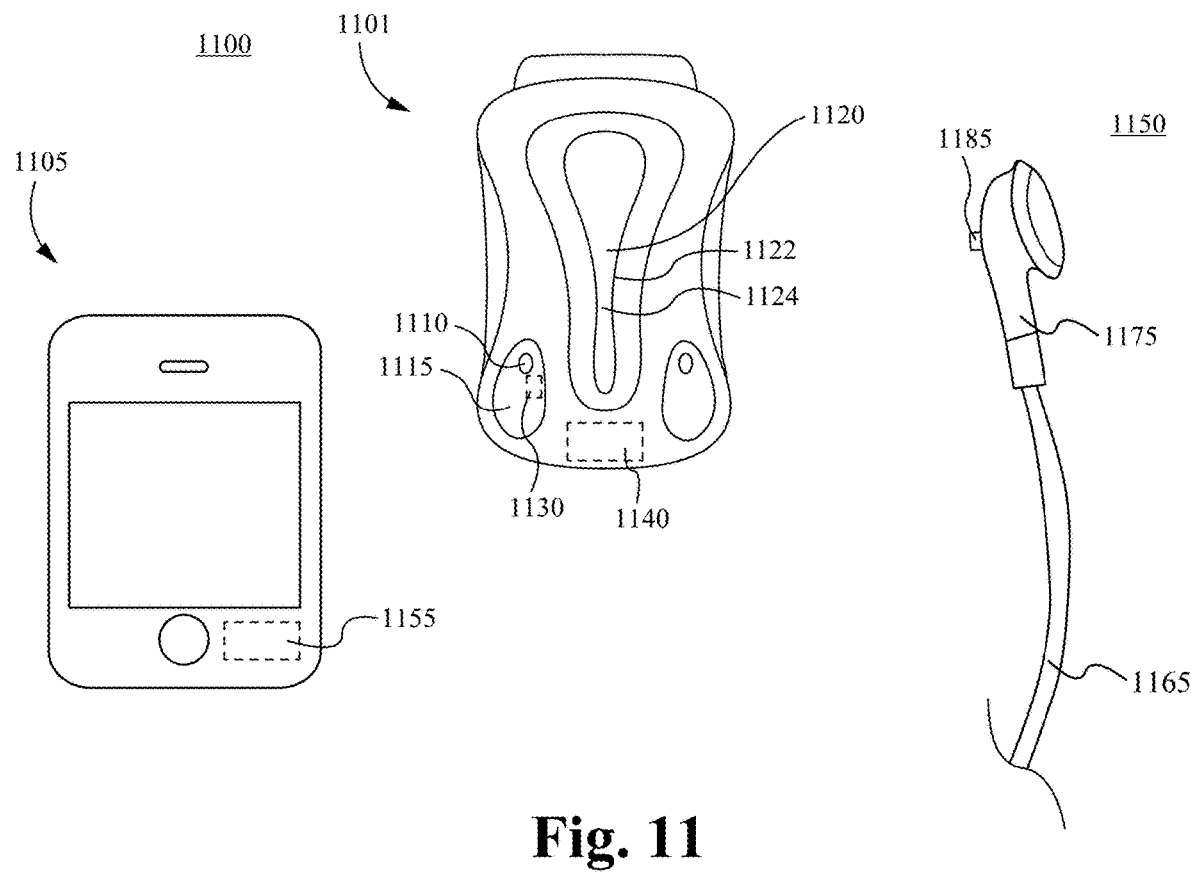
Fig. 11
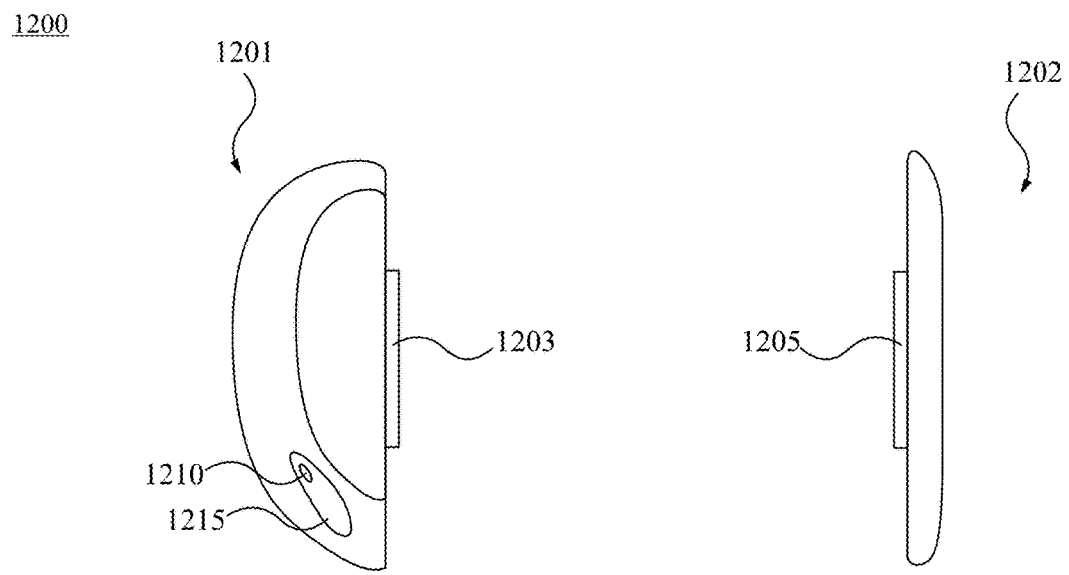
Fig. 12A      Fig. 12B

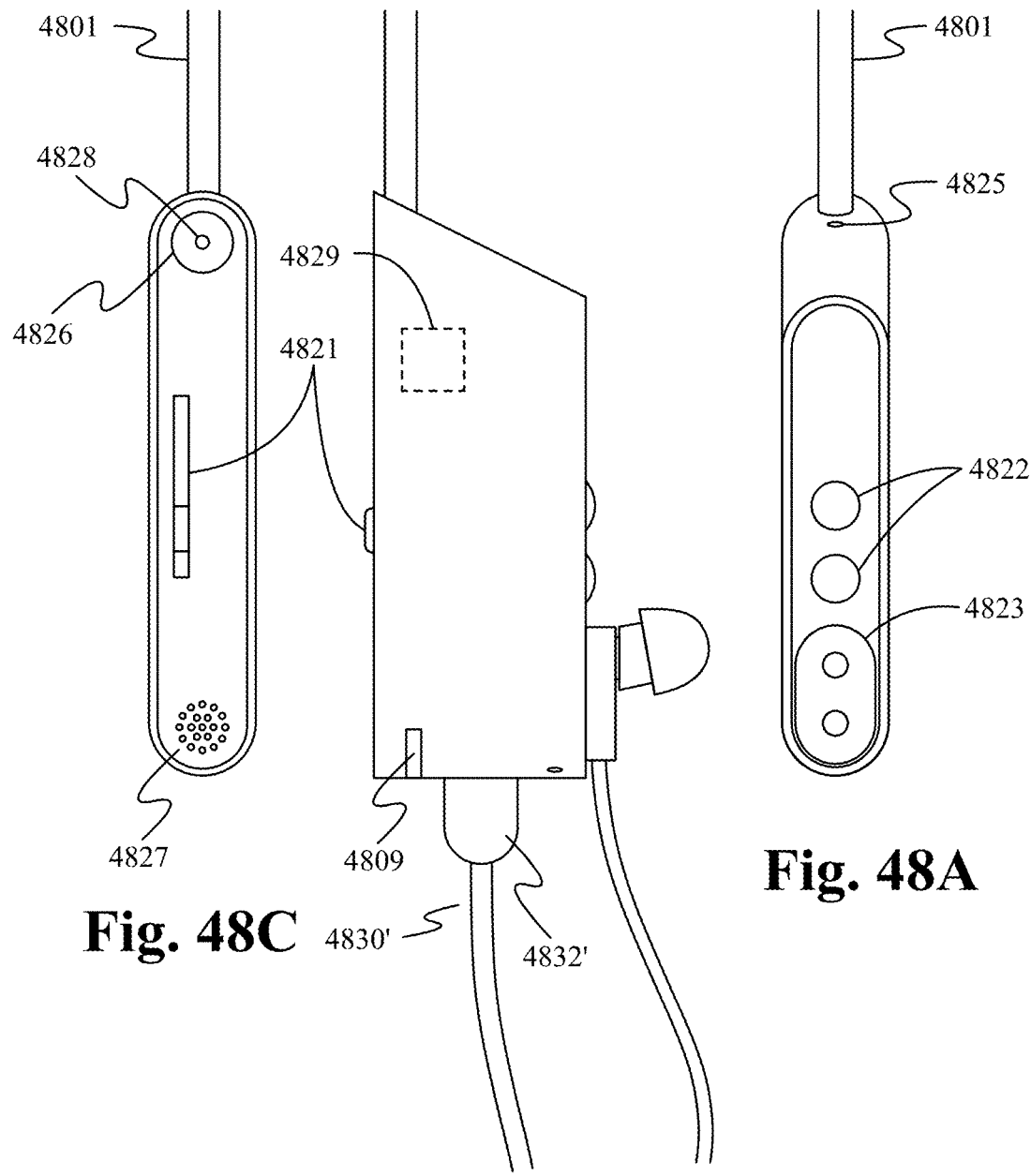

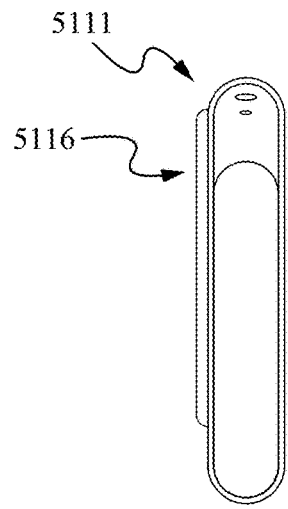
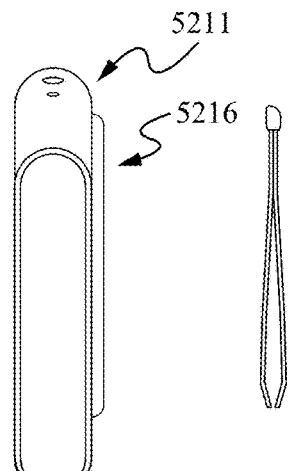
Fig. 51A    Fig. 52A
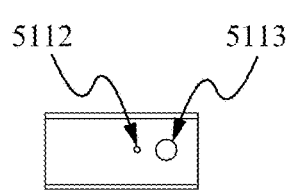
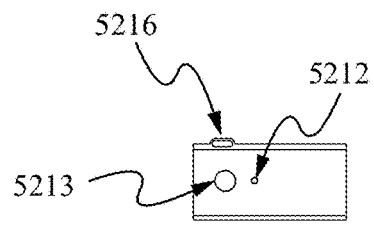
Fig. 51B    Fig. 52B
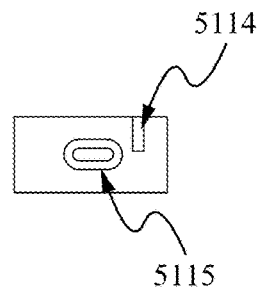
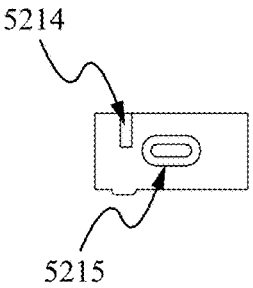
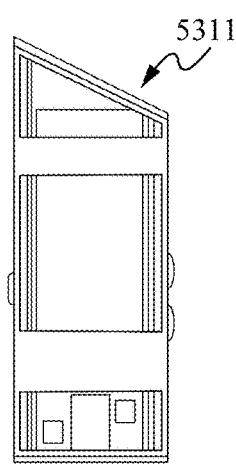
Fig. 51C    Fig. 52C    Fig. 53

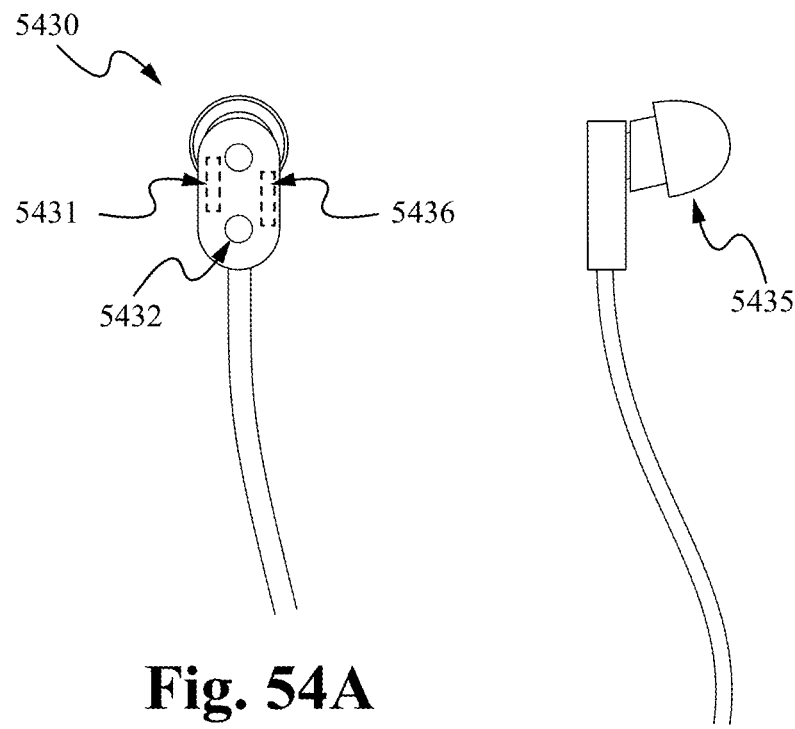
Fig. 54A
Fig. 54C
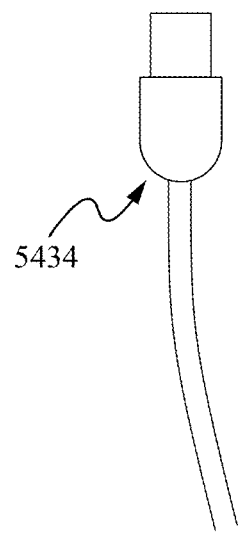
Fig. 54B

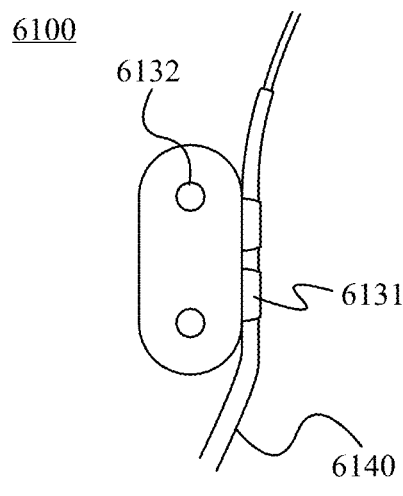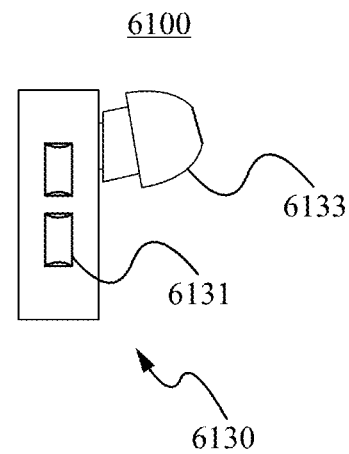
Fig. 61B          Fig. 61A
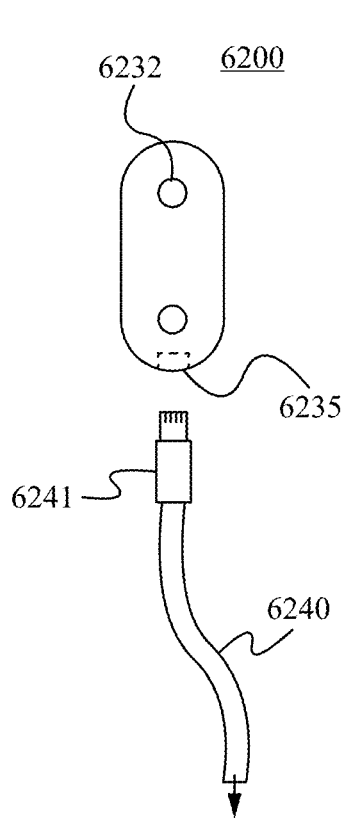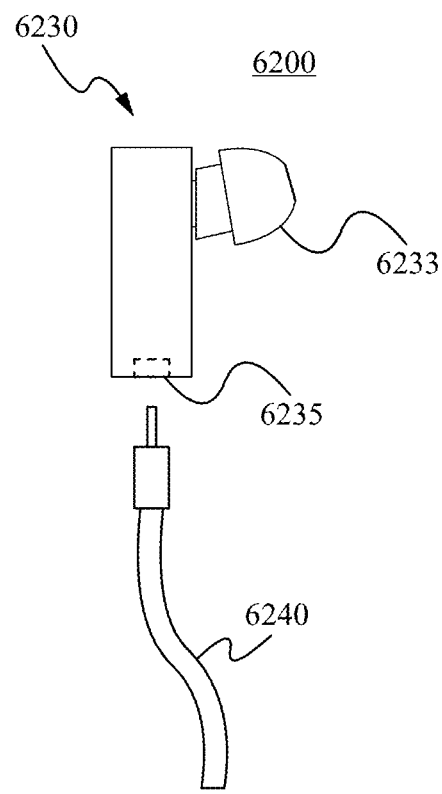
Fig. 62B          Fig. 62A

MAGNETIC EARPHONES HOLDER

RELATED APPLICATIONS

This Patent application is a continuation of the co-pending U.S. patent application Ser. No. 17/200,424 filed Mar. 12, 2021, and entitled "MAGNETIC EARPHONES HOLDER", which is hereby incorporated by reference in its entirety, which is a continuation of the U.S. patent application Ser. No. 15/961,667 filed Apr. 24, 2018, and entitled "MAGNETIC EARPHONES HOLDER", which is hereby incorporated by reference in its entirety, which is a continuation-in-part of the U.S. patent application Ser. No. 15/601,083 filed May 22, 2017, and entitled "MAGNETIC EARPHONES HOLDER", which is hereby incorporated by reference in its entirety, which is a continuation-in-part of the co-pending U.S. patent application Ser. No. 15/596,979 filed May 16, 2017, and entitled "MAGNETIC EARPHONES HOLDER", which is hereby incorporated by reference in its entirety, which is a continuation-in-part of the co-pending U.S. patent application Ser. No. 15/456,981 filed Mar. 13, 2017, and entitled "HEADSET CORD HOLDER", which is hereby incorporated by reference in its entirety, which claims priority under 35 U.S.C. 119(e) to the U.S. provisional patent application, Application No. 62/324,806, filed on Apr. 19, 2016, and entitled "MAGNETIC EARPHONES HOLDER," and the U.S. provisional patent application, Application No. 62/332,981, filed on May 6, 2016, and entitled "MAGNETIC EARPHONES HOLDER.

FIELD OF THE INVENTION

The present invention relates to earphone holders. More particularly, the present invention relates to a magnetic earphone holder used to hold a set of earphones.

BACKGROUND OF THE INVENTION

Headset cords transmit signals from a source device, such as a music player or cell phone, to earphones being worn by a user. Although these cords are typically flexible and can be maneuvered out of the way by the user, such manipulation by the user can be inconvenient, and often inefficient, as the cords regularly find their way back into an undesired location. Additionally, if not secured when not being used the earphones often hang loose in an undesired and inconvenient location where they may be snagged or become tangled. Further, earphones are often moved back and forth from the ears of a user where they are transmitting a signal from the source device to the stored position as the user completes tasks and moves around.

SUMMARY OF THE INVENTION

One or more earbuds comprise one or more external connectors for removably coupling the earbuds with an additional article. The one or more earbuds are additionally able to comprise magnets for removably coupling with each other. In some embodiments, the one or more earbuds are configured to removably couple with a base unit. Based on a coupling and decoupling of the one or more earbuds with the base unit, a signal is sent to control a remotely located electronic device.

In one aspect, a set of earphones comprises a first earbud comprising a first earbud body and a second earbud comprising a second earbud body, wherein the first earbud body and the second earbud body each comprise an external connector for removably coupling the first earbud and the second earbud with an additional article. In some embodiments, the external connector comprises a clip. Alternatively, in some embodiments, the external connector comprises one or more molded loops. In some embodiments, the additional article comprises an item of clothing. In some embodiments, the set of earphones is usable when the first earbud and the second earbud are coupled to the additional article. In some embodiments, the first earbud body and the second earbud body each comprise a magnet. In further embodiments, the set of earphones are configured to couple with an external power supply of the additional article. In some embodiments, the set of earphones comprise wireless earphones. In some embodiments, the first earbud and the second earbud are unconnected.

In another aspect, an earphones holding system comprises a set of earphones comprising one or more external connectors for removably coupling the earphones with an additional article and a power supply embedded within the additional article, wherein the set of earphones is configured to removably couple with the power supply. In some embodiments, the one or more external connectors comprise a clip. Alternatively, in some embodiments, the one or more external connectors comprise one or more molded loops. The earphones holding system of Claim 10, wherein the additional article comprises an item of clothing. In some embodiments, the set of earphones is usable when coupled to the additional article. In some embodiments, the set of earphones comprise one or more magnets. In some embodiments, the set of earphones comprise wireless earphones.

In a further aspect, a method of securing a set of earphones comprises attaching a first earbud to an additional article and attaching a second earbud to the additional article, wherein the first earbud and the second earbud are attached to the additional article using one or more external connectors of the first earbud and the second earbud. In some embodiments, the one or more external connectors comprise a clip. Alternatively, in some embodiments, the one or more external connectors comprise one or more molded loops. In some embodiments, the additional article comprises an item of clothing. In some embodiments, the set of earphones is usable when coupled to the additional article. In further embodiments, the set of earphones comprise one or more magnets. In some embodiments, the set of earphones comprise wireless earphones. In some embodiments, the method comprises coupling the set of earphones with an external power supply.

In still a further aspect, a system for securing one or more wireless earbuds comprises one or more wireless earbuds, each earbud comprising: an earbud magnet, an earbud engagement detector, and an electronic device controller and a base unit comprising a docking base magnet for removably coupling with the earbud magnet to secure the one or more wireless earbuds, wherein the earbud engagement detector is configured to detect a coupling of the earbud magnet with the docking base magnet and the electronic device controller is configured to operate an electronic device based on the coupling and the decoupling of the earbud magnet and the docking base magnet. In some embodiments, the base unit is configured to charge the one or more wireless earbuds when coupled with the docking base. In some embodiments, the base unit comprises a form fitting opening for receiving the one or more earbuds. In further embodiments, the base unit comprises a case for the one or more earbuds. In some embodiments, the one or more earbuds are configured to power on when decoupled from the base unit. In some embodiments, the one or more earbuds are configured to automatically connect to the electronic device when decoupled from the base unit. In further embodiments, the electronic device controller sends a signal to the electronic device to answer a telephone call when the one or more earbuds are decoupled from the base unit. In some embodiments, the electronic device controller sends a signal to the transfer audio from one or more speakers of the electronic device to the one or more earbuds are decoupled from the base unit.

In another aspect, a method of securing one or more wireless earbuds comprises decoupling one or more earbuds from a docking base, wherein the base unit comprises a magnet for removably coupling with an earbud magnet to secure the one or more wireless earbuds; and based on the decoupling of the one or more earbuds from the base unit, operating an electronic device. In some embodiments, the base unit is configured to charge the one or more wireless earbuds when coupled with the docking base. In some embodiments, the base unit comprises a form fitting opening for receiving the one or more earbuds. In further embodiments, the base unit comprises a case for the one or more earbuds. In some embodiments, the one or more earbuds are configured to power on when decoupled from the base unit. In some embodiments, the one or more earbuds are configured to automatically connect to the electronic device when decoupled from the base unit. In some embodiments, the electronic device controller sends a signal to the electronic device to answer a telephone call when the one or more earbuds are decoupled. In further embodiments, the electronic device controller sends a signal to stop receiving audio from the electronic device when the one or more earbuds are recoupled with the base unit.

BRIEF DESCRIPTION OF THE DRAWINGS

FIGS. 2A-B illustrate an embodiment of an earphones holder having a magnet built into the surface of a plastic shirt snap in accordance with the principles of the present invention.

FIGS. 3A-3D illustrate an embodiment of an earphones holder having a magnet built into a body of an adornment in accordance with some embodiments.

FIGS. 6A and 6B illustrate an embodiment of an earphones holder having a magnet built onto the front face of a side squeeze buckle used on bags and packs in accordance with the principles of the present invention.

FIGS. 8A and 8B illustrate an embodiment of an earphones holder having a magnet built into a piece of jewelry in accordance with some embodiments.

FIG. 11 illustrates a magnetic earphones and cord holding system in accordance with some embodiments.

FIGS. 12A and 12B illustrate a magnetic earphones and cord holding system in accordance with some embodiments.

FIG. 48A-48C illustrate an earphones holding device in accordance with some embodiments.

FIGS. 51A-51C illustrate a protective case for a base unit of an earphones holding system in accordance with some embodiments.

FIGS. 52A-52C illustrate a protective case for a base unit of an earphones holding system in accordance with some embodiments.

FIG. 53 illustrates a protective can and a base unit of an earphones holding system in accordance with some embodiments.

FIG. 54 illustrates a set of earphones of earphones holding system in accordance with some embodiments.

FIGS. 61A and 61B illustrate an earbud in accordance with some embodiments.

FIGS. 62A and 62B illustrate an earbud in accordance with some embodiments.

DETAILED DESCRIPTION OF THE INVENTION

The description below concerns several embodiments of the invention. The discussion references the illustrated preferred embodiment. However, the scope of the present invention is not limited to either the illustrated embodiment, nor is it limited to those discussed, to the contrary, the scope should be interpreted as broadly as possible based on the language of the Claims section of this document.

This disclosure provides several embodiments of the present invention. It is contemplated that any features from any embodiment can be combined with any features from any other embodiment. In this fashion, hybrid configurations of the illustrated embodiments are well within the scope of the present invention.

Figure 1:
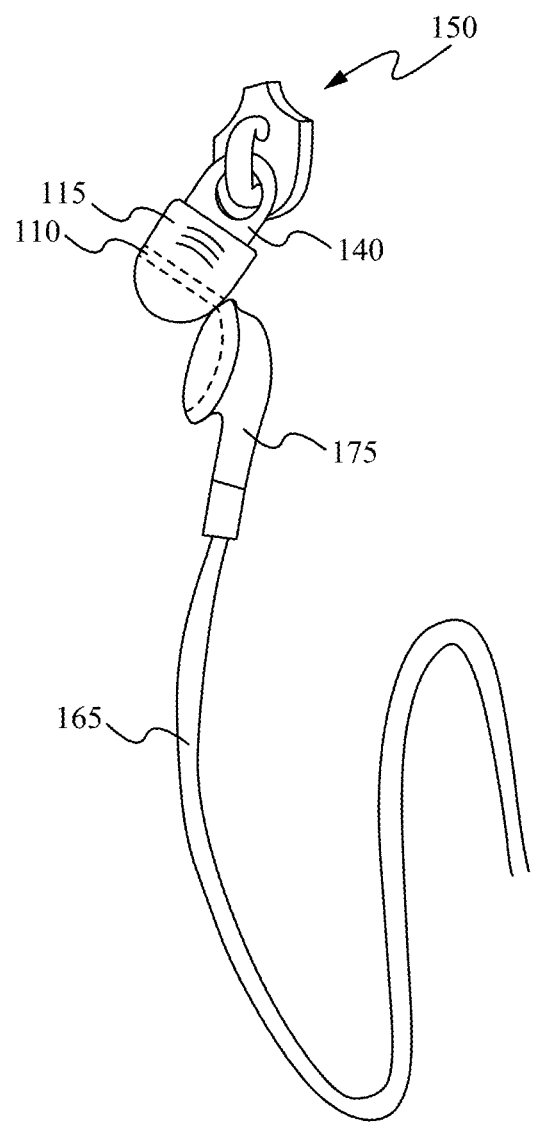
FIG. 1 illustrates an embodiment of an earphones holder having a magnet built into the body of a zipper puller in accordance with the principles of the present invention.

Referring now to FIG. 1, a first embodiment of an earphones holder 100 is depicted therein. The earphones holder 100 comprises a magnet 110 embedded or molded into a body 115 of a zipper puller 150. The zipper puller 150 is configured to be coupled to a bag or an item of clothing, such as a jacket or shirt. In some embodiments, the body 115 is configured to act as a closure mechanism capable of releasably coupling a first portion of the bag or item of clothing to a second portion of the bag or article of clothing. For example, in some embodiments, the body 115 comprises a channel (not shown) formed in opposing sidewalls in order to receive and releasably couple together zipper tracks of the bag or item of clothing. In some embodiments, a puller 140 is coupled to the body 115 in order to facilitate the translation of the body 115 along the portions of the bag or item of clothing to which it is attached.

The magnet 110 is molded or otherwise built into the body 115. In some embodiments, the magnet 110 is encased or embedded within a plastic over mold which surrounds the puller 140. In some embodiments, one or more additional magnets are coupled with the body 115. The magnet 110 is configured to receive and releasably secure a set of earphones 175. As shown in FIG. 1, in some embodiments, the magnet 110 removably couples with the magnetically attractable parts of an earbud of the earphones 175. In some embodiments, the earphones 175 and/or the cord 165 comprises a magnet or magnetically attractable surface, which removably couples with the magnet 110. The earphones holder 100 holds a set of earphones 175 connected to the user's Ipod or other electronic device.

FIGS. 2A-B illustrate an embodiment of an earphones holder 200 with a magnet molded into the surface of a plastic or metal snap fastener in accordance with further embodiments. It is contemplated that the snap fastener is capable of being used on a shirt 260, as shown in FIG. 2B, or on another item of clothing or a bag.

The shirt snap comprises a male snap 235 and a female snap 245 that are configured to releasably couple to one another. For example, in some embodiments, the male snap 235 comprises a stud 240 that is configured to fit securely into an aperture in the female snap 245. The perimeter of the aperture is defined by the inner circumference of the socket lip 250 and the base 255 of the female snap 245. In some embodiments, the socket lip 250 extends farther towards the aperture than the base 255, and the end of the stud 240 has a larger diameter than the base of the stud 240. In this configuration, the end of the stud 240, when inserted into the aperture, snaps into place, and is secured from accidental removal by the socket lip 250.

The shirt snap comprises a magnet 210. In some embodiments, the magnet 210 is embedded within the male snap 235 or the female snap 235. In other embodiments, the magnet 210 is a distinct component that is attached to the male snap 235 or the female snap 245. For example, FIG. 2A shows an exploded view of the headset holder 200 with the magnet 210 separated from the male snap 235. The magnet 210 comprises a body 215 that fits securely into an aperture in the male snap 235. In some embodiments, the magnet 210 (as a part of the snap fastener) is configured to act as a closure mechanism capable of releasably coupling a first portion of an item of clothing or a bag to a second portion of the article of clothing or bag.

The magnet 210 is molded or otherwise built into the body 215. The magnet 210 is configured to receive and releasably secure a set of earphones. In some embodiments, the magnet 210 removably couples with the magnetically attractable parts of the earphones 275 (FIG. 2B). In some embodiments, the earphones 275 and/or the cord 265 comprises a magnet or magnetically attractable surface, which removably couples with the magnet 210. FIG. 2B shows the headset holder 200 in use as a shirt snap fastener on a user's shirt 260. The earphones holder 200 holds a set of earphones 275 connected to the user's Ipod 270.

FIGS. 3A-D illustrate earphone holders 300 and 305 having a magnet 310 molded into an adornment in accordance with some embodiments. In some embodiments, the adornment is an ornamental accessory having an aesthetic characteristic unrelated to its functional structure, such as the star shape in FIGS. 3A-B and the moon shape in FIGS. 3C-D. The buttons and zippers shown in the previous figures would not constitute an adornment since they do not have an aesthetic characteristic that is unrelated to their functional structure. However, if they were modified to have a certain aesthetic shape that was completely unrelated to their functionality, then they could be considered an adornment.

The adornment comprises a body 315 that is configured to be releasably secured to a bag or an article of clothing, such as shirt 360. In some embodiments, the body 315 comprises a pin 335 extending from its base. The pin 335 is configured to penetrate the bag or item of clothing. In some embodiments, one or more flanges 340 are disposed proximate the end of the pin 335 to facilitate the attachment of the adornment to the bag or article of clothing. In some embodiments, a clasp 345 having releases 350 is provided along with the adornment in order to provide a secure attachment of the adornment to the bag or article of clothing.

The magnet 310 is molded or otherwise built into the body 315. The magnet 310 is configured to receive and releasably secure a set of earphones. In some embodiments, the magnet 310 removably couples with the magnetically attractable parts of the earphones 375 (FIG. 3B). In some embodiments, the earphones 375 and/or the cord 365 comprises a magnet or magnetically attractable surface, which removably couples with the magnet 310. FIG. 3A shows the headset holder 300 attached to a user's shirt 360. The earphones holder 300 holds a set of earphones 375 connected to the user's Ipod 370.

Although FIG. 3D illustrates the body using a pin for attachment, it is contemplated that the body can employ other means for releasably securing itself to a bag or an article of clothing. For example, in some embodiments the body utilizes a magnetic attachment in accordance with the principles of the present invention.

Figure 4:
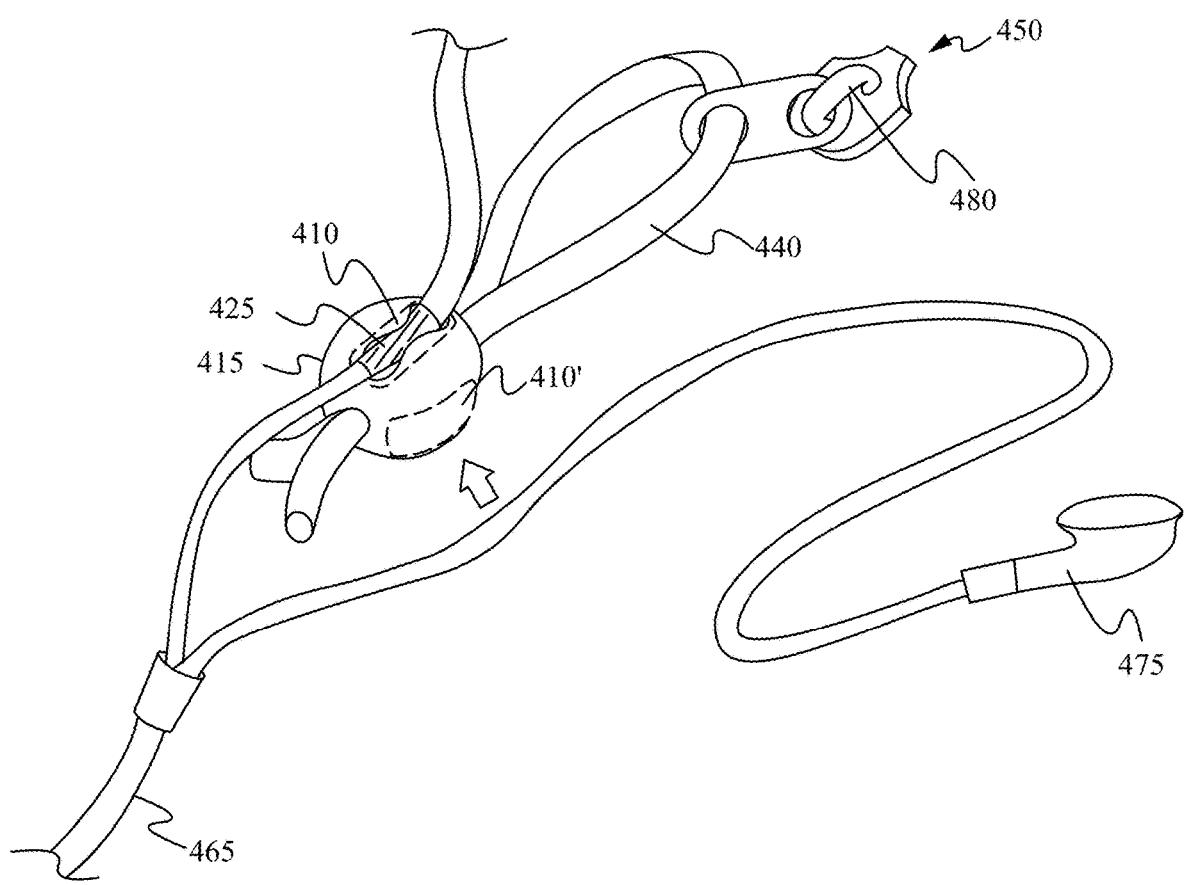
FIG. 4 illustrates an embodiment of an earphones holder having a magnet built into a zipper puller in accordance with some embodiments.

FIG. 4 illustrates an embodiment of an earphones holder 400 having a magnet molded into a body configured to be coupled to a zipper head in accordance with further embodiments.

As shown in FIG. 4, the body 415 is coupled to the zipper head 450. The earphones holder 400 comprises a puller 440 which is coupled to the body 415. As shown in FIG. 4, in some embodiments, the puller 440 is a cord which passes through the center of the body 415. In some embodiments the puller 440 is a cord which couples the body 415 with an opening 480. In some embodiments the body 415 comprises one or more of wood, glass, and metal.

The body 415 comprises a magnet 410. In some embodiments, the magnet 410 is embedded within the body 415. In other embodiments, the magnet 410 is a distinct component that is attached to the body 415. As shown within FIG. 4, the magnet 410 is molded or otherwise built into the body 415. The magnet 410 is configured to receive and releasably secure a set of earphones. In some embodiments, the magnet 410 removably couples with the magnetically attractable parts of the earphones 475. In some embodiments, as shown in FIG. 4, the earphones 475 also comprise a magnet or magnetically attractable surface 425, which removably couples with the magnet 410. In these embodiments, the magnet or magnetically attractable surface 425 is able to be a component of the earphones 475 or the headset cord 465. In some embodiments, the magnet or magnetically attractable surface 425 is slidable along the earphones 475 or the headset cord 465. However, as will be apparent to someone of ordinary skill in the art, the magnet or magnetically attractable surface 425 is able to be fixedly or removably connected to the earphones 475 or the headset cord 465. As also shown in FIG. 4, in some embodiments, the earphones holder 400 comprises one or more additional magnets 410'. In some embodiments, a user is able to removably couple each side of the headset cord 465 or the earphones 475 with a corresponding magnet. Alternatively, in some embodiments, a user is able to couple both sides of the headset cord 465 or earphones 475 with only one of the magnets.

Figure 5A:
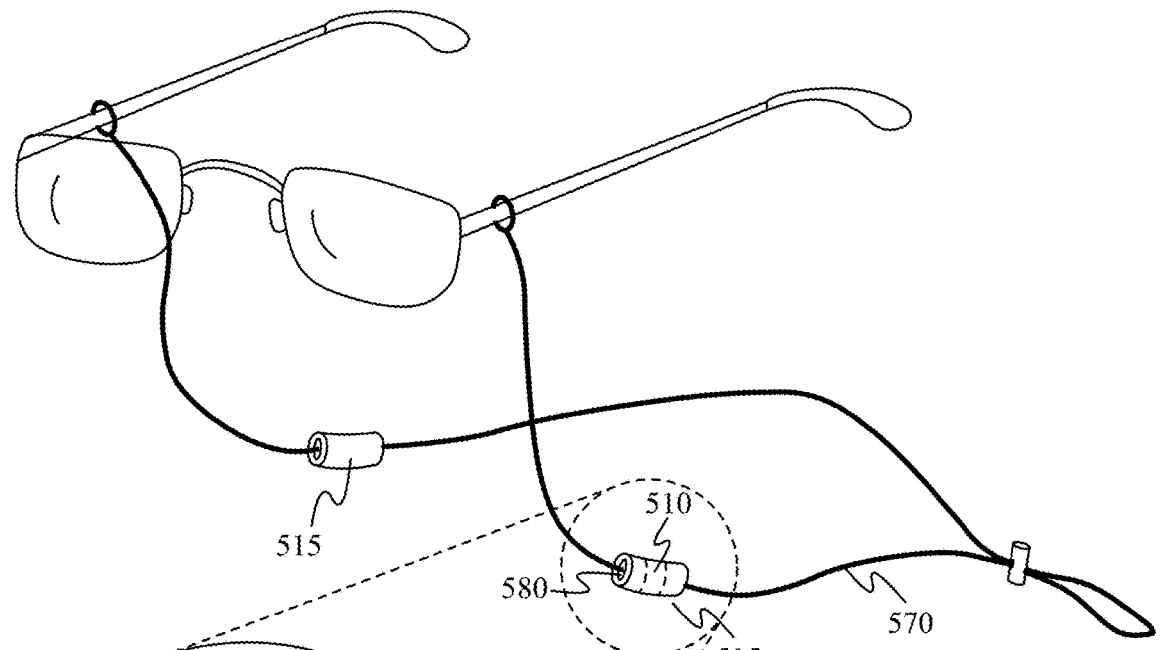
FIGS. 5A and 5B illustrate an embodiment of an earphones holder having a magnet built into a body coupled with a sunglass lanyard in accordance with some embodiments.
Figure 5B:
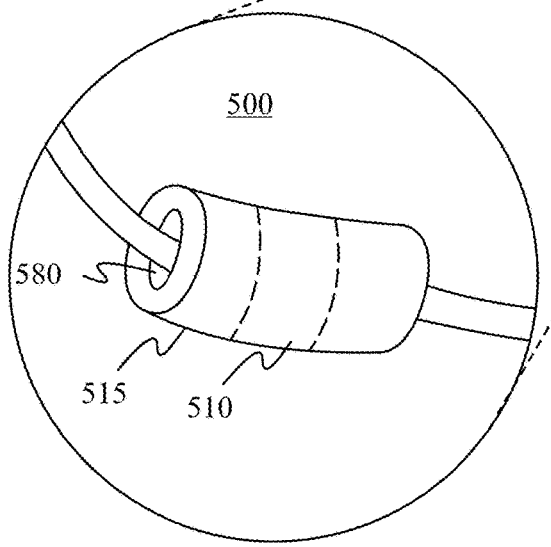

FIGS. 5A-5E illustrate an earphone holder 500 in accordance with further embodiments. As shown in FIGS. 5A and 5B, in some embodiments, the earphone holder 500 comprises a body 515 having a magnet 510 molded into it. The body 515 is configured to be coupled to a lanyard for sun or prescription glasses. In some embodiments, the lanyard 570 passes through an opening 580 within the body 515. However, the body 515 is able to couple with the lanyard through a clip or any other mechanism as known in the art. As shown in FIGS. 5A and 5B, each side of the lanyard comprises a body 515 of a headset cord holder 500. However, in some embodiments, the earphone holder 500 is only coupled to one side of the lanyard 570. In some embodiments, the body 515 of the earphone holder 500 comprises one or more of molded plastic, hard plastic, foam and rubber. In some embodiments, the body 510 of the headset cord holder comprises one or more of wood, glass, and metal.

Figure 5E:
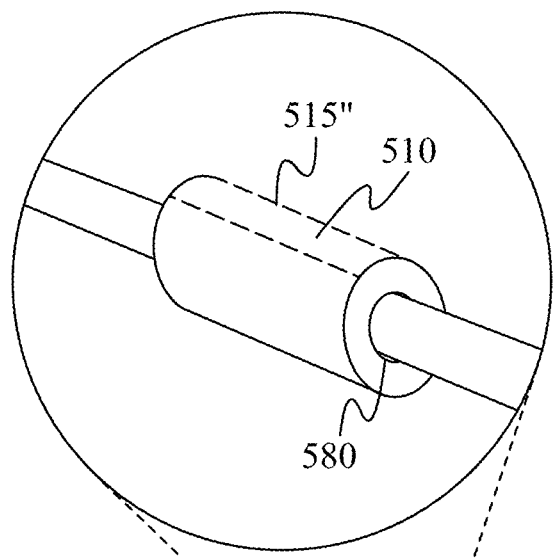
FIGS. 5C-5E illustrate an embodiment of an earphones holder having a magnet built into a body coupled with a pair of sunglasses in accordance with some embodiments.
Figure 5C:
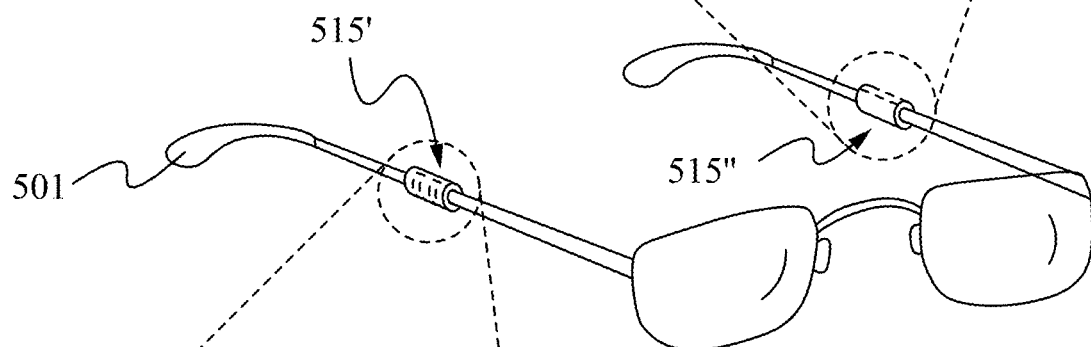
Figure 5D:
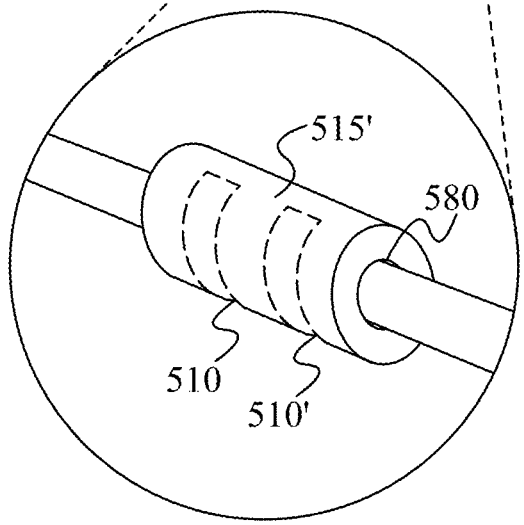

As shown in FIGS. 5C-5E, in some embodiments, the body 515' and the body 515" is configured to be removably coupled with a glasses frame 501. In some embodiments, an opening 580 within the body 515' and the body 515" is slid onto an ear piece 503 of the glasses frame 501. Accordingly, a user is able to slide the body 515' and the body 515" until a desired configuration along the ear piece 503 is found. As will be apparent to someone of ordinary skill in the art, the body 515' and the body 515" is able to couple with the glasses frame 501 by any mechanism as known in the art. For example, in some embodiments, the body 515' and the body 515" couples with the glasses frame 501 by one or more of a hook and loop fastening system and a clip. The glasses frame 501 is able to comprise sun and prescription glasses or a combination of the two. In some embodiments, the body 515' and the body 515" of the earphones holder comprises one or more of molded plastic, hard plastic, foam and rubber. In some embodiments, the body 515' and the body 515" of the earphones holder comprises one or more of wood, glass, and metal.

As shown in FIG. 5D, in some embodiments, the magnet 510 is oriented vertically along the body 515'. Alternatively, as shown within FIG. 5E, in some embodiments, the magnet 510 is oriented horizontally along the body 515". In some embodiments, the body 515' and 515" comprises one or more additional magnets 510'.

Figure 5G:
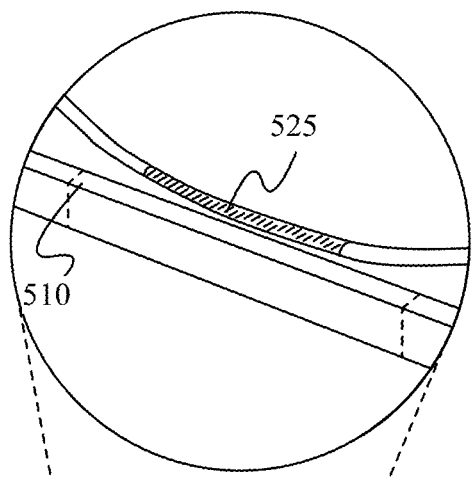
FIGS. 5F and 5G illustrate an embodiment of an earphones holder having a magnet built into a body of a pair of sunglasses in accordance with some embodiments.
Figure 5F:
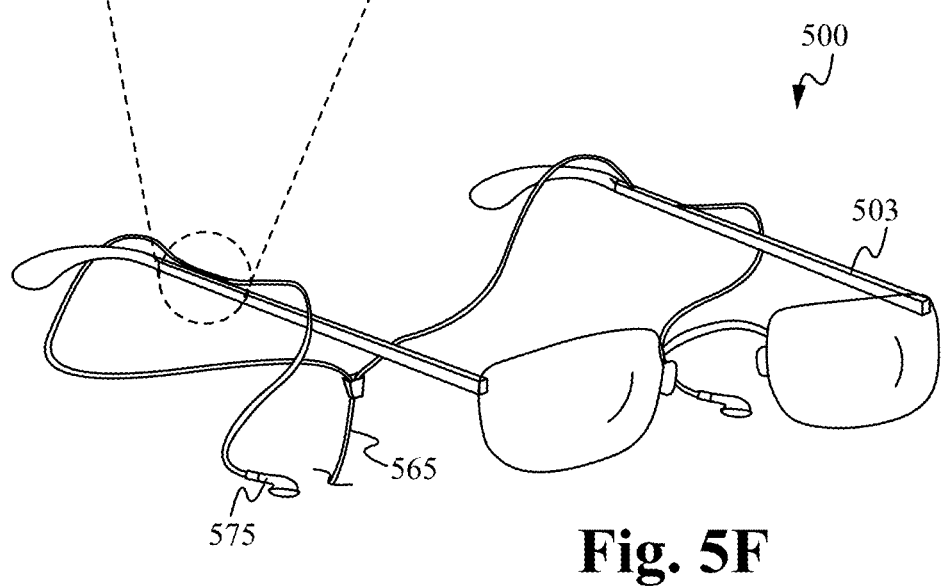

FIGS. 5F and 5G show an earphone holder comprising a body and a magnet within the body that directly receives and releasably secures a headset cord. In some embodiments, the magnet 510 is built into the glasses frame 501.

As shown within FIGS. 5F and 5G, in some embodiments the magnet 510 is built into the top of an ear piece 503 of the glasses frame 501. Alternatively, in some embodiments, as shown in FIGS. 5F and 5G, in some embodiments, the magnet 510 is built into a side of the earpiece 503 of the glasses frame 501. In some embodiments, the magnet 510 is oriented vertically along the ear piece 503. Alternatively, in some embodiments, the magnet 510 is oriented horizontally along the ear piece 503. Particularly, the magnet 510 is able to be located at any position along the ear piece 503. In some embodiments, the glasses frame 501 comprises one or more additional magnets.

As further shown within FIGS. 5A-5G, the magnets are configured to receive and releasably secure a set of earphones. In some embodiments, the magnet 510 removably couples with the magnetically attractable parts of the earphones 575. In some embodiments, as shown in FIG. 5G, the earphones 575 also comprises a magnet or magnetically attractable surface 525, which removably couples with the magnet 510. In these embodiments, the magnet or magnetically attractable surface 525 is able to be a component of the earphones 575 or the headset cord 565. In some embodiments, the magnet or magnetically attractable surface 525 is slidable along the earphones 575 or the headset cord 565. However, as will be apparent to someone of ordinary skill in the art, the magnet or magnetically attractable surface 525 is able to be fixedly connected to the earphones 575 or the headset cord 565. In some embodiments, a user is able to removably couple each side of the headset cord 565 or the earphones 575 with a corresponding magnet. Alternatively, in some embodiments, a user is able to couple both sides of the headset cord 565 or earphones 575 with only one of the magnets.

FIGS. 6A-B illustrate one embodiment of an earphones holder 600 having a magnet molded onto the front face of a side squeeze buckle used on bags and packs in accordance with some embodiments. FIGS. 6A and 6B show a plan view and a side view of the cord holder 600, respectively.

The side squeeze buckle comprises a female buckle end 615 coupled to a buckle strap or webbing 640 and a male buckle end 635 coupled to a buckle strap or webbing 645. The female buckle end 615 is configured to receive and releasably hold the male buckle end 635. In some embodiments, either the female buckle end 615 or the male buckle end 635 comprises a magnet 610. In some embodiments, the magnet 610 protrudes from either the female buckle end 615, as seen in FIGS. 6A and 6B, or the male buckle end 635. In some embodiments, the magnet 610 does not protrude from the rest of the buckle end, but rather is flush with the rest of the buckle end. Additionally, in some embodiments, the magnet 610 is integrally formed with the buckle end, while in other embodiments, the body is a separate component that is attached to the buckle end. In some embodiments, the earphones holder 600 is configured to act as a closure mechanism capable of releasably coupling a first strap, and any item to which the first strap is attached, to a second strap, and any item to which the second strap is attached. For example, in some embodiments, the magnet is part of a female buckle end 615 that is coupled to a first portion of a bag via a strap 640. The female buckle end 615 mates with a male buckle end 635. The male buckle end 635 is coupled to a second portion of the bag via a strap 645.

The magnet 610 is configured to receive and releasably secure a set of earphones. In some embodiments, the magnet 610 removably couples with the magnetically attractable parts of the earphones. In some embodiments, the earphones also comprise a magnet or magnetically attractable surface, which removably couples with the magnet 610. In these embodiments, the magnet or magnetically attractable surface is able to be a component of the earphones or the headset cord. In some embodiments, the magnet or magnetically attractable surface is slidable along the earphones or the headset cord. However, as will be apparent to someone of ordinary skill in the art, the magnet or magnetically attractable surface is able to be fixedly connected to the earphones or the headset cord. In some embodiments, the earphones holder 600 comprises one or more additional magnets. In some embodiments, a user is able to removably couple each side of the headset cord or the earphones with a corresponding magnet. Alternatively, in some embodiments, a user is able to couple both sides of the headset cord or earphones with only one of the magnets.

Figures 6C, 6D:
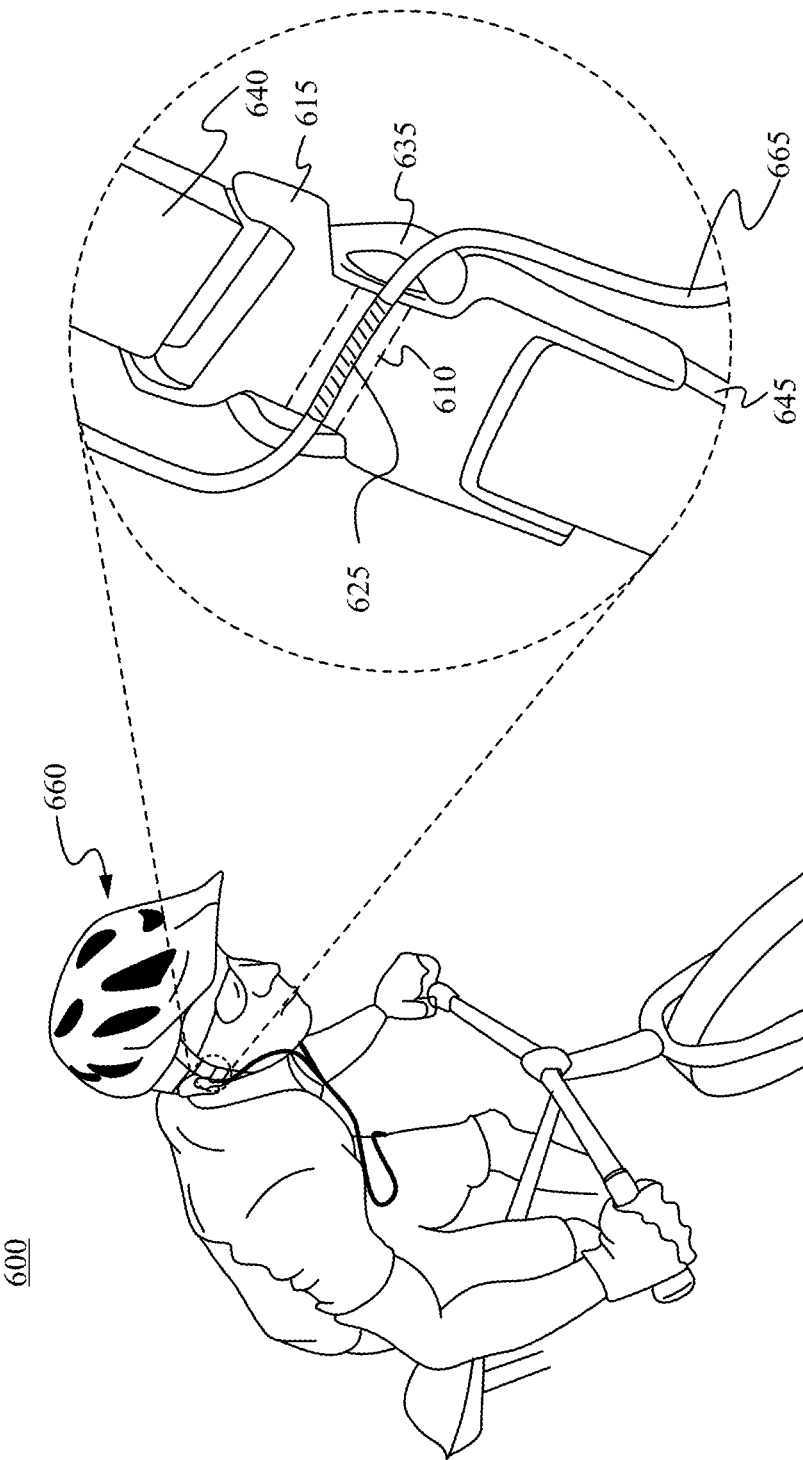
FIGS. 6C and 6D illustrate an embodiment of an earphones holder having a magnet built into a releasable clip coupled to a sports helmet in accordance with some embodiments.

FIGS. 6C and 6D illustrate a headset cord holder 600 in accordance with yet further embodiments. As shown in FIGS. 6C and 6D, the headset cord holder 600 comprises a body having a magnet 610 molded into the front face of a releasable clip or side squeeze buckle as described in relation to FIGS. 6A and 6B. The releasable clip is configured to be attached to a sports helmet.

Each end of the releasable clip 615, 635 is coupled by a strap 645, 640 to a sports helmet. As shown in FIG. 6D, the releasable clip is coupled to a bicycle helmet 660. However, the releasable clip is able to be coupled to any sports helmet as known in the art. For example, in some embodiments the releasable clip is coupled to one or more of a skiing helmet, bicycle helmet, motorcycle helmet or other sports helmet.

A magnet 610 is built or otherwise embedded within the releasable clip. The magnet 610 is configured to receive and releasably secure a set of earphones. In some embodiments, the magnet 610 removably couples with the magnetically attractable parts of the earphones. In some embodiments, the earphones also comprises a magnet or magnetically attractable surface, which removably couples with the magnet 610. The magnet 610 is configured to receive and releasably secure a set of earphones. In some embodiments, the magnet 610 removably couples with the magnetically attractable parts of the earphones. In some embodiments, the earphones also comprise a magnet or magnetically attractable surface, which removably couples with the magnet 610. In these embodiments, the magnet or magnetically attractable surface is able to be a component of the earphones or the headset cord. In some embodiments, the magnet or magnetically attractable surface is slidable along the earphones or the headset cord. However, as will be apparent to someone of ordinary skill in the art, the magnet or magnetically attractable surface is able to be fixedly connected to the earphones or the headset cord. In some embodiments, the earphones holder 600 comprises one or more additional magnets. In some embodiments, a user is able removably couple each side of the headset cord or the earphones with a corresponding magnet. Alternatively, in some embodiments, a user is able to couple both sides of the headset cord or earphones with only one of the magnets.

Figure 7A:
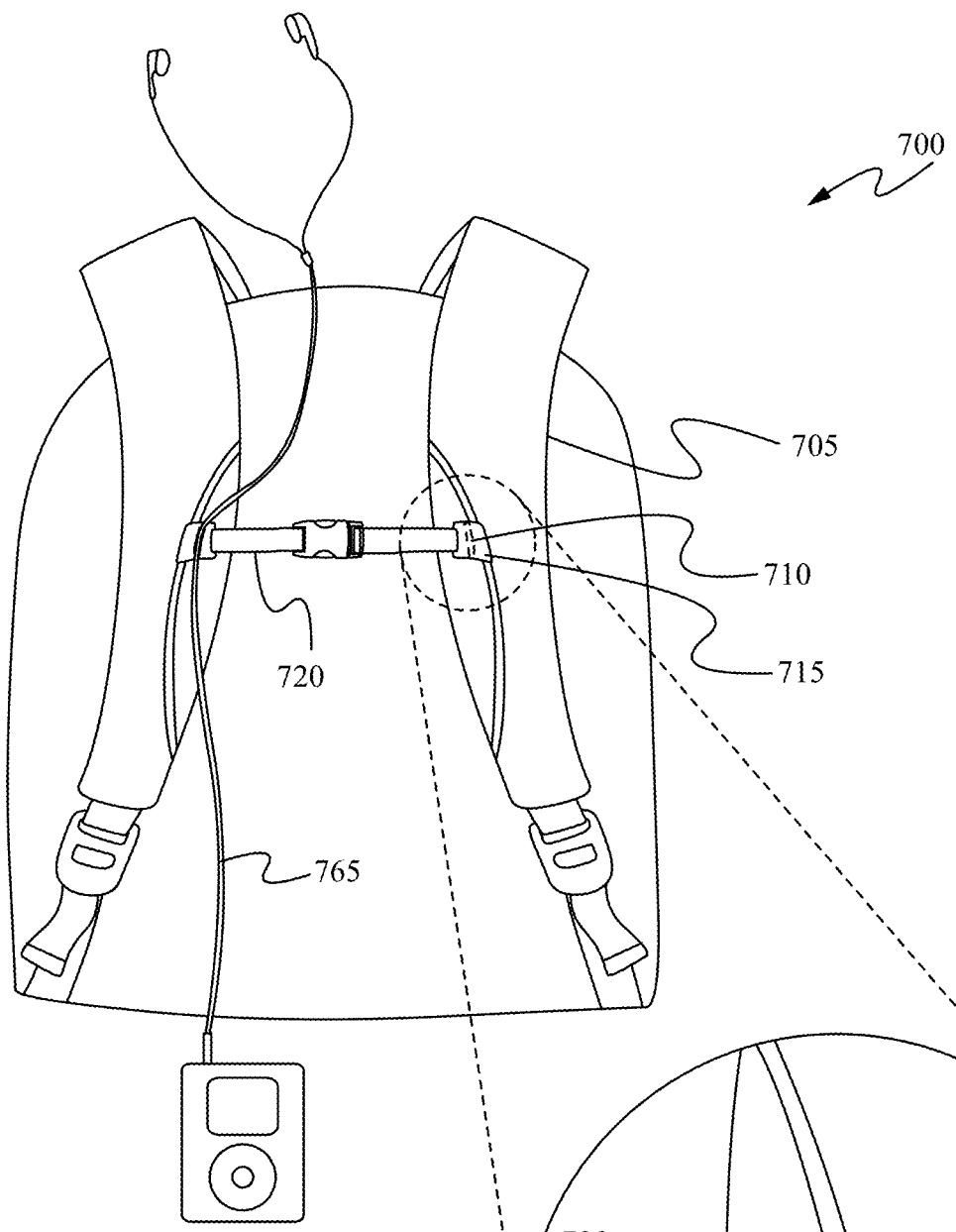
FIGS. 7A and 7B illustrate an embodiment of an earphones holder having a magnet built into a body in accordance with some embodiments.
Figure 7B:
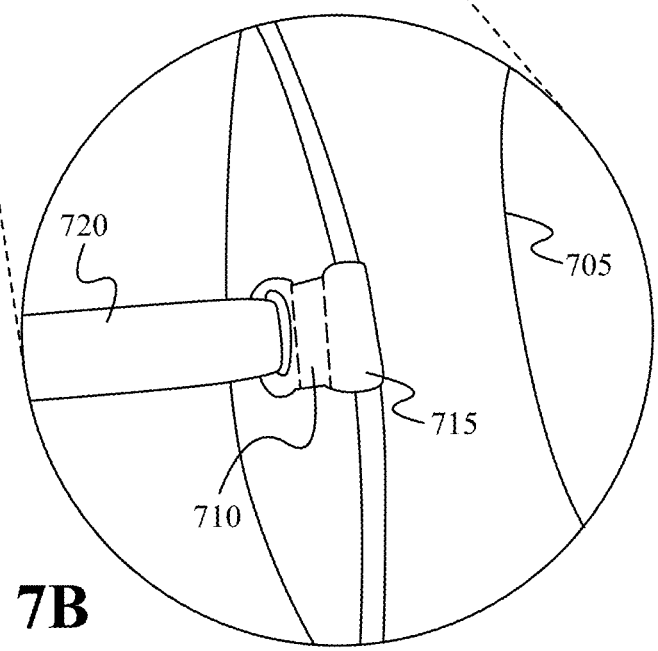

FIGS. 7A and 7B illustrate a headset cord holder 700 in accordance with further embodiments.

As shown in FIGS. 7A and 7B, a body 715 comprising a magnet 710 is coupled to a sternum strap 720 of a backpack 705. In some embodiments, the magnet 710 is coupled to an arm strap of a backpack 705. However, the body 715 is able to couple to any portion of the backpack 705 as known in the art. In some embodiments, the body 715 removably couples with the sternum strap 715 of the backpack 705. In some embodiments, the body 715 removably couples with the sternum strap 715 by one or more of a hook and loop fastening system and snaps. However, the body 715 is able to removably couple with the backpack 705 by any mechanism as known in the art. In some embodiments, the body 715 is able to additionally couple with one or more of a lumbar pack, a sports bag, and an arm band.

As shown within FIGS. 7A and 7B, the magnet 710 is configured to receive and releasably secure a set of earphones. In some embodiments, the magnet 710 removably couples with the magnetically attractable parts of the earphones. In some embodiments, the earphones also comprises a magnet or magnetically attractable surface, which removably couples with the magnet 710. In these embodiments, the magnet or magnetically attractable surface is able to be a component of the earphones or the headset cord. In some embodiments, the magnet or magnetically attractable surface is slidable along the earphones or the headset cord. However, as will be apparent to someone of ordinary skill in the art, the magnet or magnetically attractable surface is able to be fixedly connected to the earphones or the headset cord. In some embodiments, the earphones holder 700 comprises one or more additional magnets. In some embodiments, a user is able removably couple each side of the headset cord or the earphones with a corresponding magnet. Alternatively, in some embodiments, a user is able to couple both sides of the headset cord or earphones with only one of the magnets.

FIGS. 8A and 8B illustrate an earphones holder 800 in accordance with some embodiments. The headset cord holder 800 comprises a body 815 having a magnet 810 molded or built into the body which is a portion of a piece of jewelry 870.

In some embodiments, the portion of jewelry is configured to be coupled to at least an additional article. For example, as shown in FIGS. 8A and 8B, the body 815 comprises a bead of jewelry 860 in a strand of beads comprising a necklace 870. In some embodiments, the piece of jewelry is one or more of a broach, earrings, bracelet or sunglass lanyard. However, the body is able to be molded or built into any piece of jewelry as known in the art. Alternatively, in some embodiments one or more additional magnets are able to be molded in to the body or other portion of the piece of jewelry.

As shown within FIGS. 8A and 8B, the magnet 810 is configured to receive and releasably secure a set of earphones. In some embodiments, the magnet 810 removably couples with the magnetically attractable parts of the earphones. In some embodiments, the earphones also comprises a magnet or magnetically attractable surface, which removably couples with the magnet 810. In these embodiments, the magnet or magnetically attractable surface is able to be a component of the earphones or the headset cord. In some embodiments, the magnet or magnetically attractable surface is slidable along the earphones or the headset cord. However, as will be apparent to someone of ordinary skill in the art, the magnet or magnetically attractable surface is able to be fixedly connected to the earphones or the headset cord. In some embodiments, the earphones holder 800 comprises one or more additional magnets. In some embodiments, a user is able to removably couple each side of the headset cord or the earphones with a corresponding magnet. Alternatively, in some embodiments, a user is able to couple both sides of the headset cord or earphones with only one of the magnets.

As described above, in FIGS. 8A and 8B, the body 815 comprises a bead of jewelry 860 in a strand of beads comprising a necklace 870. In some embodiments, the piece of jewelry is one or more of a broach, earrings, bracelet or sunglass lanyard. However, the body is able to be molded or built into any piece of jewelry as known in the art. Alternatively, in some embodiments one or more additional magnets is able to be molded in to the body or other portion of the piece of jewelry.

Figure 9:
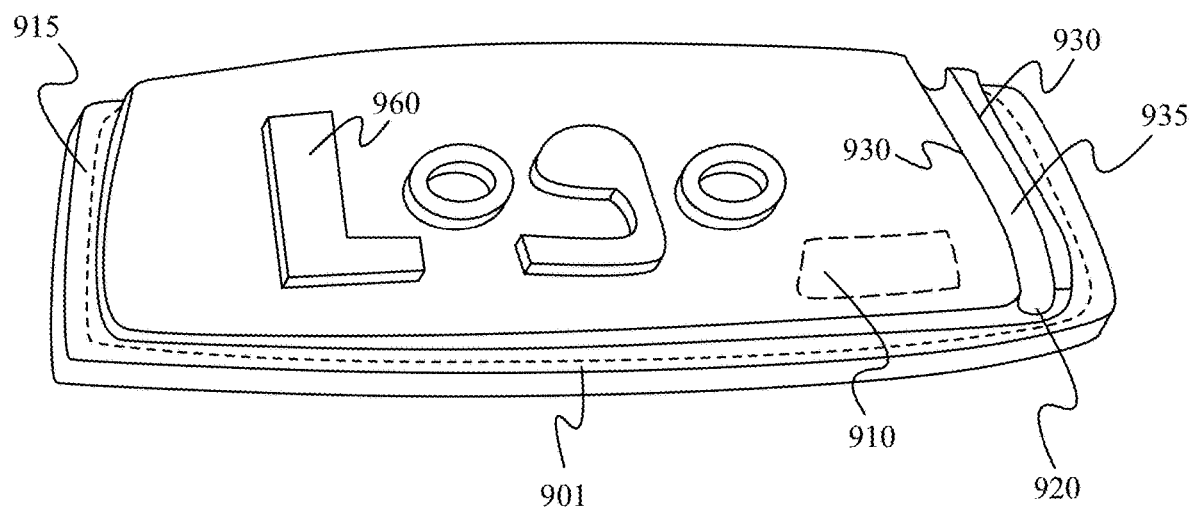
FIG. 9 illustrates an embodiment of an earphones holder having a magnet built into an identifying surface in accordance with some embodiments.

FIG. 9 illustrates an embodiment of an earphones holder having a magnet built into an identifying surface in accordance with some embodiments.

The earphones holder 900 comprises a body 901 having a magnet 910 molded or built into the body 901 which is a portion of an identifying surface 960. The body 901 is configured to be coupled to at least an additional article. In some embodiments, the body 901 comprises one or more of rubber, plastic and metal. The body 901 is configured to attach to an additional article by one or more of stitching, riveting, heat pressing, adhesive attachment, or chemical method. In some embodiments, the body 901 comprises an additional surface 915 which attaches to the additional article.

The magnet 910 is configured to receive and releasably secure a set of earphones. In some embodiments, the magnet 910 removably couples with the magnetically attractable parts of the earphones. In some embodiments, the earphones also comprises a magnet or magnetically attractable surface, which removably couples with the magnet 910. In these embodiments, the magnet or magnetically attractable surface is able to be a component of the earphones or the headset cord. In some embodiments, the magnet or magnetically attractable surface is slidable along the earphones or the headset cord. However, as will be apparent to someone of ordinary skill in the art, the magnet or magnetically attractable surface is able to be fixedly connected to the earphones or the headset cord. In some embodiments, the earphones holder 900 comprises one or more additional magnets. In some embodiments, a user is able to removably couple each side of the headset cord or the earphones with a corresponding magnet. Alternatively, in some embodiments, a user is able to couple both sides of the headset cord or earphones with only one of the magnets.

As described above, the body 901 comprises a portion of an identifying surface 960 and is configured to be coupled to an additional article. Particularly, the identifying surface is able to be coupled to an appropriate article as known in the art. For example, in some embodiments the identifying surface 960 is coupled to a bag or an item of clothing. Alternatively, in some embodiments, the identifying surface 960 is coupled to an accessory item such as a key chain or armband. In some embodiments one or more additional magnets is able to be molded into the body 901 or other portion of the identifying surface 960.

As further shown in FIG. 9, a groove 920 is molded or otherwise built into the body 901. The groove 920 is configured to receive and releasably secure a headset cord. In some embodiments, the groove 920 is defined by a groove wall 930 that surrounds most of the groove 920, leaving only an entry space 935 through which the cord can access the groove 920. In some embodiments, the entry space 935 has a smaller diameter than the groove 920 and the cord, thereby securing the cord within the confines of the groove wall 930 and requiring a significant amount of force for its removal. In some embodiments, portions of the groove wall 930 are flexible so that as the cord is pushed through the entry space 935, the cord is able to force the groove wall 930 out of its way and temporarily increase the diameter of the entry space 935 so that the cord can pass through the entry space 930 into the groove 920. In some embodiments, the groove wall 930 is substantially rigid, thereby forcing the outer sleeve of the cord to constrict as it passes through the entry space 935 between the ends of the groove wall 930.

By incorporating a magnet and a groove into the surface of the body 901 a user is able to releasably secure a headset cord in the groove 920 while utilizing the earphones and then magnetically secure the earphones to the body 901 when not in use.

Figure 10A:
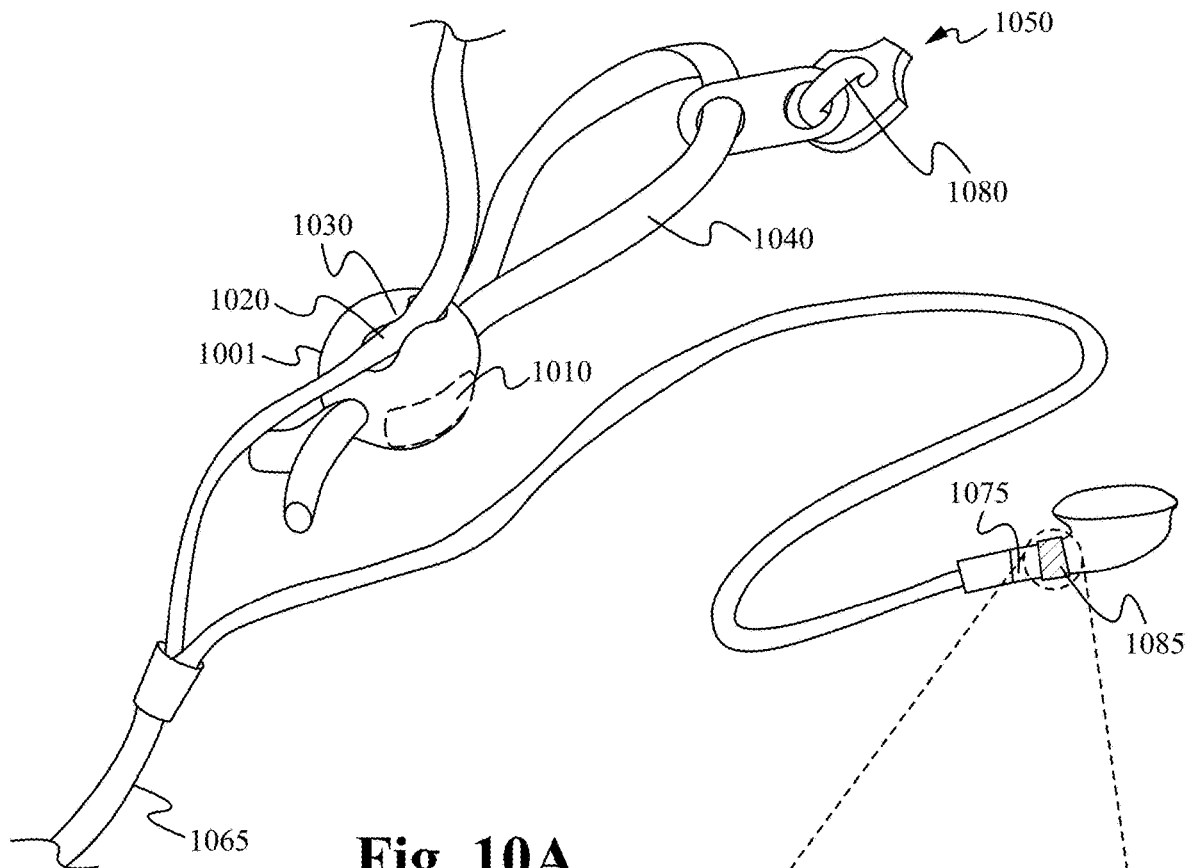
FIG. 10A illustrates an embodiment of an earphones holder having a magnet and a groove built into a zipper puller in accordance with some embodiments.

FIG. 10A illustrates an embodiment of an earphones holder having a magnet and a groove built into a zipper puller in accordance with some embodiments.

As shown in FIG. 10A, the body 1001 is coupled to the zipper head 1050. The earphones holder 1000 comprises a puller 1040 which is coupled to the body 1001. In some embodiments, the puller 1040 is a cord which passes through the center of the body 1001. In some embodiments, the puller 1040 is a cord which couples the body 1001 with an opening 1080. In some embodiments, the body 1001 comprises one or more of wood, glass, and metal.

The body 1001 comprises a magnet 1010. In some embodiments, the magnet 1010 is embedded within the body 1001. In other embodiments, the magnet 1010 is a distinct component that is attached to the body 1001. As shown within FIG. 10A, the magnet 1010 is molded or otherwise built into the body 1001. The magnet 1010 is configured to receive and releasably secure a set of earphones 1075. In some embodiments, the magnet 1010 removably couples with the magnetically attractable parts of the earphones 1075. In some embodiments, as shown in FIG. 10A, the earphones 1075 comprise a magnet or magnetically attractable surface 1085 coupled to the earphones, which affixes the earbud to the magnet 1010 built into or embedded within the body 1001. In these embodiments, the magnet or magnetically attractable surface 1085 is able to be a component of the earphones 1075 or the headset cord 1065. In some embodiments, the magnet or magnetically attractable surface 1085 snaps or removably couples around the earphones 1075. In some embodiments, the magnet or magnetically attractable surface 1085 is slidable along the earphones 1075 or the headset cord 1065. As will be apparent to someone of ordinary skill in the art, the magnet or magnetically attractable surface 1085 is able to be fixedly or removably connected to the earphones 1075 or the headset cord 1065.

As also shown in FIG. 10A, a groove 1020 is molded or otherwise built into the body 1001. The groove 1020 is configured to receive and releasably secure the headset cord 1065. In some embodiments, the groove 1020 is defined by a groove wall 1030 that surrounds most of the groove 1020, leaving only an entry space through which the cord 1065 can access the groove 1020. In some embodiments, the entry space has a smaller diameter than the groove 1020 and the cord 1065, thereby securing the cord within the confines of the groove wall 1030 and requiring a significant amount of force for its removal. In some embodiments, portions of the groove wall 1030 are flexible so that as the cord is pushed through the entry space, the cord is able to force the groove wall 1030 out of its way and temporarily increase the diameter of the entry space so that the cord can pass through the entry space into the groove 1020. In some embodiments, the groove wall 1030 is substantially rigid, thereby forcing the outer sleeve of the cord to constrict as it passes through the entry space between the ends of the groove wall 1030.

Figure 10B:
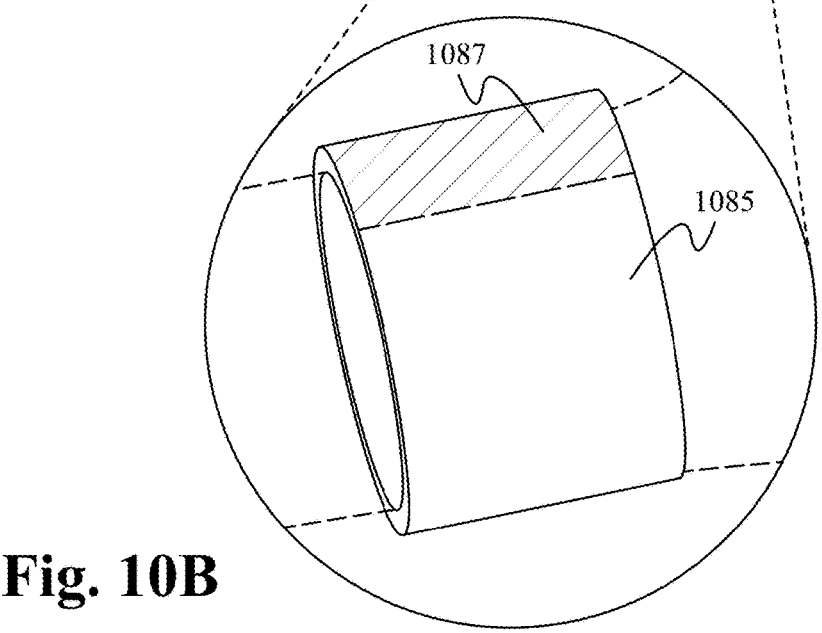
FIG. 10B shows a close-up view of a magnetically attractable surface for removably coupling with a pair of earphones in accordance with some embodiments.

FIG. 10B shows a close-up view of the magnetically attractable surface 1085, in accordance with some embodiments. The magnetically attractable surface 1085 removably couples with the earphones 1075 or the headset cord 1065 in order to removably couple the earphones with the magnet 1010 as described above. As shown within FIG. 10B, the magnetically attractable surface 1085 comprises a substantially circular body that fits around the earphones 1075. In some embodiments, the magnetically attractable surface 1085 is stretchable and stretches to fit over the earphones 1075. In some embodiments, the magnetically attractable surface 1085 comprises a hinge or coupler 1087 which enables the magnetically attractable surface 1085 to be opened and coupled around the earphones 1075. In some embodiments, the magnetically attractable surface 1085 is able to be opened at coupler 1087 and then placed around the earphones 1075 and snap fit back into place. In some embodiments, the magnetically attractable surface 1085 comprises two pieces which are separated in order to removably couple the magnetically attractable surface 1085 with the earphones 1075. Particularly, the magnetically attractable surface 1085 is able to removably couple with the earphones 1075 by any appropriate mechanism as known in the art. Additionally, although the magnetically attractable surface 1085 is shown with a circular body, the magnetically attractable surface is able to comprise any appropriate shape for coupling with the earphones 1075.

In some embodiments, a user is able to place the headset cord 1065 within the groove 1020 and then removably couple the magnet or magnetically attractable surface 1085 of the earphones 1075 with the magnet 1010.

In some embodiments, a shape of the one or more magnets as described above is selected from a set comprising a strip, a ball bearing and a disc. In further embodiments, at least one of the one or more magnets comprise one or more of a neodymium magnet and a ceramic magnet.

In operation, a user places a headset cord within the confines of the groove wall while using the headset to listen to an electronic device. This enables a user to comfortably utilize the headset without becoming entangled within the cord. Then, when not listening to the electronic device, a user places a set of earphones near to the magnet in order to allow the earphones to magnetically attract to and be held by the magnet. This enables the user to place the earphones in a convenient location when using the earphones and also when not in use. By doing so, a user is able to safely secure the earphones rather than letting them dangle where they may become entangled or snagged by the user. Consequently, the earphones holder has the advantage of providing an inexpensive and easy way to hold a headset cord in a comfortable and convenient position while utilizing an electronic device. Accordingly, the headset cord holder described herein has numerous advantages.

Referring now to FIG. 11, an embodiment of a magnetic earphones and cord holding system is depicted therein. The magnetic earphones and cord holding system 1100 comprises an earphones holder body 1101 and a set of earphones 1150. The set of earphones 1150 transmits a signal from an electronic device 1105 such as an iPod, iPhone, any other similar cellular phone or smart phone, MP3 or music player, movie player, or other electronic device 1105. As will be apparent to someone of ordinary skill in the art, the set of earphones 1150 is able to transmit a signal from any appropriate electronic device 1105 as known in the art. For example, in some embodiments, the set of earphones 1150 transmits a signal from an electronic media player such as an iPad, smart phone, tablet PC, Mp4 player, or DivX Media format player.

The earphones holder body 1101 comprises a groove 1120 for receiving and releasably securing a headset cord 1165, one or more magnetically attractable surfaces 1110 for removably coupling with one or more magnets 1185 of the set of earphones 1150, and an electronic device controller 1140. In some embodiments, the one or more magnetically attractable surfaces 1110 are magnets. In some of these embodiments, the magnets are neodymium magnets. In further embodiments, the earphones holder body 1101 comprises one or more recesses 1115 for holding an earbud 1175. In some embodiments, the earbud 1175 is press fit into the one or more recesses 1115. In some embodiments, the earphones holder body 1101 comprises a body comprising a zipper puller, a snap fastener, an adornment, a buckle attachment, or an item of jewelry and a magnet built into or embedded within the body. Particularly, the earphones holder body 1101 is able to comprise a cord holder as described in U.S. patent application Ser. No. 12/891,510, filed on Sep. 27, 2010 and/or a earphones holder as described in U.S. Provisional Patent Application No. 61/601,722, filed on Feb. 22, 2012, which are both hereby incorporated by reference. In some embodiments, the set of earphones 1150 is a component of a hands free telephone adapter.

The groove 1120 is molded or otherwise built into the earphones body 1101. The groove 1120 is configured to receive and releasably secure a headset cord 1165. In some embodiments, the groove 1120 is defined by a groove wall 1122 that surrounds most of the groove 1120, leaving only an entry space 1124 through which the cord 1165 can access the groove 1120. In some embodiments, the entry space 1135 has a smaller diameter than the groove 1120 and the cord 1165, thereby securing the cord 1165 within the confines of the groove wall 1122 and requiring a significant amount of force for its removal. In some embodiments, portions of the groove wall 1122 are flexible so that as the cord 1165 is pushed through the entry space 1124, the cord 1165 is able to force the groove wall 1122 out of its way and temporarily increase the diameter of the entry space 1135 so that the cord 1165 can pass through the entry space 1124 into the groove 1120. In some embodiments, the groove wall 1122 is substantially rigid, thereby forcing the outer sleeve of the cord 1165 to constrict as it passes through the entry space 1124 between the ends of the groove wall 1122.

By incorporating a magnet and a groove into the surface of the earphones holder body 1101, a user is able to releasably secure a headset cord 1165 in the groove 1120 while utilizing the earphones 1150 and then magnetically secure the earphones 1150 to the earphones holder body 1101 when not in use. The one or more magnetically attractable surfaces 1110 are able to be fixedly or removably connected to the earphones holder body 1101.

As described above, the one or more magnetically attractable surfaces 1110 are configured for removably coupling with the one or more magnets 1185 of the earphones 1150. In some embodiments, when the one or more magnets 1185 are removably coupled with the one or more magnetically attractable surfaces 1110, the body of the earbud 1175 is placed within the one or more recesses 1115. In some embodiments, the one or more recesses 1115 and the body of the earbud 1175 comprise interlocking geometry. In these embodiments, the body of the earbud 1175 is press fit or snap fit into the one or more recesses of the earphones holder body 1101.

The electronic device controller 1140 receives a signal from the earbud engagement detector 1130 and sends a signal to the electronic device activation circuit 1155 based upon the signal received from the earbud engagement detector 1130. The electronic device activation circuit 1155 operates an electronic device 1105 based upon the signal received from the controller 1140. In some embodiments, the earbud engagement detector 1130 sends a signal to the controller 1140 that the one or more magnets 1185 and the earbud 1175 have been decoupled from the earphones holder body 1101. In these embodiments, upon receiving the signal from the earbud engagement detector 1130, the controller 1140 sends a signal to the electronic device activation circuit 1155 to activate the electronic device 1105. In some embodiments, the earbud engagement detector 1130 sends a signal to the controller 1140 that the one or more magnets 1185 and the earbud 1175 have been coupled with the earphones holder body 1101. In these embodiments, upon receiving the signal from the earbud engagement detector 1130, the controller 1140 sends a signal to the electronic device activation circuit 1155 to deactivate the electronic device 1105.

In further embodiments, the electronic device controller 1140 sends a signal to electronic device activation circuit 1155 to operate the electronic device 1105 in another manner. For example, in some embodiments, upon receiving the signal from the earbud engagement detector 1130, the controller 1140 sends a signal to the electronic device activation circuit 1155 to adjust the volume of the signal from the electronic device 1105. Additionally, in some embodiments, the controller 1140 is able to send a signal to the electronic device activation circuit 1155 in order to pause the signal of an application or a program being transmitted by the electronic device 1105. Particularly, the controller 1140 is able to send any appropriate signal to the electronic device activation circuit 1155 in order to operate the electronic device 1105.

The magnetic earphones and cord holding system 1100 is able to send a signal to activate and/or deactivate an electronic device 1105 such as a cell phone. For example, if the user's phone rings, the user is able to remove the set of earphones 1150 from the earphones holder body 1101 and a signal is sent to answer the phone and connect the call. Likewise, if the user is on a call and the set of earphones 1150 are coupled with the earphones holder body 1101, a signal is sent to hang up the phone and terminate the call. Similarly, the magnetic earphones and cord holding system 1100 is able to send a signal to start, resume, or stop an electronic device such as an electronic media player or gaming device. For example, if a user needs to interrupt playing a video game, playing music, playing a movie, or other media stream, the user is able to couple the set of earphones 1150 with the holder body 1101 in order to pause the electronic device 1105. Then, when the user desires to resume using the electronic device 1105, the user is able to decouple the earphones 1150 from the holder body and send a signal and unpause the electronic device 1105. In this manner, the user is able to use the magnetic earphones and cord holding system 1100 to operate, activate and/or deactivate any programs or applications that are running on the electronic device 1105.

In some embodiments, the signal sent by the electronic device controller 1140 to the electronic device activation circuit 1155 and the signal sent by the electronic device activation circuit 1155 to the electronic device 1105 comprise one or more of infrared, infrared laser, radio frequency, wireless, WiFi, and Bluetooth®. However, the signal sent by the electronic device controller 1140 and the electronic device activation circuit 1155 are able to comprise any wireless signal as known in the art. Alternatively, in some embodiments, the signal sent by the electronic device controller 1140 and the electronic device activation circuit 1155 comprise a wired signal.

FIGS. 12A and 12B illustrate a side view of a magnetic earphones and cord holding system formed in two parts. The magnetic earphones and cord holding system 1200 comprises a first body 1201 and a second body 1202. The first body 1201 is substantially similar to the earphones holder body 1101 as discussed in relation to FIG. 11 and comprises a groove (not shown) for receiving and releasably securing a headset cord, one or more magnetically attractable surfaces 1110, an earbud engagement detector (not shown), and an electronic device controller (not shown). As shown in FIGS. 12A and 12B, the first body 1201 comprises a coupling mechanism 1203 and the second body 1202 comprises a coupling mechanism 1205. The coupling mechanisms 1203 and 1205 enable the first body 1210 and the second body 1202 to couple together. In some embodiments, the coupling mechanisms 1203 and 1205 comprises a snap, a button, or a hook and loop fastening system. However, the coupling mechanisms 1203 and 1205 are able to comprise any appropriate coupling mechanisms as known in the art. In some embodiments, the second body 1202 comprises a button, a snap, a zipper, or an adornment.

Figure 13:
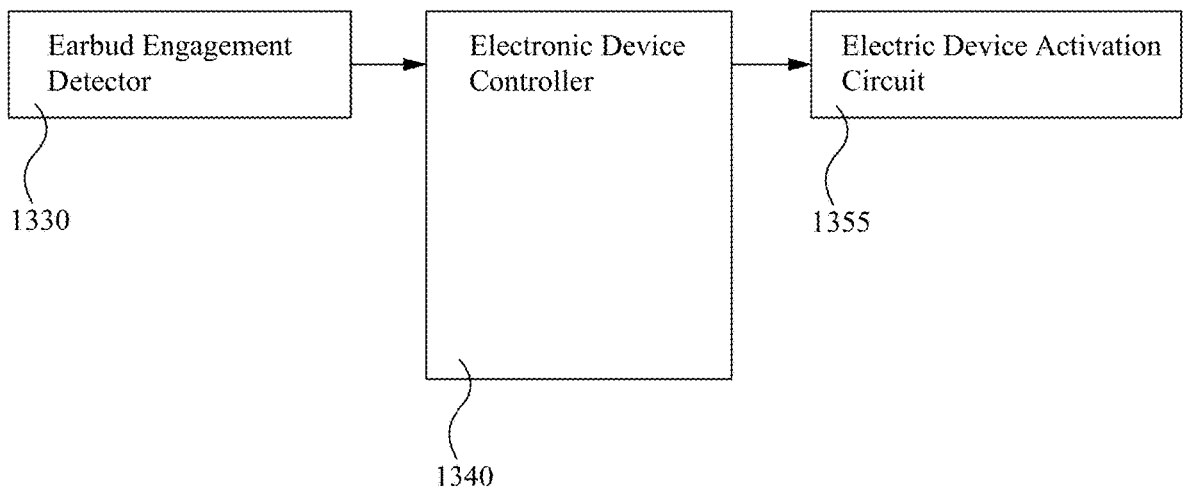
FIG. 13 illustrates a schematic view showing the components of a magnetic earphones and cord holding system in accordance with some embodiments.

FIG. 13 illustrates a schematic view showing the components of a magnetic earphones and cord holding system in accordance with some embodiments. As shown in FIG. 13, the magnetic earphones and cord holding system 1300 comprises an earbud engagement detector 1330, an electronic device controller 1340, and an electronic device activation circuit 1355. As described above, the earbud engagement detector 1330 detects an engagement of the earbud 1175 (FIG. 11) with the one or more magnets 1110. The earbud engagement detector 1330 sends a signal to the electronic device controller 1340 based upon the engagement status of the earbud. The electronic device controller 1340 processes the signal it receives from the earbud engagement detector 1330 and sends a signal to the electronic device activation circuit 1355 which operates an electronic device in a manner dependent upon the signal from the electronic device controller 1340. In some embodiments, the electronic device controller 1340 sends a signal to the electronic device activation circuit 1355 to activate the electronic device. In some embodiments, the electronic device controller 1340 sends a signal to the electronic device activation circuit 1355 to deactivate the electronic device.

Figure 14:
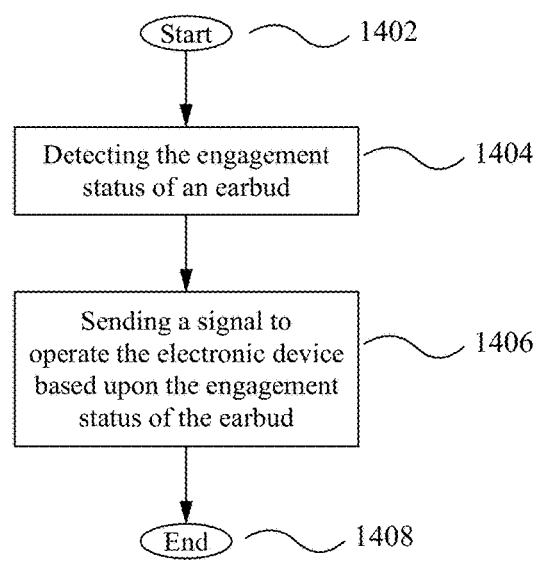
FIG. 14 illustrates a method of activating and/or deactivating an electronic device in accordance with some embodiments.

FIG. 14 illustrates a method of operating a set of earphones in accordance with some embodiments.

As shown in FIG. 14, at the step 1404 an engagement status of an earbud is detected. In some embodiments, it is detected whether or not the earbud is coupled with an earphones holder body. Then, based upon the engagement status of the earbud, at the step 1406, a signal is sent to operate the electronic device. In some embodiments, the signal is one or more of an infrared, infrared laser, radio frequency, wireless, WiFi, and Bluetooth® signal. In some embodiments, the signal is a wired signal. In some embodiments, the signal is a signal to turn off or to turn on the electronic device.

Figure 15:
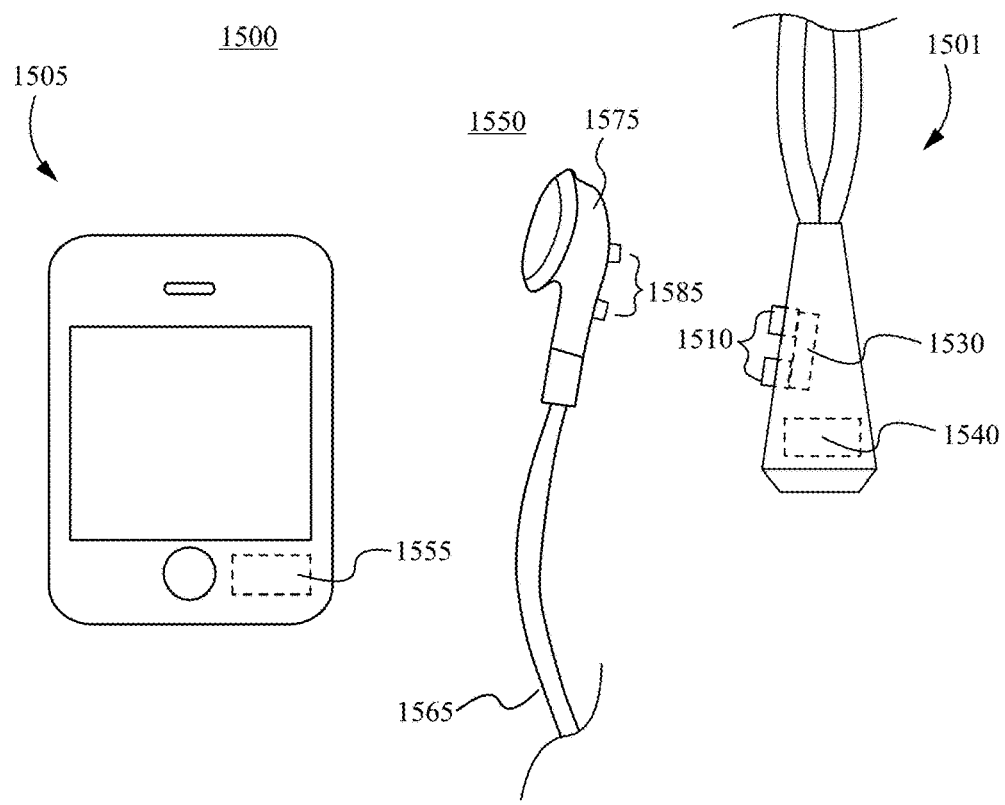
FIG. 15 illustrates a magnetic earphones holding system in accordance with some embodiments.

FIG. 15 illustrates a magnetic earphones holding system in accordance with further embodiments. The magnetic earphones holding system 1500 comprises an earphones holder body 1501 and a set of earphones 1550. The set of earphones 1550 transmits a signal from an electronic device 1505 such as an iPod, iPhone, any other similar cellular phone or smart phone, MP3 or music player, movie player, or other electronic device 1505. As will be apparent to someone of ordinary skill in the art, the set of earphones 1550 is able to transmit a signal from any appropriate electronic device 1505 as known in the art. For example, in some embodiments, the set of earphones 1550 transmits a signal from an electronic media player such as an iPad, smart phone, tablet PC, Mp4 player, or DivX Media format player.

The earphones holder body 1501 is in the shape of a zipper puller and comprises one or more magnetically attractable surfaces 1510 for removably coupling with one or more magnets 1515 of the set of earphones 1550, and an electronic device controller 1540. In some embodiments, the one or more magnetically attractable surfaces 1510 are magnets. In some of these embodiments, the magnets are neodymium magnets. In some embodiments, the holder body 1501 comprises a plurality of magnetically attractable surfaces 1510. In some embodiments, the earphones holder body 1501 comprises a body comprising a snap fastener, an adornment, a buckle attachment, or an item of jewelry and a magnet built into or embedded within the body. In some embodiments, the earphones holder body 1501 further comprises a groove as described in relation to FIG. 1. In some embodiments, the set of earphones 1550 is a component of a hands free telephone adapter.

Using the one or more magnet 1585 of the earphones 1550, a user is able to couple the earphones 1550 with the one or more magnetically attractable surfaces 1510 of the earphones holder body 1501 when not in use. The one or more magnetically attractable surfaces 1510 are able to be fixedly or removably connected to the earphones holder body 1501. In some embodiments, the holder body 1501 further comprises one or more recesses for interlocking with the earbud 1575. In these embodiments, the body of the earbud 1575 is press fit or snap fit into the one or more recesses of the earphones holder body 1501.

As further shown in FIG. 15, the earphones holder body 1501 comprises an electronic device controller 1540 and an earbud engagement detector 1530. The electronic device controller 1540 receives a signal from the earbud engagement detector 1530 and sends a signal to the electronic device activation circuit 1555 based upon the signal received from the earbud engagement detector 1530. The electronic device activation circuit 1555 operates an electronic device 1505 based upon the signal received from the controller 1540. In some embodiments, the earbud engagement detector 1530 sends a signal to the controller 1540 that the one or more magnets 1585 and the earbud 1575 have been decoupled from the earphones holder body 1501. In these embodiments, upon receiving the signal from the earbud engagement detector 1530, the controller 1540 sends a signal to the electronic device activation circuit 1555 to activate the electronic device 15015. In some embodiments, the earbud engagement detector 1530 sends a signal to the controller 1540 that the one or more magnets 1585 and the earbud 1575 have been coupled with the earphones holder body 1501. In these embodiments, upon receiving the signal from the earbud engagement detector 1530, the controller 1540 sends a signal to the electronic device activation circuit 1555 to deactivate the electronic device 1505.

As shown within FIG. 15, the earbud engagement detector 1530 and the electronic device controller 1540 are components of the earphones holder body 1501. However, as will be apparent to someone of ordinary skill the art, one or more of the earbud engagement detector 1530 and the electronic device controller 1540 are able to be components of the set of earphones 1550.

Figure 16:
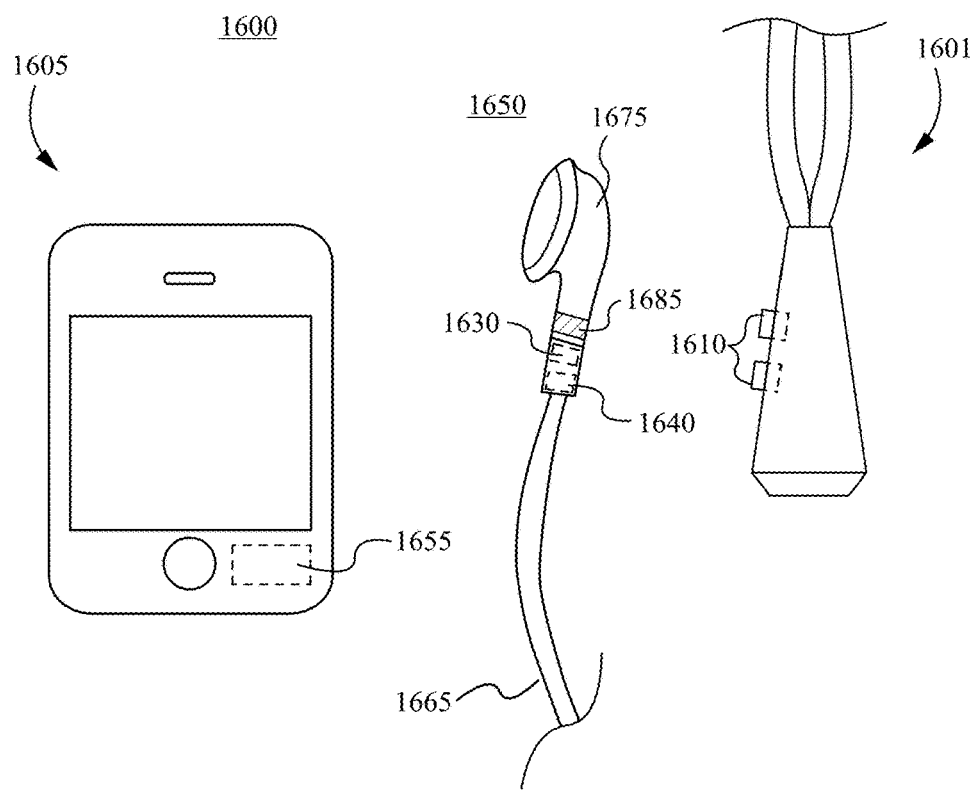
FIG. 16 illustrates a magnetic earphones holding system in accordance with some embodiments.

As shown within FIG. 16, in some embodiments, the one or more magnets 1685 comprise a magnetically attractable surface that is a circular body that fits around the earphones 1650. In some embodiments, the one or more magnets 1685 removably couple with the earphones 1650. In some of these embodiments, the magnetically attractable surface 1685 is stretchable and stretches to fit over the earphones 1650. In some embodiments, the magnetically attractable surface 1685 comprises a hinge or coupler which enables the magnetically attractable surface 1685 to be opened and coupled around the earphones 1650. In some embodiments, the magnetically attractable surface 1685 is able to be opened at coupler and then placed around the earphones 1650 and snap fit back into place. In some embodiments, the magnetically attractable surface 1685 comprises two pieces which are separated in order to removably couple the magnetically attractable surface 1685 with the earphones 1650. Particularly, the magnetically attractable surface 1685 is able to removably couple with the earphones 1650 by any appropriate mechanism as known in the art. Additionally, although the magnetically attractable surface 1685 is shown with a circular body, the magnetically attractable surface is able to comprise any appropriate shape for coupling with the earphones 1650. As further shown in FIG. 16, the earbud engagement detector 1630 and the electronic device controller 1640 are components of the earphones 1650.

In further embodiments, the earbud engagement detector 1730 (FIG. 17) is a component of an earbud 1775 and sends a signal to a electronic device controller 1740 incorporated into a separate body 1701.

Figure 17:
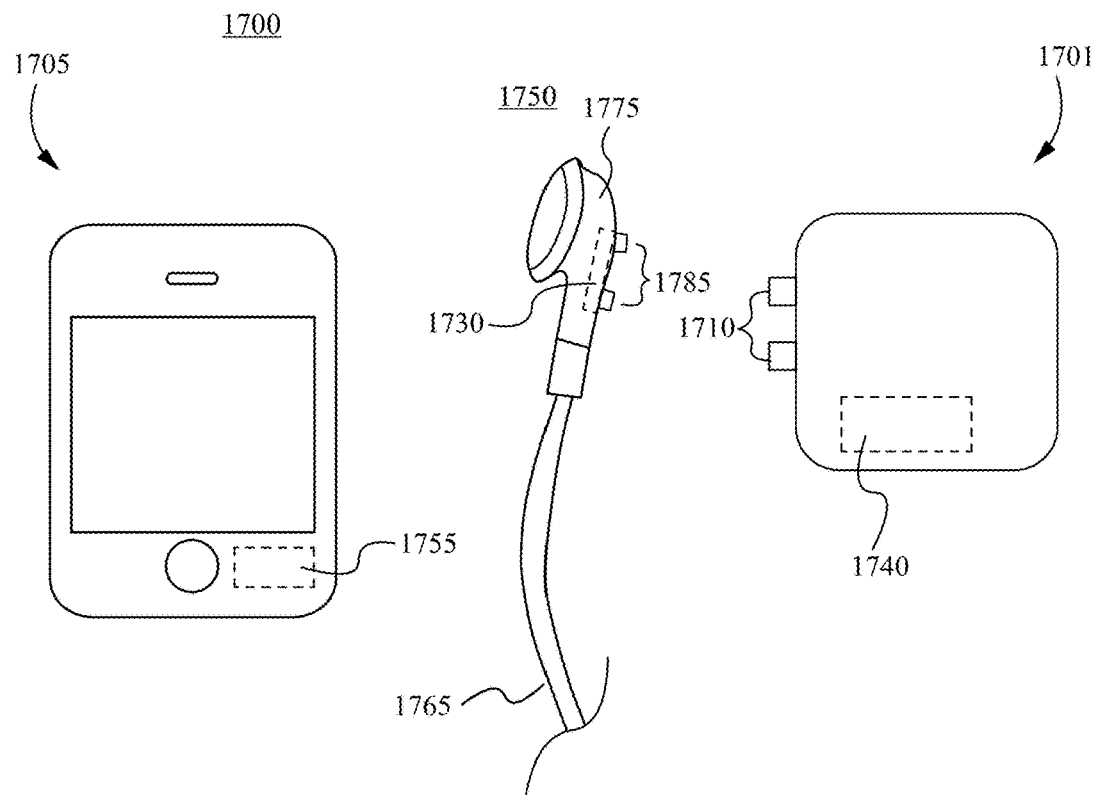
FIG. 17 illustrates a magnetic earphones holding system in accordance with some embodiments.

FIG. 17 illustrates a magnetic earphones holding system in accordance with further embodiments. The magnetic earphones holding system 1700 comprises an earphones holder body 1701 and a set of earphones 1750. The set of earphones 1750 transmits a signal from an electronic device 1705 such as an iPod, iPhone, any other similar cellular phone or smart phone, MP3 or music player, movie player, or other electronic device 1705. As will be apparent to someone of ordinary skill in the art, the set of earphones 1750 is able to transmit a signal from any appropriate electronic device 1705 as known in the art. For example, in some embodiments, the set of earphones 1750 transmits a signal from an electronic media player such as an iPad, smart phone, tablet PC, Mp4 player, or DivX Media format player.

As described above, the earphones holder body 1701 is able to be in a shape of a zipper puller, a snap fastener, an adornment, a buckle attachment, or an item of jewelry and a magnet built into or embedded within the body and comprises one or magnetically attractable surfaces 1710 and an electronic device controller 1740. As shown in FIG. 17, the earphones 1750 comprise one or more magnets 1785 and an earbud engagement detector 1730. In some embodiments, the electronic device controller 1740 and the earbud engagement detector 1730 are components of the earphone holder body 1701. Alternatively, in some embodiments, the electronic device controller 1740 and the earbud engagement detector 1730 are components of the set of earphones 1750.

Using the one or more magnet 1785 of the earphones 1750, a user is able to couple the earphones 1750 with the one or more magnetically attractable surfaces 1710 of the earphones holder body 1701 when not in use. The one or more magnetically attractable surfaces 1710 are able to be fixedly or removably connected to the earphones holder body 1701. In some embodiments, the holder body 1701 further comprises one or more recesses for interlocking with the earbud 1775. In these embodiments, the body of the earbud 1775 is press fit or snap fit into the one or more recesses of the earphones holder body 1701.

The electronic device controller 1740 receives a signal from the earbud engagement detector 1730 and sends a signal to the electronic device activation circuit 1755 based upon the signal received from the earbud engagement detector 1730. The electronic device activation circuit 1755 operates an electronic device 1705 based upon the signal received from the controller 1740. Particularly, the controller 1740 relays the signal from the earbud engagement detector 1730 to the electronic device 1705. As described above, in some embodiments the signal received from the controller 1740 is a signal to activate and/or deactivate the electronic device 1705.

In further embodiments, the earphones holder body 1701 comprises an item that is placed on a counter top or other similar item. In some embodiments, the electronic device controller 1740, is able to send a signal to an activation circuit 1755 of an electronic device 1705 that is removably coupled with an external docking station.

In some embodiments, the signal sent by the electronic device controller 1740 to the electronic device activation circuit 1755 and the signal sent by the electronic device activation circuit 1755 to the electronic device 1705 comprise one or more of infrared, infrared laser, radio frequency, wireless, WiFi, and Bluetooth®. However, the signal sent by the electronic device controller 1740 and the electronic device activation circuit 1755 are able to comprise any wireless signal as known in the art. Alternatively, in some embodiments, the signal sent by the electronic device controller 1740 and the electronic device activation circuit 1755 comprise a wired signal.

In further embodiments, the set of earphones 1750 comprise wireless earphones. In these embodiments, the earbud engagement detector 1730 sends a wireless signal to the electronic device controller 1740 based on the engagement status of the earphones and the earphones 1750 receive a wireless content signal from the electronic device 1705.

Figure 18:
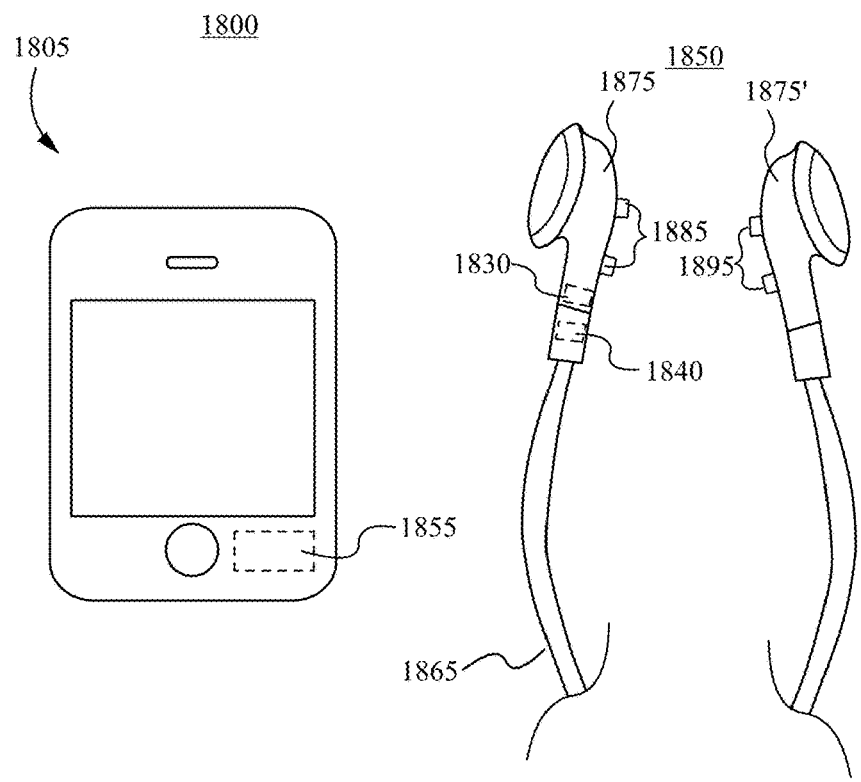
FIG. 18 illustrates a magnetic earphones holding system in accordance with some embodiments.

FIG. 18 illustrates a magnetic earphones holding system in accordance with some embodiments. The system 1800 comprises a set of earphones comprising one or more magnets or magnetically attractable surfaces 1885 built into the earbud 1875 and one or more magnets or magnetically attractable surfaces 1895 built into the earbud 1875'. As shown in FIG. 18, the earbud 1875 comprises an earbud engagement detector 1830 and an electronic device controller 1840 built into the body of the earbud 1875. Although, the earbud engagement detector 1830 and an electronic device controller 1840 built into a signal body of the earbud 1875, as will be apparent to someone of ordinary skill in the art, the earbud engagement detector 1830 and the electronic device controller 1840 are able to be components of different earbuds.

The electronic device controller 1840 receives a signal from the earbud engagement detector 1830 based upon an engagement of the earbud 1875 with the earbud 1875'. In some embodiments, the earbud engagement detector 1830 sends a signal to the controller 1840 that the one or more magnets or magnetically attractable surfaces 1885 have been removed from the one or more magnets or magnetically attractable surfaces 1895. In these embodiments, upon receiving the signal from the earbud engagement detector 1830, the controller 1840 sends a signal to the electronic device activation circuit 1855 to activate the electronic device 1805. In some embodiments, the earbud engagement detector 1830 sends a signal to the controller 540 that the earbud 1875 has been coupled with the earbud 1875'. In these embodiments, upon receiving the signal from the earbud engagement detector 1830, the controller 1840 sends a signal to the electronic device activation circuit 1855 to deactivate the electronic device 1805.

In operation, the earphones holder enables a user to comfortably utilize a headset without becoming entangled within the cord. In some embodiments, a user uses a groove and the magnets of a cord holder body while using the headset to listen to an electronic device. A user places a set of earphones near to the magnet in order to allow the earphones to magnetically attract to and be held by the magnet. When the user wishes to use the electronic device, the earphones are removed from the magnet and a signal is transmitted in order to activate an electronic device such as a music player or cell phone. Then, when the user no longer wishes to use the electronic device, the earphones are recoupled with the magnet and the electronic device is deactivated. In this manner, the earphones are able to be removed from the earphones holder body and an electronic device is automatically activated in order to answer a telephone call. Then, when the telephone call is terminated, the user is able to recouple the earphones with the earphones holder body and automatically deactivate the device. Alternatively, the earphones are able to be removed from the earphones holder body and an electronic device is automatically activated in order to listen to music transmitted from a music player or cell phone and then recoupled with the earphones holder body in order to deactivate the device when the use of the earphones is no longer desired.

Referring now to FIGS. 19A-19E, an embodiment of a magnetic earphones and cord holding system is depicted therein. The magnetic earphones and cord holding system 1900 comprises a body 1901 comprising a touch sensor 1903, an on/off button 1911, a microphone 1913, a speaker 1915, and a charging port 1917. As shown in FIGS. 19A-19E, the body 1901 also comprises an electronic device controller 1940 and a touch sensor detector 1960. In some embodiments, the system comprises an earphones jack 1907 and one or magnets or magnetically attractable surfaces 1920 and 1920' and one or more earbud engagement detectors 1930 and 1930'. The one or magnets or magnetically attractable surfaces 1920 and 1920' are configured to removably couple with one or more magnets 1985 and 1985' of a set of earphones 1950. In further embodiments, the body 1901 comprises a groove and/or one or more recesses for securing the earphones 1950 and the cord 1965, as described above.

In some embodiments, the electronic device controller 1940 receives a signal from the earbud engagement detector 1930 and sends a signal to the electronic device activation circuit 1955 based upon the signal received from the earbud engagement detector 1930. The electronic device activation circuit 1955 operates an electronic device 1905 based upon the signal received from the controller 1940. In some embodiments, the earbud engagement detector 1930 sends a signal to the controller 1940 that the one or more magnets 1985 and the earbud 1975 have been decoupled from the earphones holder body 1901. In these embodiments, upon receiving the signal from the earbud engagement detector 1930, the controller 1940 sends a signal to the electronic device activation circuit 1955 to activate the electronic device 1905. In some embodiments, the earbud engagement detector 1930 sends a signal to the controller 1940 that the one or more magnets 1985 and the earbud 1975 have been coupled with the earphones holder body 1901. In these embodiments, upon receiving the signal from the earbud engagement detector 1930, the controller 1940 sends a signal to the electronic device activation circuit 1955 to deactivate the electronic device 1905.

In further embodiments, the touch sensor detector 1960 receives a signal from the touch sensor 1903 based upon a contact with the touch sensor 1903 and sends a signal to the electronic device controller 1940, which sends a signal to the electronic device activation circuit 1955. The electronic device activation circuit 1955 operates an electronic device 1905 based upon the signal received from the controller 1940. For example, in some embodiments, the touch sensor detector 1960 sends a signal to the electronic device controller 1940 that the touch sensor 1903 has been tapped, double-tapped, and/or swiped. In response, the electronic device controller 1940 sends a signal to the electronic device activation circuit 1955 to operate the electronic device 1905. In some embodiments, the electronic device controller 1940 is able to send a signal to activate/de-activate the electronic device, turn up or turn down the volume, change the playing media, and/or change the program being operated by the electronic device 1905. Particularly, the electronic device controller 1940 is able to send any appropriate desired control signal to the electronic device 1905. Additionally, the touch sensor 1903 is able to be operated in any desired manner.

Figure 20:
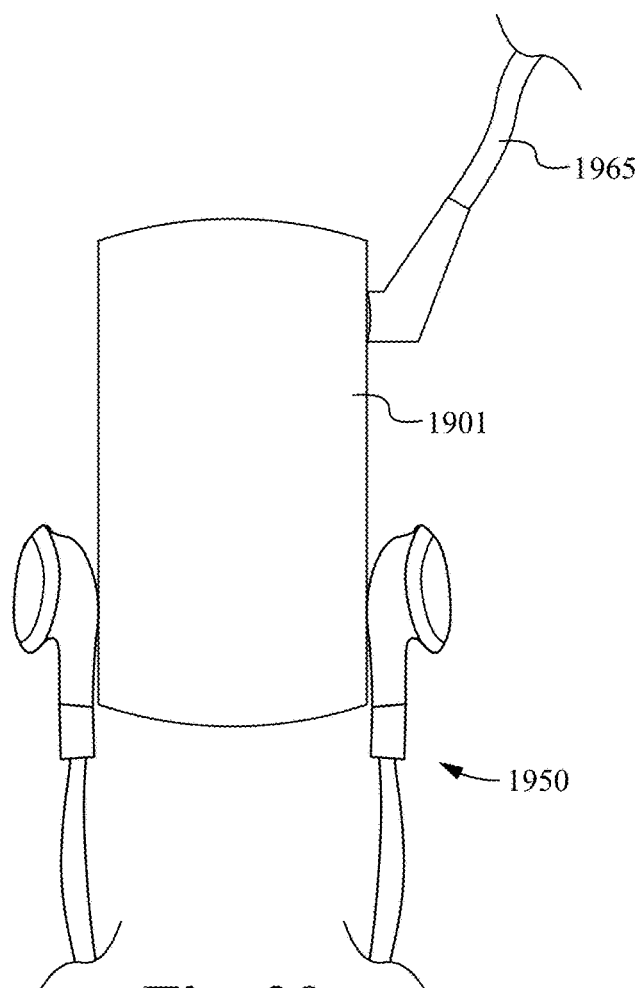
FIG. 20 illustrates a magnetic earphones holding system in accordance with some embodiments.

In some embodiments, the magnetic and cord holding system 1900 is used with the set of earphones 1950. In these embodiments, the power input 1995 is inserted into the earphones jack 1907 and the one or more magnets 1985 and 1985' are removably coupled with the one or more magnets or magnetically attractable surfaces 1920 and 1920'. In some embodiments, a user is able to remove the earphones 1950 and transmit a signal in order to activate the electronic device 1905, as described above. Then, with the earphones in their ears, a user is able to utilize the touch sensor 1903 in order to operate the electronic device 1905. In some embodiments, the magnetic and cord holding system 1900 is used with a short cord set of earphones. Consequently, the set of earphones is able to be used without becoming entangled in the clothing of the user. Particularly, as shown in FIG. 20, because the power input 1975 and the earphones 1950 are held closely together when coupled with the body 1901, the cord 1965 of the earphones only needs to long enough to comfortably couple the earphones 1950 with the ears of a user and enable the user to use the touch sensor 1903 and/or the microphone 1913 of the body 1901 of the magnetic and cord holding system 1900.

In further embodiments, the magnetic and cord holding system 1900 is able to be used without the set of earphones 1950. For example, the touch sensor 1903 is able to be contacted in order activate the electronic device 1905 and then a user is able to utilize the touch sensor 1903 in order to operate the electronic device 1905. In these embodiments, the touch sensor 1903 is able to be utilized in order to answer a telephone call and communicate using the microphone 1913 and the speaker 1915. Then, when the telephone call is terminated, the user is able to utilize the touch sensor 1903 to terminate the call and deactivate the electronic device 1905. Additionally, in some embodiments, the system 1900 and the touch sensor 1903 are used without audio in order to control a program running on the electronic device 1905.

The magnetic and cord holding system 1900 is able to be used with a variety of electronic devices and in a variety of settings. For example, in some embodiments, the system 1900 is utilized with an electronic device that is coupled with an external docking station. In further embodiments, the system 1900 is able to be used as a controller for a game or program located on the electronic device. In these embodiment the touch sensor 1903 is able to be utilized to send control messages to the electronic device in order to control the game or program. In further embodiments, the system 1900 is able to receive a signal from an electronic device. For example, in some embodiments the system 1900 is able to receive an audio signal from the electronic device through the speaker 1915. Further, in some embodiments, the speaker 1915 and the microphone 1913 are used to communicate voice controls to the electronic device 1905.

In some embodiments, the signal sent by the electronic device controller 1940 to the electronic device activation circuit 1955 and the signal sent by the electronic device activation circuit 1955 to the electronic device 1905 comprise one or more of infrared, infrared laser, radio frequency, wireless, WiFi, and Bluetooth®. However, the signal sent by the electronic device controller 1940 and the electronic device activation circuit 1955 are able to comprise any wireless signal as known in the art. Alternatively, in some embodiments, the signal sent by the electronic device controller 1940 and the electronic device activation circuit 1955 comprise a wired signal.

Figure 21:
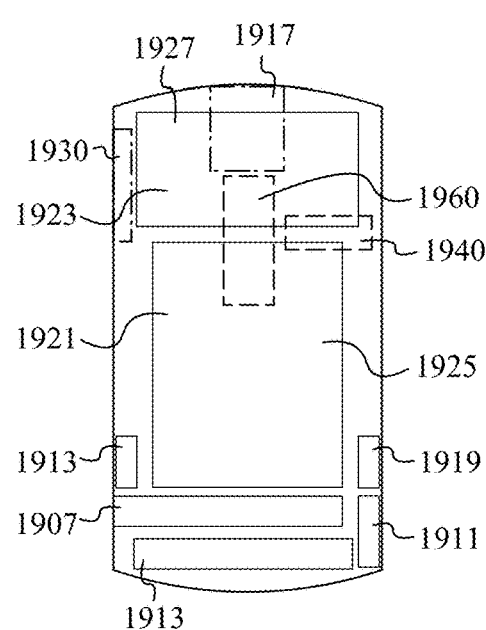
FIG. 21 illustrates a block diagram of a magnetic earphones holding system in accordance with some embodiments.

FIG. 21 illustrates a block diagram showing the components of the body 1901 of the system 1900. As described above, the body 1901 comprises a touch sensor 1903, an on/off button 1905, a microphone 1913, a speaker 1915, and a charging port 1917. As shown in FIGS. 19A-19E, the body 1901 also comprises an electronic device controller 1940 and a touch sensor detector 1960. In some embodiments, the system comprises an earphones jack 1907 and one or more magnets or magnetically attractable surfaces 1920 and 1920' and one or more earbud engagement detectors 1930 and 1930'. In some embodiments, the body 1901 comprises a printed circuit board 1923 and a battery 1925 for supplying power to the system 1900. In some embodiments, the body 1901 further comprises an LED light 1919 for indicating that the body 1901 is powered on. In some embodiments, the earphones jack 1907 is a 3.5 mm jack. However, as will apparent to someone of ordinary skill in the art, the earphones jack 1907 is able to comprises any appropriately sized jack. In some embodiments, the charging port 1917 is a USB port. However, the charging port 1917 is able to comprise any appropriately sized charging port.

Figure 19A:
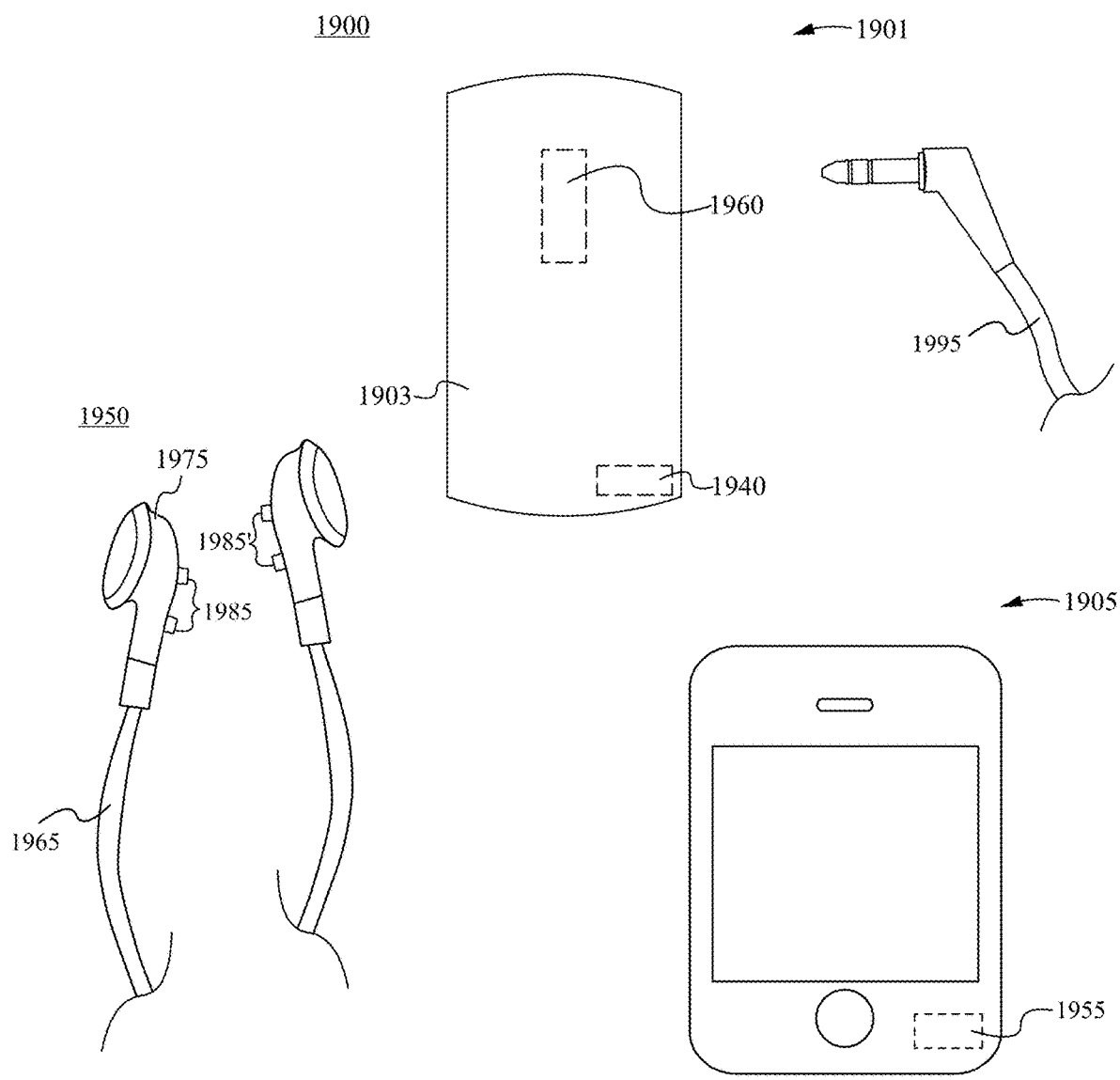
FIGS. 19A-19E illustrate a magnetic earphones holding system in accordance with some embodiments.
Figure 19E:
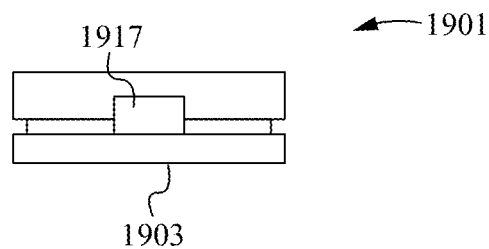
Figures 19B, 19C:
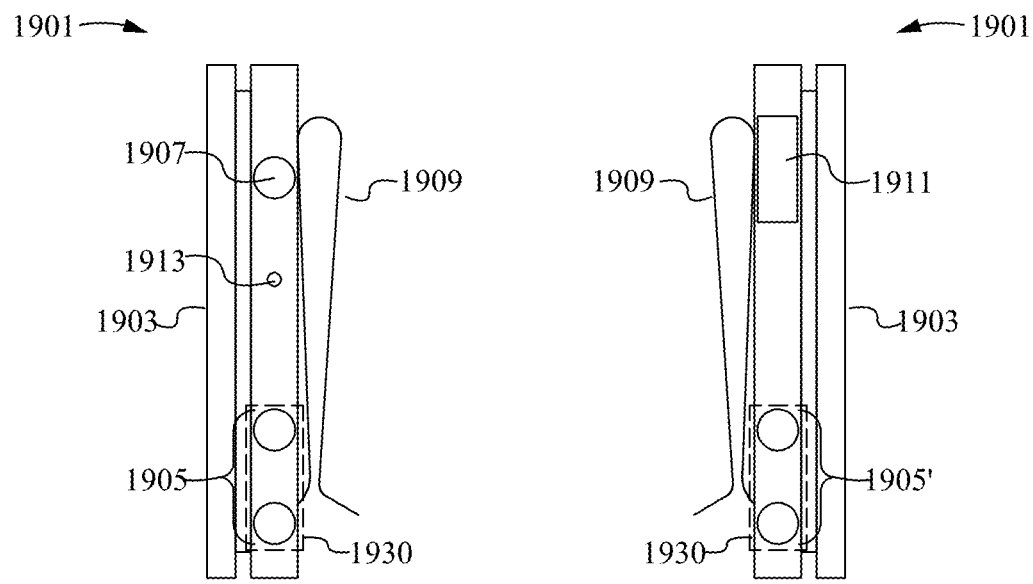
Figure 19D:
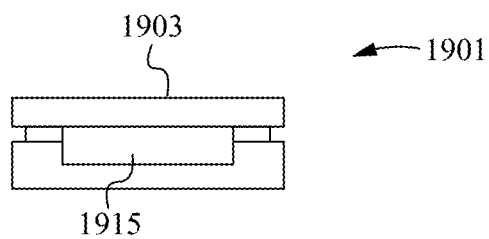
Figure 22:
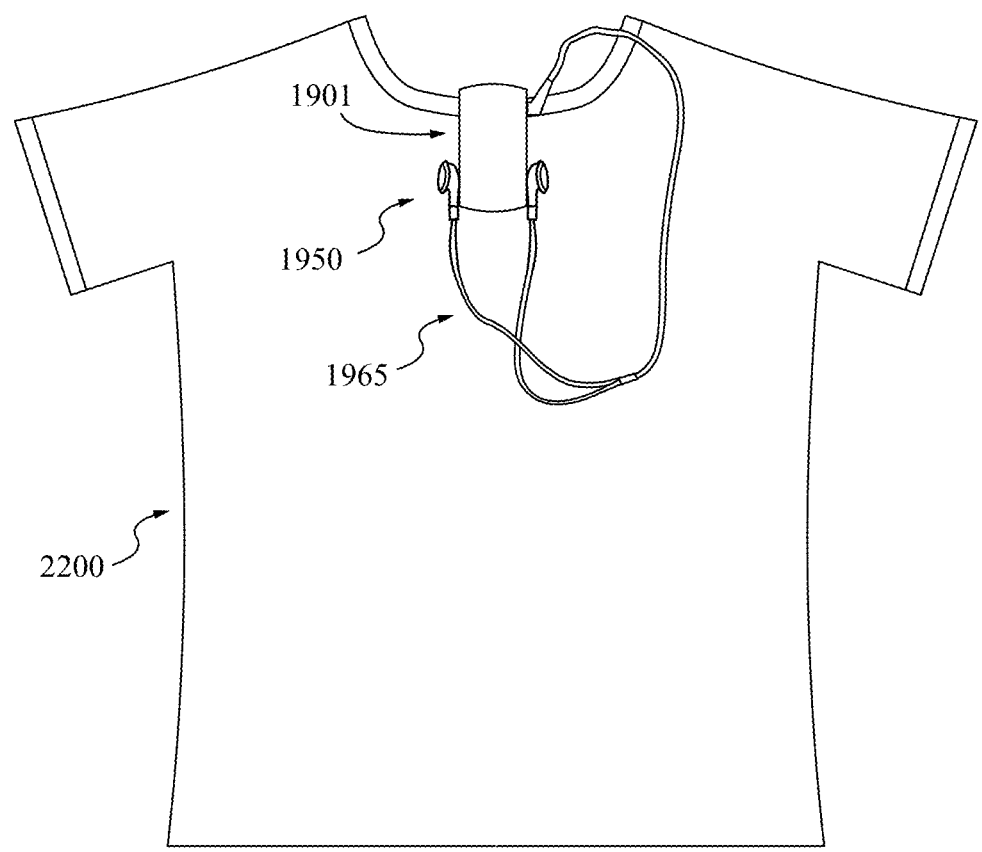
FIG. 22 illustrates a magnetic earphones holding system in accordance with some embodiments.

FIG. 22 illustrates the magnetic and cord holding system 1900 removably coupled to a shirt collar in accordance with some embodiments. The body 1901 of the system 1900 has been coupled to the shirt 2200 by using the clip 1909, as shown in FIGS. 19A and 19B. When using the clip 1909, a user is able to secure the body 1901 in a convenient, desired location. As will be apparent to someone of ordinary skill in the art, the body 1901 is able to be secured in any appropriate manner as known in the art. For example, in some embodiments, the body 1901 is coupled with a lanyard which is placed around a neck of a user in order to place the body 1901 in a convenient location.

Figure 23:
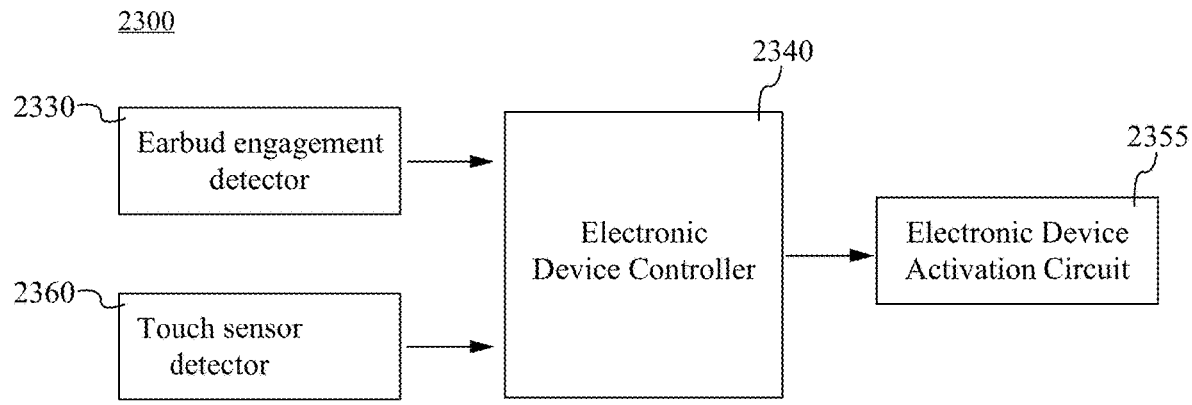
FIG. 23 illustrates a schematic view showing the components of a magnetic earphones and cord holding system in accordance with some embodiments.

FIG. 23 illustrates a schematic view showing the components of a magnetic earphones and cord holding system in accordance with some embodiments. As shown in FIG. 23, the magnetic earphones and cord holding system 2300 comprises an earbud engagement detector 2330, an electronic device controller 2340, and an electronic device activation circuit 355. As described above, the earbud engagement detector 2330 detects an engagement of an earbud with the one or more magnets of the body as shown in FIGS. 19A-19E. The earbud engagement detector 2330 sends a signal to the electronic device controller 340 based upon the engagement status of the earbud. The electronic device controller 2340 processes the signal it receives from the earbud engagement detector 2330 and sends a signal to the electronic device activation circuit 2355 which operates an electronic device in a manner dependent upon the signal from the electronic device controller 2340. In some embodiments, the electronic device controller 2340 sends a signal to the electronic device activation circuit 2355 to activate the electronic device. In some embodiments, the electronic device controller 2340 sends a signal to the electronic device activation circuit 2355 to deactivate the electronic device.

As further shown in FIG. 23, the magnetic earphones and cord holding system 2300 comprises a touch sensor detector 2360. The touch sensor detector detects a contact of the touch sensor 903 (FIG. 9A) and sends a signal to the electronic device controller 2340 based upon the contact with the touch sensor 903. The electronic device controller 2340 processes the signal it receives from the touch sensor detector 2360 and sends a signal to the electronic device activation circuit 2355 to operate an electronic device in a manner based upon the signal received from the electronic device controller 2340. In some embodiments, the electronic device controller 2340 sends a signal to the electronic device activation circuit 2355 to activate/de-activate the electronic device, turn up or turn down the volume, change the playing media, and/or change the program being operated by the electronic device.

Figure 24:
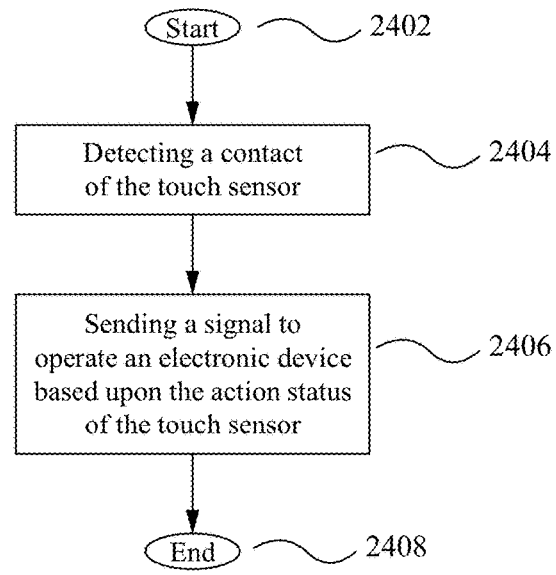
FIG. 24 illustrates a method of activating and/or deactivating an electronic device in accordance with some embodiments.

FIG. 24 illustrates a method of operating a magnetic earphones and cord holding system comprising a touch sensor in accordance with some embodiments. In the step 2404, a contact of a touch sensor is detected. For example, in some embodiments it is detected that the touch sensor is tapped, double-tapped, swiped in a sideways direction, and/or swiped in an up and down direction. Then, based upon the contact with the touch sensor, in the step 2406, a signal is sent to operate the electronic device. In some embodiments, the signal is one or more of an infrared, infrared laser, radio frequency, wireless, WiFi, and Bluetooth® signal. In some embodiments, the signal is a wired signal. In some embodiments, the signal is a signal to activate/de-activate the electronic device, turn up or turn down the volume, change the playing media, and/or change the program being operated by the electronic device.

The magnetic earphones and cord holding system enables a user to automatically activate and/or deactivate an electronic device and place the earphones in a convenient location when using the earphones and when not in use. Consequently, the earphones and cord holding system has the advantage of providing an inexpensive and easy way to hold a headset cord in a comfortable and convenient position while utilizing an electronic device. Additionally, the earphones and cord holding system is able to conserve power by ensuring that the electronic device is only activated when needed. Accordingly, the magnetic earphones and cord holding system described herein has numerous advantages.

In another aspect, a set of headphones and audio system comprises a first set of buttons for controlling a volume level of transmitted audio to the headphones and a second set of buttons for controlling a volume level of external audio played by the headphones. The transmitted audio comprises audio received from an audio source such as an electronic device and the external audio comprises surrounding ambient noise received by a microphone coupled to the headphones. With the first set of controls and the second set of controls a user is able to adjust the volume level of the transmitted audio and the volume level of the external audio in order to listen to the transmitted audio while still interacting with the surrounding environment. The set of headphones and audio system is able to be used with the magnetic earphones and cord holding system, such as described above.

Figure 25:
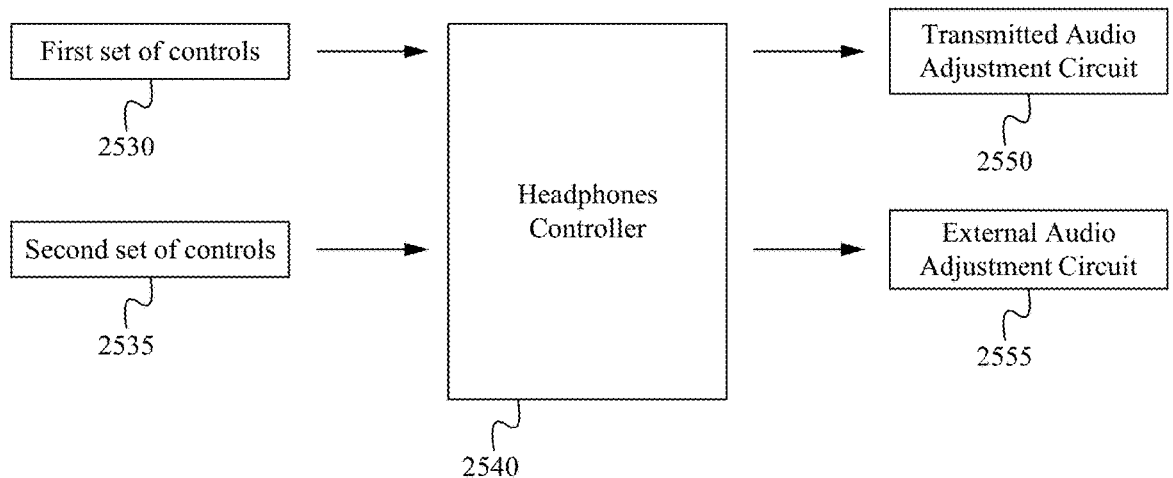
FIG. 25 illustrates a schematic view of an audio system in accordance with some embodiments.

Referring now to FIG. 25, a schematic view of an audio system is depicted therein. As shown within FIG. 25, the audio system 2500 comprises a first set of controls 2530, a second set of controls 2535, a headphones controller 2540, a transmitted audio adjustment circuit 2550 and an external audio adjustment circuit 2555. The first set of controls 2530 controls a transmitted audio to a set of headphones. The transmitted audio is transmitted from an electronic device, such as described above, or a similar audio player which plays audio through the headphones. Particularly, the headphones are able to receive transmitted audio from any appropriate device configured for use with headphones. The second set of controls 2535 controls an external audio received from a microphone coupled to the headphones. Particularly, the second set of controls 2535 is able to adjust a volume of surrounding ambient nose received by the microphone and played through the headphones.

The first set of controls 2530 and the second set of controls 2535 send a signal to the headphones controller 2540. The headphones controller 2540 processes the signals from the first set of controls 2530 and the second set of controls 2535 and sends a signal to one or both of the transmitted audio adjustment circuit 2550 and the external audio adjustment circuit 2555. For example, in some embodiments, the first set of controls 2530 sends a signal to the headphones controller 2540 to adjust a volume of the transmitted audio received through the headphones. The headphones controller 2540 processes the signal from the first set of controls 2530 and sends a signal to the transmitted audio adjustment circuit 2550 to turn up or turn down the volume of the transmitted audio. In some embodiments, the second set of controls 2535 sends a signal to the headphones controller 2540 to adjust a volume of the external audio received by the microphone and played through the headphones. The headphones controller 2540 processes the signal from the second set of controls 2535 and sends a signal to the external audio adjustment circuit 2555 to turn up or turn down the volume of the external audio received by the microphone and played through the headphones.

The first set of controls 2530 and the second set of controls 2535 enable a user to precisely set a volume level of transmitted audio and external audio played through the headphones. For example, a user is able to use the second set of controls 2535 to adjust the level of ambient noise to zero and/or off so that the headphones are isolated from the surrounding ambient noise of the external environment. Alternatively, the second set of controls 2535 may be used to adjust the level of ambient noise to a level where the user is able to have a conversation or clearly hear outside noises while still wearing the headphones. Particularly, the first set of controls 2530 and the second set of controls 2535 are able to adjust the level of transmitted audio and the level of external audio played by the headphones to an acceptable level as desired by the user.

In some embodiments, the audio system 2500 comprises a magnetic earphones and cord holding system, such as described above and the first set of controls 2530 and the second set of controls 2535 comprise touch screen controls of the touch sensor 1903 (FIG. 19). Additionally, in some embodiments, the first set of controls 2530 comprises a first set of buttons and the second set off controls 2535 comprises a second set of buttons. In some embodiments, the first set of controls 2530 and the second set of controls 2535 are a component of the headphones and/or headphones cord. In some embodiments, the headphones comprise a noise canceling element.

Figure 26:
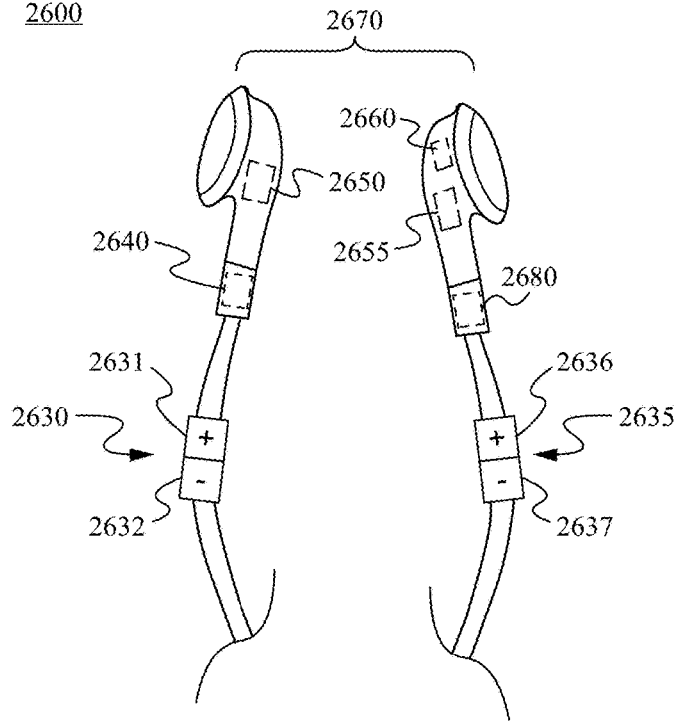
FIG. 26 illustrates a set of headphones in accordance with some embodiments.

FIG. 26 illustrates a set of headphones in accordance with some embodiments. The set of headphones comprises a set of earphones 2670 for playing transmitted audio and external audio received through a microphone 2660. As shown in FIG. 26, the earphones 2670 comprise a set of earbuds designed to be worn within the ears of the user. However, the earphones 2670 are able to comprise over the ear headphones or other design as appropriately desired. As described above, in some embodiments, the transmitted audio is received from a electronic or other device transmitting audio.

As further shown in FIG. 26, the headphones 2600 comprise a first set of controls 2630, a second set of controls 2635, a headphones controller 2640, a transmitted audio adjustment circuit 2650 and an external audio adjustment circuit 2655. Although the first set of controls 2630, the second set of controls 2635, the headphones controller 2640, the transmitted audio adjustment circuit 2650 and the external audio adjustment circuit 2655 are shown coupled to separate components of the headphones 2600, the first set of controls 2630, the second set of controls 2635, the headphones controller 2640, the transmitted audio adjustment circuit 2650 and the external audio adjustment circuit 2655 may be coupled together and/or separately as appropriately desired. In some embodiments, the first set of controls 2630, the second set of controls 2635 are touch screen controls used with a magnetic earphones and cord holding system, such as described above.

In some embodiments, the first set of controls 2630 comprises a first button 2631 for raising the volume of the transmitted audio and a second button 2632 for lowering the volume of the transmitted audio. Similarly, the second set of controls 2635 comprises a first button 2636 for raising the volume of the transmitted audio and a second button 2637 for lowering the volume of the external audio received by the microphone 2660 and played through the headphones 2600. In some embodiments, the first set of controls 2630 and the second set of controls 2635 comprise touch screen controls. In some embodiments, the headphones 2600 comprise a noise canceling element 2680.

As described above, the first set of controls 2630 and the second set of controls 2635 send a signal to the headphones controller 2640. The headphones controller 2640 processes the signals from the first set of controls 2630 and the second set of controls 2635 and sends a signal to one or both of the transmitted audio adjustment circuit 2650 and the external audio adjustment circuit 2655. For example, in some embodiments, the first set of controls 2630 sends a signal to the headphones controller 2640 to adjust a volume of the transmitted audio received through the headphones. The headphones controller 2640 processes the signal from the first set of controls 2630 and sends a signal to the transmitted audio adjustment circuit 2650 to turn up or turn down the volume of the transmitted audio. In some embodiments, the second set of controls 2635 sends a signal to the headphones controller 2640 to adjust a volume of the external audio received by the microphone and played through the headphones. The headphones controller 2640 processes the signal from the second set of controls 2635 and sends a signal to the external adjustment circuit 2655 to turn up or turn down the volume of the external audio received by the microphone and played through the headphones.

The first set of controls 2630 and the second set of controls 2635 enable a user to precisely set a volume level of transmitted audio and external audio played through the headphones. For example, a user is able use the second set of controls 2635 to adjust the level of ambient noise to zero and/or off so that the headphones are isolated from the surrounding ambient noise of the external environment. Alternatively, the second set of controls 2635 may be used to adjust the level of ambient noise to a level where the user is able to have a conversation or clearly hear outside noises while still wearing the headphones. Particularly, the first set of controls 2630 and the second set of controls 2635 are able to adjust the level of transmitted audio and the level of external audio played by the headphones to an acceptable level as desired by the user.

In some embodiments, the first set of controls 2630 is able to control the volume of transmitted audio from a plurality of devices simultaneously. For example, in some embodiments, the headphones 2600 are able to be connected to two separate external devices, such as an iPhone and an iPad. The user is watching TV on the iPad while performing a task and listening to the iPad through the headphones 2600. If a phone call comes, then the TV show is not interrupted by the phone call. The user is then able to listen to both the TV show and the phone call through the earphones. One or more volume controls such as the first set of volume controls 2630 is able to be used to balance the volume for each. Particularly, if the headphones 2600 are wirelessly connected to a plurality of devices such as a telephone and a set of speakers then the user is able to listen to the plurality of devices and use the first set of controls 2630 to adjust a level of transmitted audio from the telephone while at the same time adjusting a volume of the speakers. As will be understood by someone of ordinary skill in the art, the headphones 2600 are able to wirelessly connect to any appropriate number and type of devices as desired.

Figure 27:
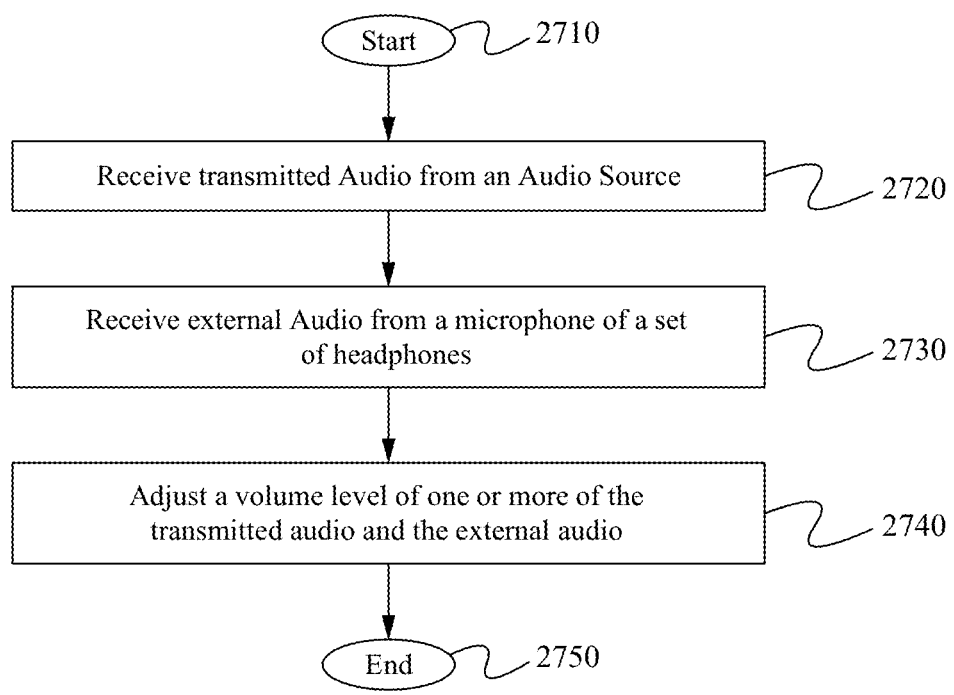
FIG. 27 illustrates a method of operating a set of headphones in accordance with some embodiments.

FIG. 27 illustrates a method of operating a set of headphones in accordance with some embodiments.

The method begins in the step 2710. In the step 2720, audio is received from an electronic device. As described above, the transmitted audio is transmitted from an electronic device, such as described above, or a similar audio player which plays audio through the headphones. In the step 2730, external audio is received from a microphone coupled to the set of headphones. Then, in the step 2740 a volume level of one or more of the transmitted audio and the external audio is adjusted to a level as desired by the user. In some embodiments, a first set of controls and a second set of controls enable a user to precisely set a volume level of transmitted audio and external audio played through the headphones. In some embodiments, the first set of controls and the second set of controls comprise touch screen controls. Alternatively, in some embodiments, the first set of controls comprises a first set of buttons and the second set off controls comprises a second set of buttons. The first set of controls and the second set of controls are able to be coupled to the headphones and/or a magnetic headphones holder as described above. The method ends in the step 2750.

In use the set of headphones comprising a microphone for receiving ambient surrounding noise enables a user to adjust the amount of ambient noise played through the headphones. Using a set of controls the level of ambient noise may be turned all the way off in order to be isolated from surrounding ambient noises while only listening to transmitted music. Alternatively, the ambient noise may be turned to a level that allows the user to interact with the surrounding environment while still wearing the headphones and listening to the transmitted music.

With the headphones, a user is able to go for a bike ride or a run while listening to music while still hearing the surrounding traffic and other ambient noises. Additionally, if a user needs to interact with another person they only need to increase the level of ambient noise in order to hear the other person and carry on a conversation. The headphones enable a user to interact with the surrounding environment without removing the earphones and interrupting the audio experience. Particularly, the user is able to carry out everyday tasks while listening to music or other audio while maintaining contact with surrounding environment and other persons. Accordingly, the set of headphones comprising a microphone for receiving surrounding ambient noise as described herein has many advantages.

Figure 28:
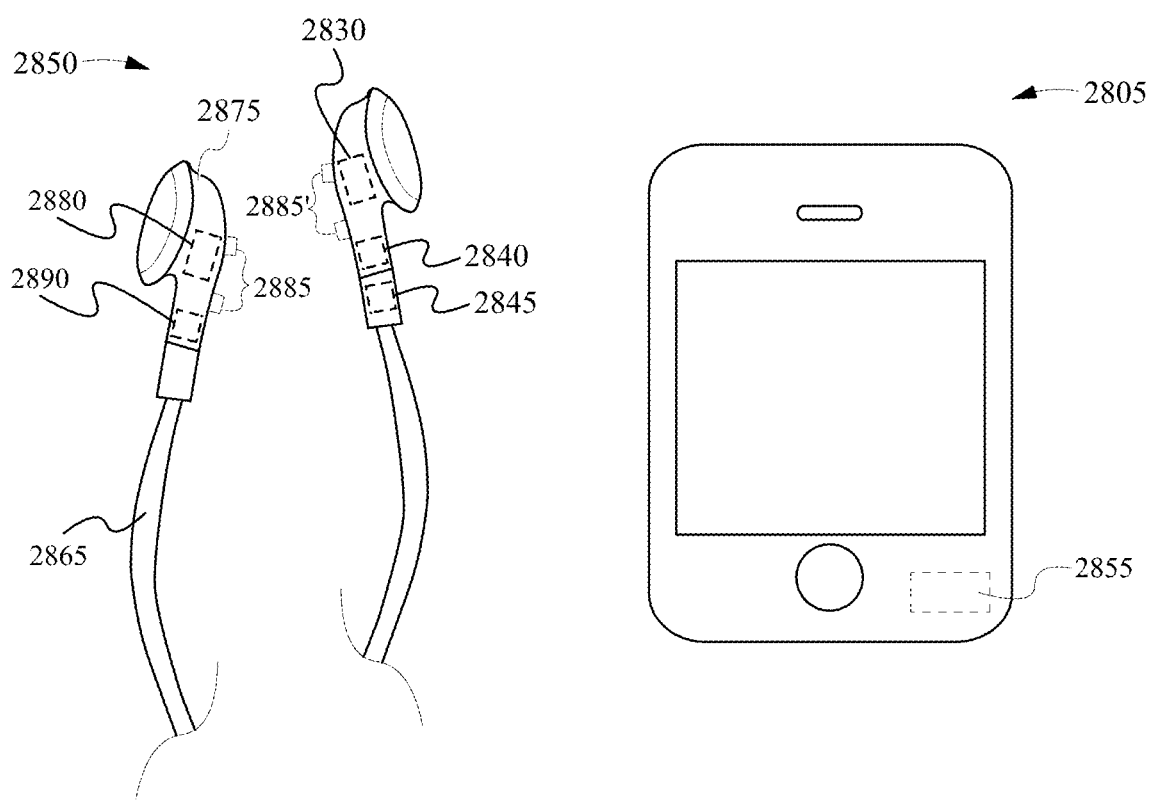
FIG. 28 illustrates a set of headphones in accordance with some embodiments.

In some embodiments, the components of a magnetic earphones and cord holding system are implemented within a set of earphones without the use of a base unit. In these embodiments, rather than utilizing a base unit, the earphones themselves are able to link with an electronic device. Referring now to FIG. 28, an audio system is depicted therein. The audio system 2800 comprises a set of earphones 2850 comprising one or more magnets 2885 and 2885', an earbud engagement detector 2830 and an electronic device controller 2840. The one or more magnets 2885 and 2885' are configured to couple and decouple with one of a magnet and a magnetically attractable surface. In some embodiments, the one or more magnets 2885 and the magnets 2885' are configured to removably couple with each other. The electronic device controller 2840 receives a signal from the earbud engagement detector 2830 and sends a signal to the electronic device activation circuit 2855 based upon the signal received from the earbud engagement detector 2830. The electronic device activation circuit 2855 operates an electronic device 2805 based upon the signal received from the controller 2840. In some embodiments, the electronic device 2805 comprises a phone, a tablet, or a watch. However, the earphones can be configured to control any appropriately desired electronic device. For example, in some embodiments, the electronic device controller 2840 is configured to send a signal to a stereo or television set and/or an audio receiver.

In some embodiments, the earbud engagement detector 2830 detects an engagement and a disengagement of the one or more magnets 2885 and 2885' with one of a magnet and a magnetically attractable surface and sends a signal to the electronic device controller 2840. The electronic device controller 2840 processes the signal from the earbud engagement detector 2830 and sends a signal to the electronic device activation circuit 2855 which operates an electronic device 2805. The electronic device controller 2840 is coupled to receive and send an activation signal when one or more of the set of earphones are decoupled from one of a magnet and a magnetically attractable surface and the electronic device controller receives and sends a deactivation signal when one or more of the set of earphones are coupled to one of a magnet and a magnetically attractable surface. In some embodiments, the electronic device controller 2840 is able to send a signal to activate/de-activate the electronic device, turn up or turn down the volume, change the playing media, and/or change the program being operated by the electronic device 2805. Particularly, the electronic device controller 2840 is able to send any appropriate desired control signal to the electronic device 2805, such as described above.

In some embodiments, the earbud engagement detector 2830 sends a signal to the controller 2840 that the one or more magnets 2885 and the earbud 2875 have been decoupled. In these embodiments, upon receiving the signal from the earbud engagement detector 2830, the controller 2840 sends a signal to the electronic device activation circuit 2855 to activate the electronic device 2805. In some embodiments, the earbud engagement detector 2830 sends a signal to the controller 2840 that the one or more magnets 2885 and the earbud 2875 have been coupled with a magnet or a magnetically attractable surface. In these embodiments, upon receiving the signal from the earbud engagement detector 2830, the controller 2840 sends a signal to the electronic device activation circuit 2855 to deactivate the electronic device 2805.

In some embodiments, the signal sent by the electronic device controller 2840 to the electronic device activation circuit 2855 and the signal sent by the electronic device activation circuit 2855 to the electronic device 2805 comprise one or more of infrared, infrared laser, radio frequency, wireless, WiFi, and Bluetooth®. However, the signal sent by the electronic device controller 2840 and the electronic device activation circuit 2855 are able to comprise any wireless signal as known in the art. Alternatively, in some embodiments, the signal sent by the electronic device controller 2840 and the electronic device activation circuit 2855 comprise a wired signal.

In further embodiments, the set of earphones 2800 comprises an ambient noise detector 2880. The ambient noise detector 2880 is configured to detect a noise external to the earphones 2800 while the earphones are being worn in the user's ears. The ambient noise detector 2880 detects the external noise and sends a signal to the controller 2840, which processes the signal from the ambient noise detector 2880 and sends a signal to the electronic device activation circuit 2855, which operates the electronic device 2805. In some embodiments, the ambient noise detector 2880 is configured to detect a noise which is above a certain decibel level. For example, the ambient noise detector 2880 is able to detect a noise above an established background noise level. In response, the ambient noise detector 2880 sends a signal to the controller 2840, which processes the signal from the ambient noise detector 2880 and sends a signal to the electronic device activation circuit 2855 to turn off and/or turn down a volume of media being played through the earphones. Consequently, the detection of a strong voice signal or other ambient noise is then heard through the device. Particularly, the ambient noise detector 2880 is able to detect when the earphones user is being spoken to and correspondingly enable the volume to be lowered and/or shut off so that the user may carry on a conversation. Additionally, the ambient noise detector 2880 is able to detect other ambient noises such as car horns and other traffic noise so that the user may be alerted to hazards and other circumstances that may require a greater concentration.

As also shown in FIG. 28, in some embodiments, the set of earphones 2800 comprises a spoken language translator 2890. In these embodiments, the translator 2890 is able to detect an external that is spoken in a certain language. Based upon the detected language, the translator 2890 then may send a signal to the controller 2840, which processes the signal from the translator 2890 and send a signal to the electronic device 2805 which is able to translate the detected phrase and send a signal to the earphones 2800 to play the translated phrase through the earbuds. Additionally, although the ambient noise detector 2880 and the translator 2890 are shown implemented within the set of earphones, the ambient noise detector 2880 and the translator 2890 may be implemented within a touch sensor and body, or other control device such as described above.

The signal from the ambient noise detector 2880 and the translator may be processed and analyzed using any appropriately desired processor. Particularly, the processor may be located within the earphones 2800 such as the processor 2845. Additionally, the processor may function as a component of the touch sensor and body, or other control device such as described above.

Figure 29:
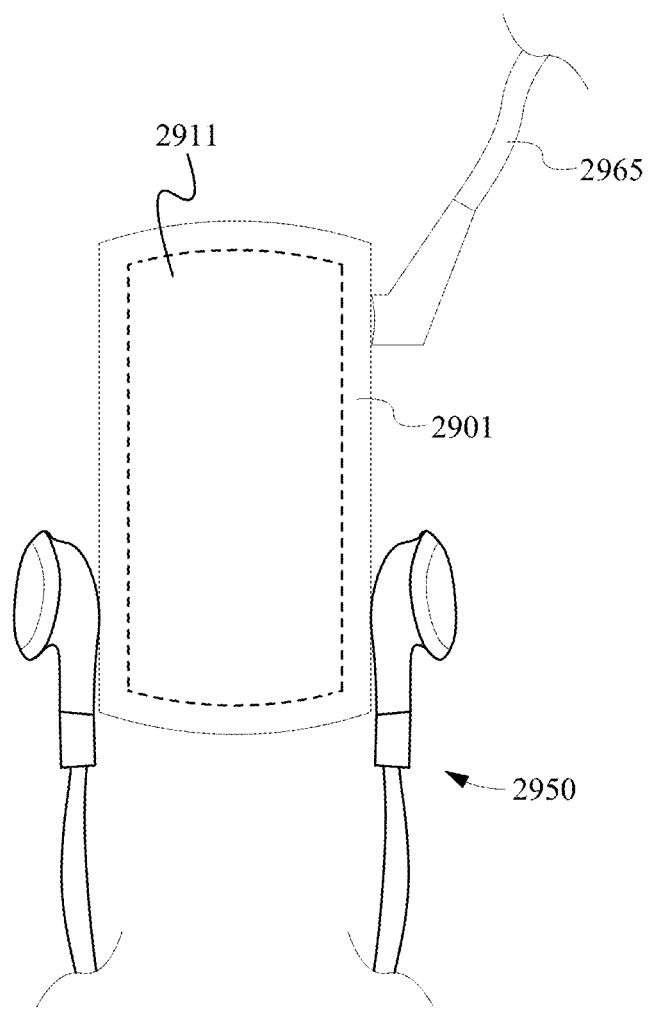
FIG. 29 illustrates a magnetic earphones holding system in accordance with some embodiments.

In some embodiments, a touch sensor and body, such as described above in relation to the system 1900, are customizable. As shown within FIG. 29, the holder body 2901 comprises a customizable front face 2911. The customizable front face 2911 is able to be deposited upon a top of the touch screen controller that is used to control an electronic device, such as described above. The touch screen controller may be used to control an electronic device such as a phone, a tablet, and a watch. Alternatively, the touch screen controller may be used to control any appropriately desired electronic device, such as described above. In some embodiments, the electronic device is used to customize the front face 2911. For example, in some embodiments, the electronic device is used to take a picture which is uploaded to the body 2901 and displayed on the front face 2911. In further embodiments, such as described above, one or more magnetically attractable surfaces are configured to removably couple with one or more earbuds of the earphones 1950. The body is 2901 is also able to comprise a groove for holding the cord 1965 of the earphones 1950.

Figure 30:
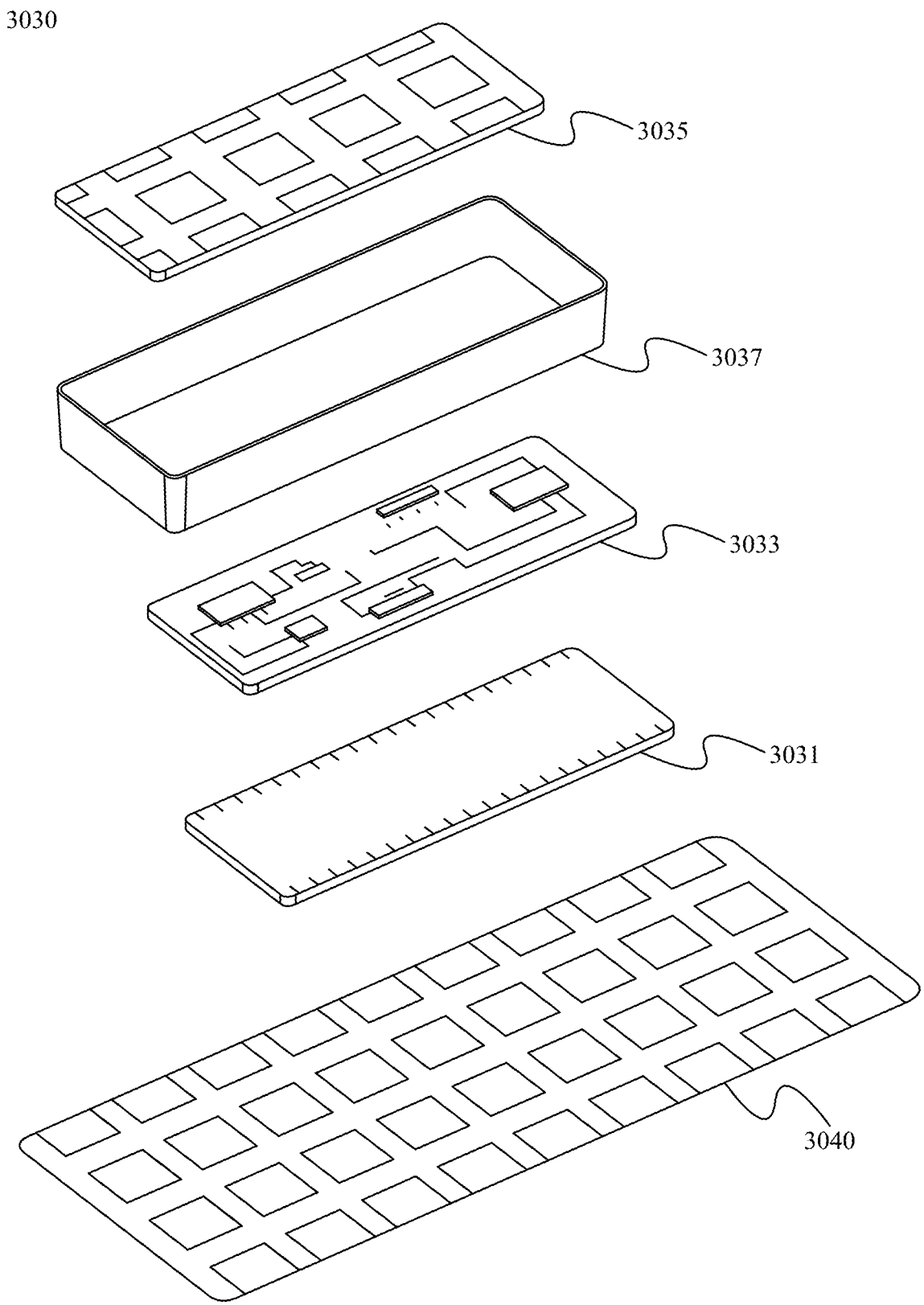
FIG. 30 illustrates a customizable electronic device in accordance with some embodiments.

In some embodiments, a lower surface of the body 2901 is pressed against a surface to transfer an image of the surface to the front face 2911. A system for customizing an electronic device is shown in FIG. 30. The system 3030 comprises an upper surface 3035, a lower surface 3031, a circuit board 3033 comprising the interior components of the system 3030 and a casing 3030 for the system. In some embodiments, the lower surface 3031 is pressed against a surface such as a patterned fabric 3040, image data relating to the surface is collected by using fiber optics. The image data is collected and transferred to the upper surface 3035 where the image may be displayed. In some embodiments, the image comprises a pattern or color of the surface 3040.

Thus, when the body is placed next to or on a top of the surface 3040 the system 3030 effectively blends in with the bottom surface 3040.

Figure 31:
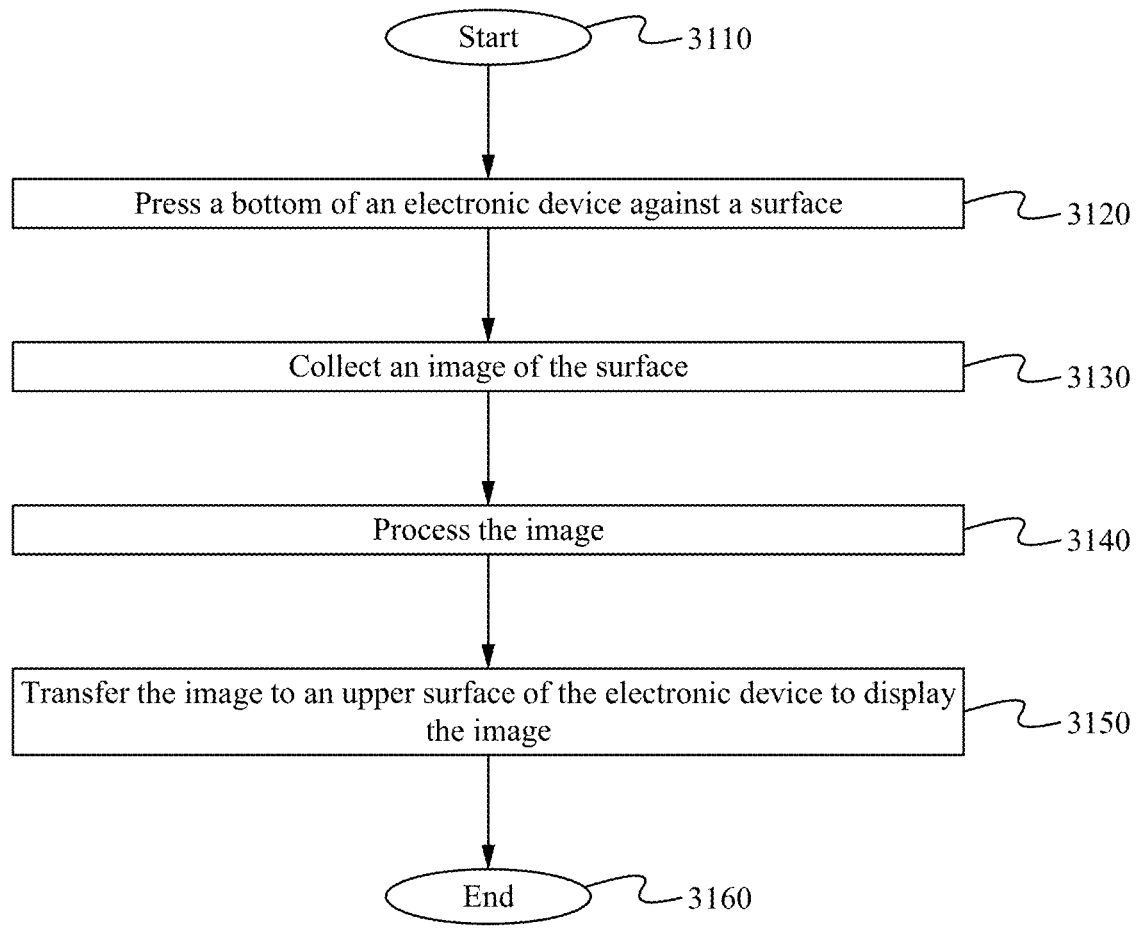
FIG. 31 illustrates a method of customizing an electronic device in accordance with some embodiments.

FIG. 31 illustrates a method of customizing an electronic device in accordance with some embodiments. The method begins in the step 3110. In the step 3120, a bottom of an electronic device is placed against a surface, and in the step 3120 the electronic device is used to collect an image of the surface. As described above, in some embodiments, fiber optics of the electronic device are used to collect the image. Particularly, a rear or bottom panel of the electronic device is able to comprise fiber optic material which collects the image of the surface. In the step 3140, the image is processed and in the step 3150 the image is transferred to an upper surface or upper panel of the electronic device where it is displayed. The method ends in the step 3160. The electronic device is able to be laid on a patterned or other surface and that pattern is then transferred to the upper surface of the electronic device where it can be displayed. In this manner, the electronic device would seemingly blend in and disappear with the surface. The upper surface of the device would look like the color or pattern of the surface.

The magnetic earphones enable a user to automatically activate and/or deactivate an electronic device and place the earphones in a convenient location when using the earphones and when not in use. Consequently, the earphones have the advantage of providing an inexpensive and easy way to hold a headset cord in a comfortable and convenient position while utilizing a customizable electronic device. Further, because the electronic device is able to be customized it is able to blend in with its background such as when worn with specific clothing. In this manner it is able seemingly disappear and provide a pleasing aesthetic to the user. Accordingly, the magnetic earphones and customizable electronic device as described herein has numerous advantages.

In another aspect, one or more sensors are configured to contextualize a series of user generated movements to control one or more electronic devices. For example, a set of earphones is able to comprise one or more sensors for sensing a location of the earphones. The one or more sensors enable earphones such as a pair of bluetooth earphones wirelessly connected to a bluetooth enabled electronic device, the capability to understand the configuration of use of the earphones. Based on a location and use or non-use of the earphones, one or more contextual responses is able to be applied for a given action. In addition, a garment comprises one or more sensors for sensing a motion of a user as the garment is being used. The one or more sensors allow the user to control one or more electronic devices through a series of user generated movements.

Figure 32:
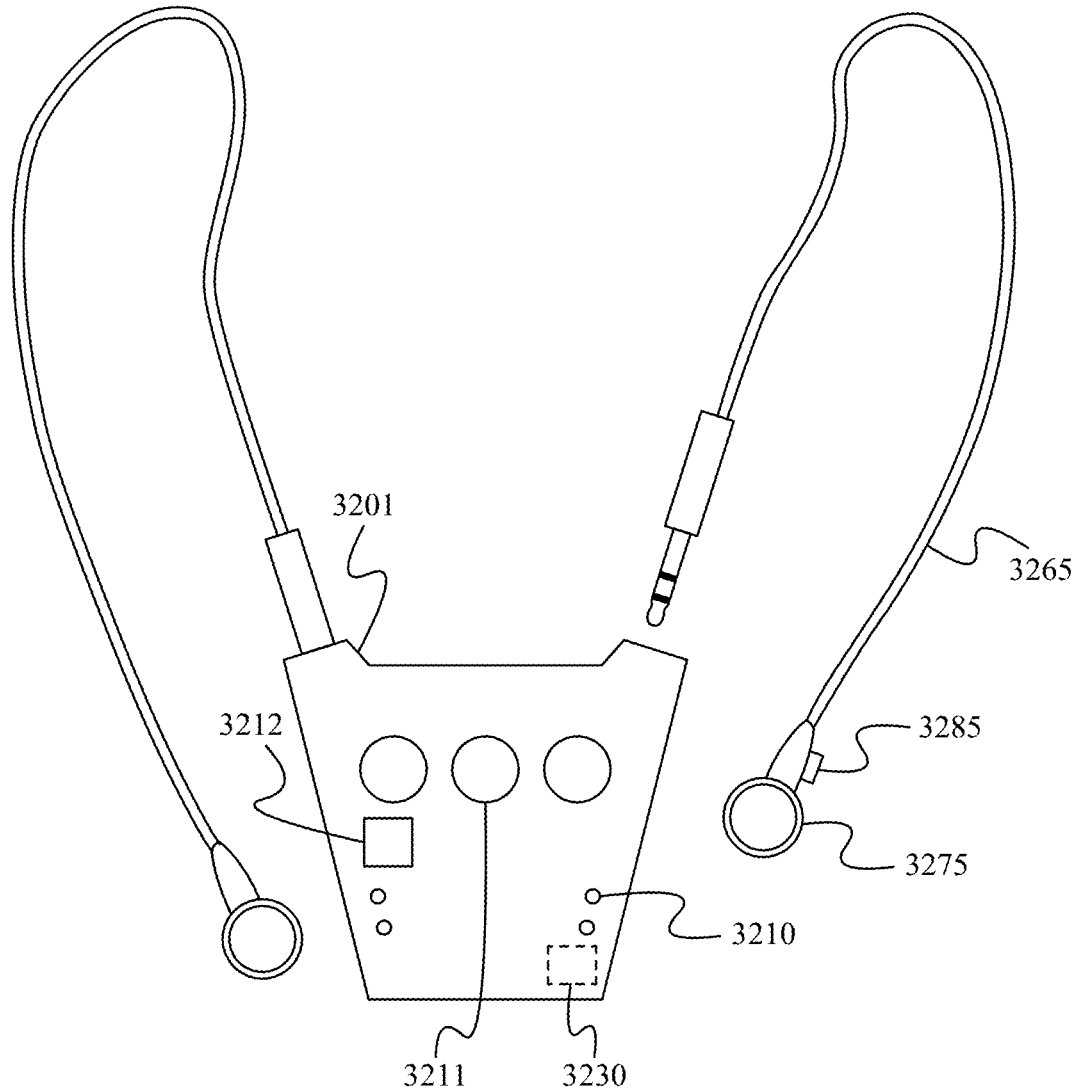
FIG. 32 illustrates an earphones system in accordance with some embodiments.

Referring now to FIG. 32, an earphones system 3200 is shown therein. The system comprises a set of earphones 3275 and cord 3265 coupled to a mounting base 3201. The mounting base 3201 is configured to releasably receive the earphones 3275. The earphones 3275 are electrically coupled to a remotely located electronic device. In some embodiments, the earphones 3275 are coupled with the electronic device with a bluetooth connection. In some embodiments, the earphones comprise a magnet 3285 and the base 3201 comprises a magnetically attractable surface 3210 for releasably receiving the magnet 3285 and earphones 3275. Based on an attachment or non-attachment of the earphones 3275 with the mounting base 3201, as sensed by an earphones engagement detector 3230, a wireless control device 3240 sends a signal to the electronic device to route sound through an external speaker 3212 of the mounting base 3201 or through the earphones 3275. As shown within FIG. 32, in some embodiments, the mounting base 3201 comprises one or more volume buttons 3211 for controlling a volume of sound routed through an external speaker 3212 of the mounting base 3201 and/or the earphones 3275. In some embodiments, the mounting base 3201 is configured to be held by an item of clothing, a bag, or other appropriately desired item. In some embodiments, the earphones 3275 are able to releasably couple to the mounting base 3201 and/or an opposing earphone. In some embodiments, the mounting base 3201 comprises a controller for controlling one or more functions of the earphones 3275. In some embodiments, the mounting base 3201 comprises a bluetooth base unit.

When the earphones 3275 are coupled to the base 3201, the system 3200 knows that the earphones 3275 are not currently being used by a user. In this case, audio prompts are routed through the external speaker 3212 of the mounting base 3201 rather than the wirelessly connected earphones 3275. For example, if audio prompts are used by an electronic device to guide the user through a device pairing procedure for pairing with the earphones 3275, rather than routing those instructions through the earphones 3275 (not in use) the system 3200 routes the instructions to the speaker 3212 and/or use a different method of prompting the user.

A set of earphones comprising one or more sensors for sensing a location of the earphones are able to comprise bluetooth earphones or earphones that are directly connected to an electronic device with a cord for more appropriately routing audio notifications such as an incoming call. Users currently have a challenge in that when the earphones are coupled to the electronic device, the electronic device no longer provides an external notification for an incoming call when the earphones are connected but not in the user's ears. This results in missed calls and/or other missed notifications. The attachment of the earphones 3275 with the base 3201 and/or an opposing earphone contextualizes a use of the earphones 3275 to know when the earphones 3275 are being used. This enables a notification from the electronic device to be appropriately routed so that it is received by a user.

Figure 33:
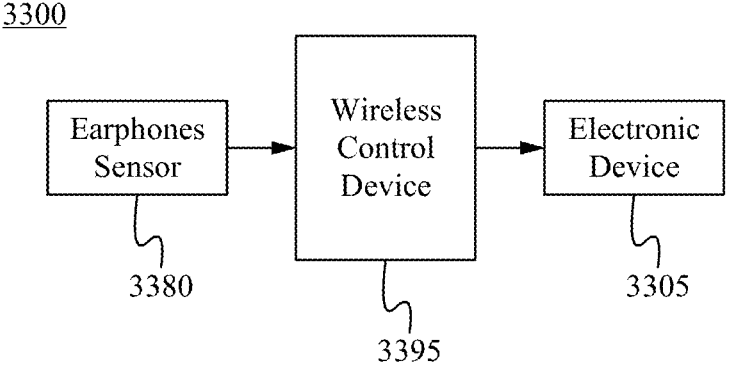
FIG. 33 illustrates an earphones system in accordance with some embodiments.

In another aspect, the earphones are able to comprise one or more sensors for sensing a location of the earphone and a wireless control device for sending a signal to an electrically coupled electronic device based on a location of the earphones. FIG. 33 illustrates an earphones system 3300. The earphones system comprises one or more earphones sensors 3380 and a wireless control device 3395 for sending a signal to an electronic device 3305 based on a location of the earphones. The electronic device 3305 is able to comprise a bluetooth base unit and/or a bluetooth enabled device.

The earphones are electrically coupled to the remotely located electronic device 3305. In some embodiments, the earphones are coupled with the electronic device with a bluetooth connection. Based on a non-use or use of the earphones, the wireless control device 3395 sends a signal to the electronic device to route sound through an external speaker of the electronic device 3305 or through the earphones. In some embodiments, the one or more sensors 3380 are able to contextualize a use or non-use of the earphones based upon a movement of the one or more sensors 3380 and/or the one or more sensors 3380 determining that the earphones are in the ears of a user. In some embodiments, the one or more sensors 3380 comprise one or more movable sensors.

Figure 34A:
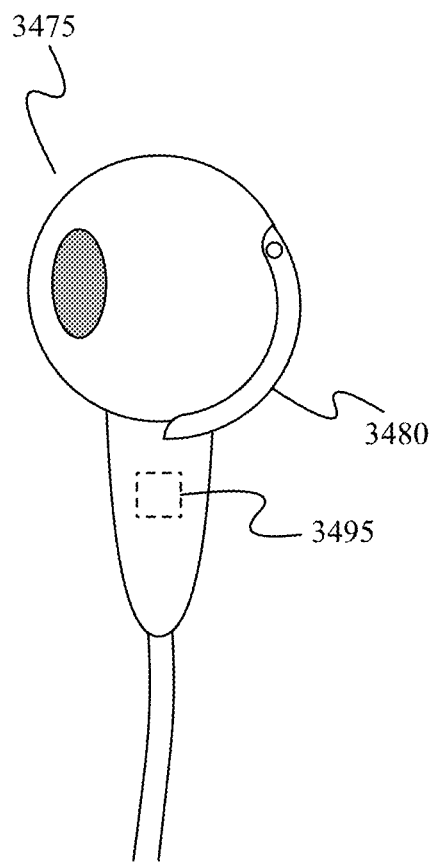
FIGS. 34A and 34B illustrate a set of earphones in accordance with some embodiments.
Figure 34B:
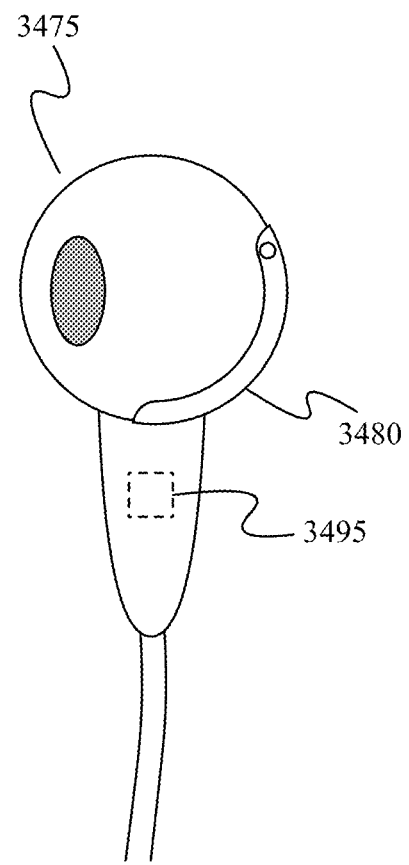

FIGS. 34A and 34B illustrate a set of earphones 3475 comprising one or more movable sensors 3480 for sensing a non-use and a use of the earphones 3475. As shown within FIG. 34A, the one or more sensors 3480 are in an open position, such as when the earphones 3475 are not being used. FIG. 34B illustrates the one or more sensors 3480 in a closed position such as when the earphones 3475 are being used. The wireless control device 3495 is configured to send a signal to a remotely connected electronic device, such as described above, based on a position of the one or more movable sensors 3480. Based on the position of the one or more movable sensors 3480, the wireless control device 3495 sends a signal to the electronic device to route sound through an external speaker of the electronic device or through the earphones 3475.

The one or more sensors 3480 are able to be added onto a portion of the earphones 3475 that are worn in the ear. The one or more sensors 3480 are able to comprise any appropriately desired configuration. In some embodiments, a flexible rubber canal insert of the earphones comprises one or more sensors that registers a deformation of the rubber as the earphones 3475 being used. Alternatively, in some embodiments, the earphones 3475 comprise a hard plastic exterior with a touch sensor embedded within the earphones 3475. In further embodiments, the earphones 3475 comprise a switch that is compressed when the earphones 3475 are inserted into the ears to indicate that the earphones are being used. The wireless control device 3495 sends a signal to a connected electronic device based on a use of the earphones 3475. In some embodiments, the one or more sensors 3480 help hold the earphones within the ears of the user.

In addition to sensing a non-use and use of the earphones 3475, the one or more sensors 3480 also conserve energy. For example, if it is determined that the earphones 3475 are not being used, electricity does not need to be used to drive sound through the earphones 3475. Alternatively, if it is determined that the earphones 3475 are being used, electricity does need to be used to drive sound through an external speaker of the connected electronic device. Although this may be a small amount of electricity, smaller and thinner earphones as well as smaller and thinner electronic devices use less energy with smaller batteries. As the earphones 3475 become smaller, the fraction of energy required to drive sound through the speaker of the earphones 3475 increases, especially where high sound quality through larger diameter speakers is desired. This is also the case where active noise reduction is in use because it requires additional sound collection and processing. Thus, reducing the time that energy is consumed while the user is not actually using the earphones acts to reduce overall energy consumption because energy is directed to the earphones only when the earphones are being used.

Figure 35A:
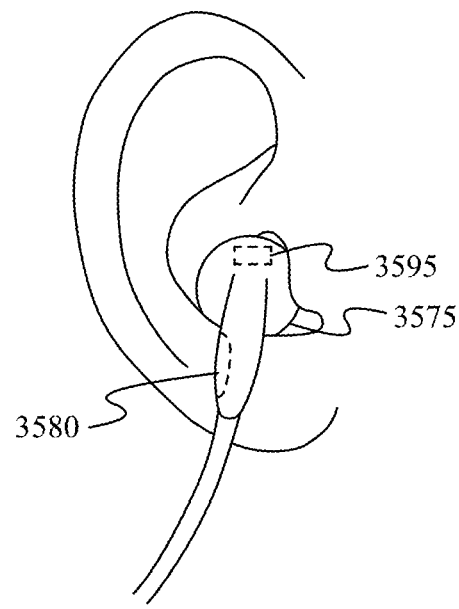
FIGS. 35A-35C illustrate a set of earphones in accordance with some embodiments.
Figure 35B:
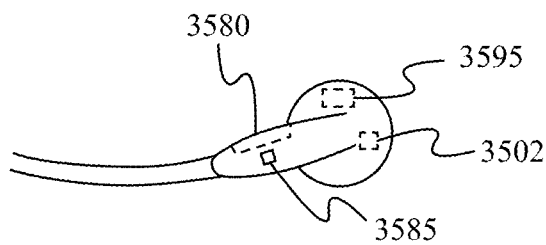
Figure 35C:
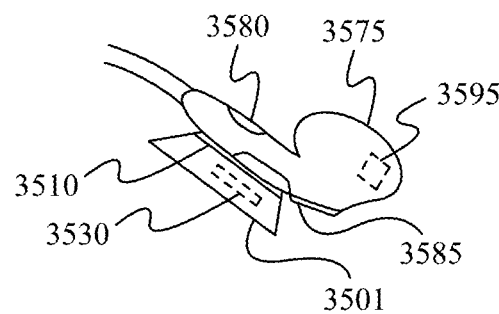

As shown within FIGS. 35A-35C, in some embodiments, a set of earphones 3575 comprises a touch sensor 3580 that is configured to sense a touching of an ear lobe when worn by a user. Based on an activation of the touch sensor 3580 as it touches the earlobe, the wireless control device 3495 is configured to send a signal to a remotely connected electronic device, such as described above, that the earphones 3575 are being used. Consequently, the electronic device is then able to route sound through the earphones 3575 as they are being used. As shown within Figured 35B, in some embodiments, the earphones comprise an accelerometer for sensing a motion of the earphones 3575, such as described below. Additionally, as shown within FIG. 35C, in some embodiments, the earphones 3575 comprise one or more magnets 3585 for releasably coupling with a magnetically attractable surface 3510 of a mounting base 3501. An earphones engagement detector 3530 is able to send a signal to the electronic device based on an engagement of the earphones 3575 with the mounting base 3501. As described above, when the earphones 3275 are coupled to the base 3201 the system knows that the earphones are not currently being used by a user. In this case, audio prompts from the electronic device are routed through an external speaker of the mounting base 3201 and/or an external speaker of the electronic device rather than the earphones 3275.

Figure 36:
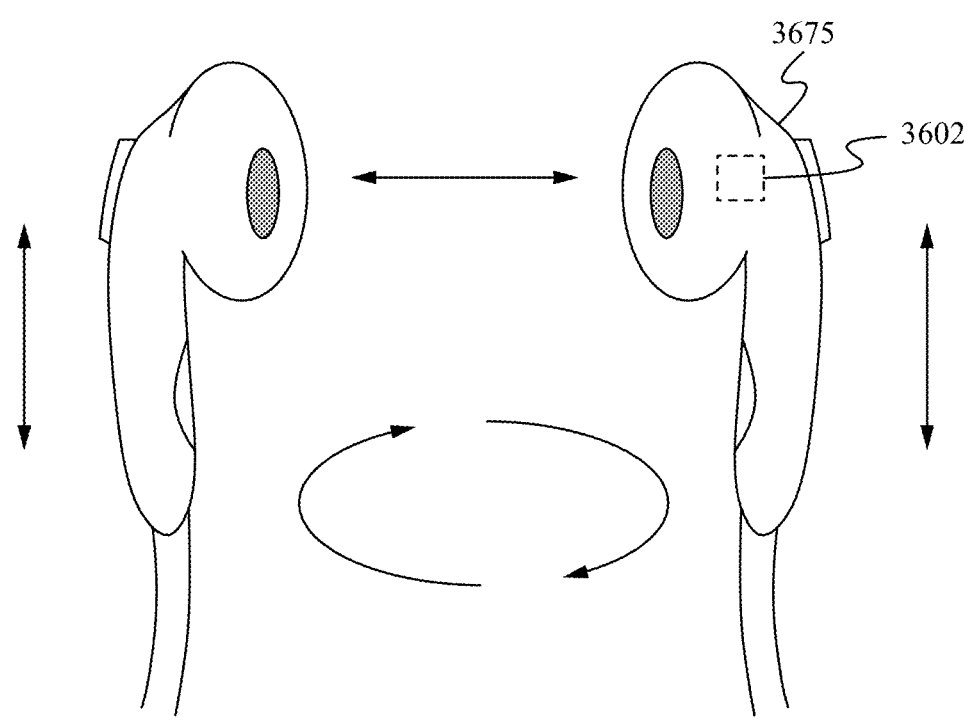
FIG. 36 illustrates a set of earphones in accordance with some embodiments.

As shown within FIG. 36, in some embodiments an accelerometer 3602 of the earphones 3675 is able to sense a movement and/or a relationship of movement between the two earbuds of the earphones 3675. Movements in unison as sensed by the accelerometer 3602 indicate that the earphones are in a user's ears, while out of synch movement as sensed by the accelerometer 3602 indicate that the earphones 3675 are not currently being used. The relationship of the movement between the two earbuds in a user's ears becomes a contextual intelligence mechanism denoting appropriate timing and application of movements for control of an electronic device. Additionally, as shown within FIGS. 35A-35C, when combined with one or more magnetic sensors and one more touch sensors, the earphones generate a robust set of situational awareness about the use of the earphones allowing appropriate commands for the control of an electronic device.

In some embodiments, the accelerometer 3602 is able to contextualize a speech of the user. As the user converses, the body language and gestures of the user adds context to the speech of the user. Consequently, one or more sensors are able to be used for voice and language algorithms that convert speech to text. The accelerometer 3602 is able to sense the user's movements to interpret emotion, context and intent of the user in order to improve the accuracy of the user's speech that is transmitted. This is able to include for example, programs that enable a user to send emoticons or transmit speech based on the movements of the user. For example, a program is able to output certain emoticons and/or words based on head and body gestures such as a shrug, a sigh, a tilt of the head, and/or other appropriately desired movement.

Wireless earphone and bluetooth earphone devices have a problem in that it is difficult to wear the device in an aesthetically pleasing fashion and in a manner to properly hold the bluetooth unit so that it does not bounce and shift while being worn by a user. Due to the weight of the bluetooth device, when worn around the neck the device tends to bounce and shift if a user is being active. This creates discomfort for the user as well as an unwanted distraction. To solve these issues, a garment is able to comprise one or more pockets which are directly tailored for holding a bluetooth base unit.

In some embodiments, an existing feature of a garment is able to be utilized, such as the tubular aspect of a shirt collar or a sweater collar. This can be done by adding a slot or other similar feature such that a bluetooth unit can be slid into place. In other instances, an internal is added to accept a bluetooth unit, placed in a location so that the unit is easy to operate and in a location relevant to the use of the earphones. This system both conceals the bluetooth unit and secures the unit in a position to alleviate problems of movement and weight.

Figure 37A:
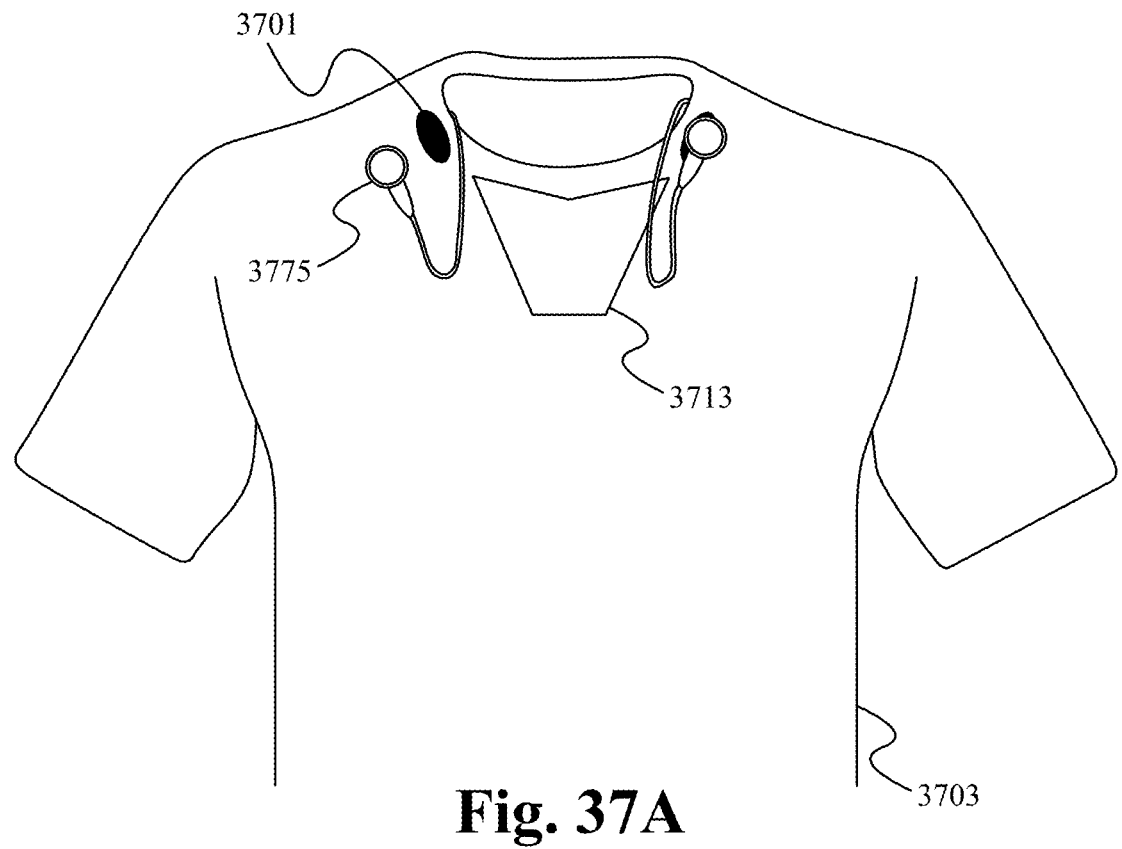
FIGS. 37A and 37B illustrate a garment for holding an electronic device in accordance with some embodiments.
Figure 37B:
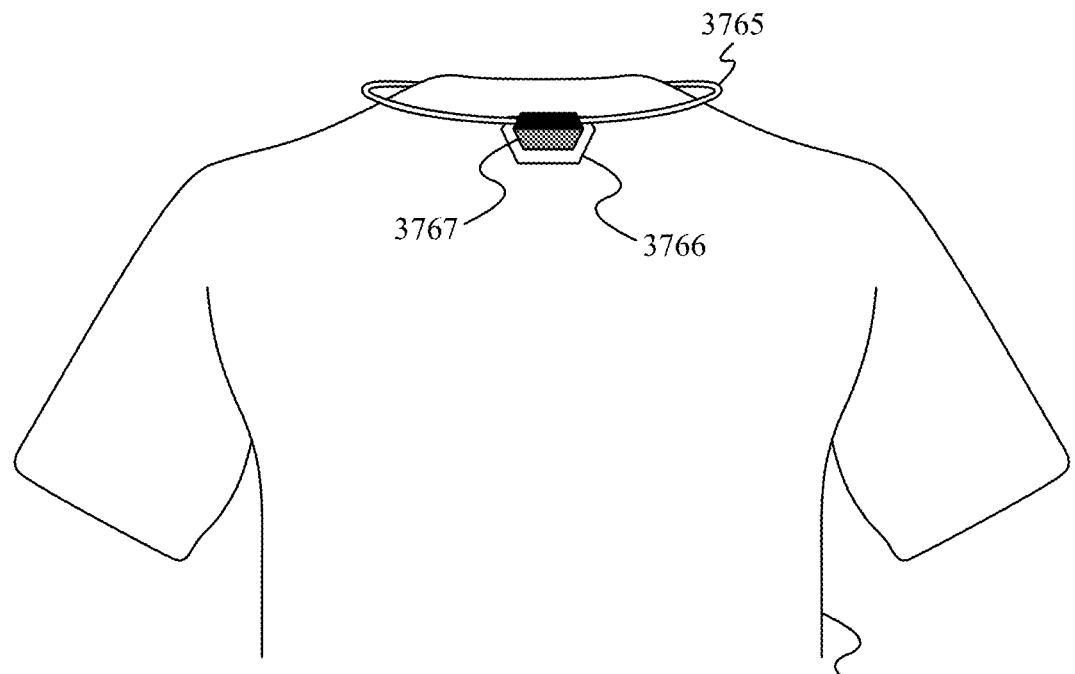

Referring now to FIGS. 37A and 37B, a garment comprising a pocket for holding a bluetooth unit is depicted therein. As shown in FIG. 37A, the garment 3703 comprises an internal pocket 3713 for holding a bluetooth base unit, such as described above. In some embodiments, the garment 3703 also comprises a magnetic attachment point 3710 for coupling with earphones 3775 comprising a magnetic sensor, such as described above. The magnetic attachment point 3710 is able to be glued, fused, sewn, riveted, or clamped to an outer surface of the garment 3703. Alternatively, in some embodiments, magnets and/or a magnetically attractable surface are integrated into the weaving or knitting process when the garment 3703 is manufactured. Particularly, the magnets and/or magnetically attractable surface is able to be attached to an inside or an outside of the garment 3703 by any appropriately desired method. For example, in some embodiments, the magnets and/or magnetically attractable surface are encased by fusing, welding, sewing, riveting, or clamping fabric or other material over the magnets and/or magnetically attractable surface from either the outside or the inside of the garment.

Figure 38:
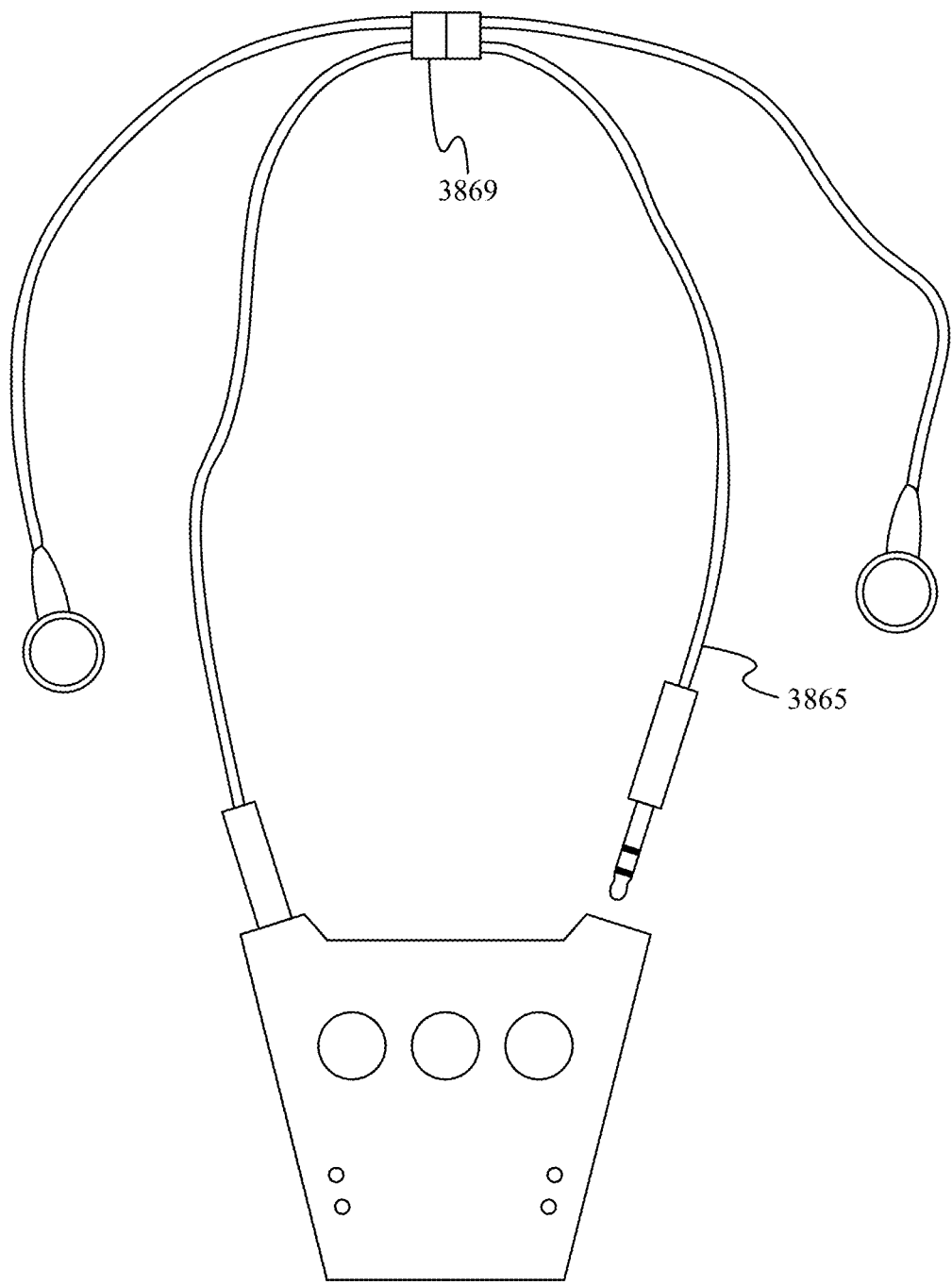
FIG. 38 illustrates a set of earphones comprising a clip for holding the set of earphones in accordance with some embodiments.

In some embodiments, such as shown within FIG. 37B, the garment 3703 comprises an earphone connecter base 3766 mounted to the garment 3703. The earphone connector base 3766 comprises an earphone connector clip 3767 for holding an earphone cord 3765. Alternatively, such as shown within FIG. 38, in some embodiments, the earphones cord 3865 comprises a clip 3869 for clipping and/or magnetically attaching the earphones cord behind the neck of a user. The earphones 3875 are able to couple to a bluetooth base unit, such as described above.

Figure 39:
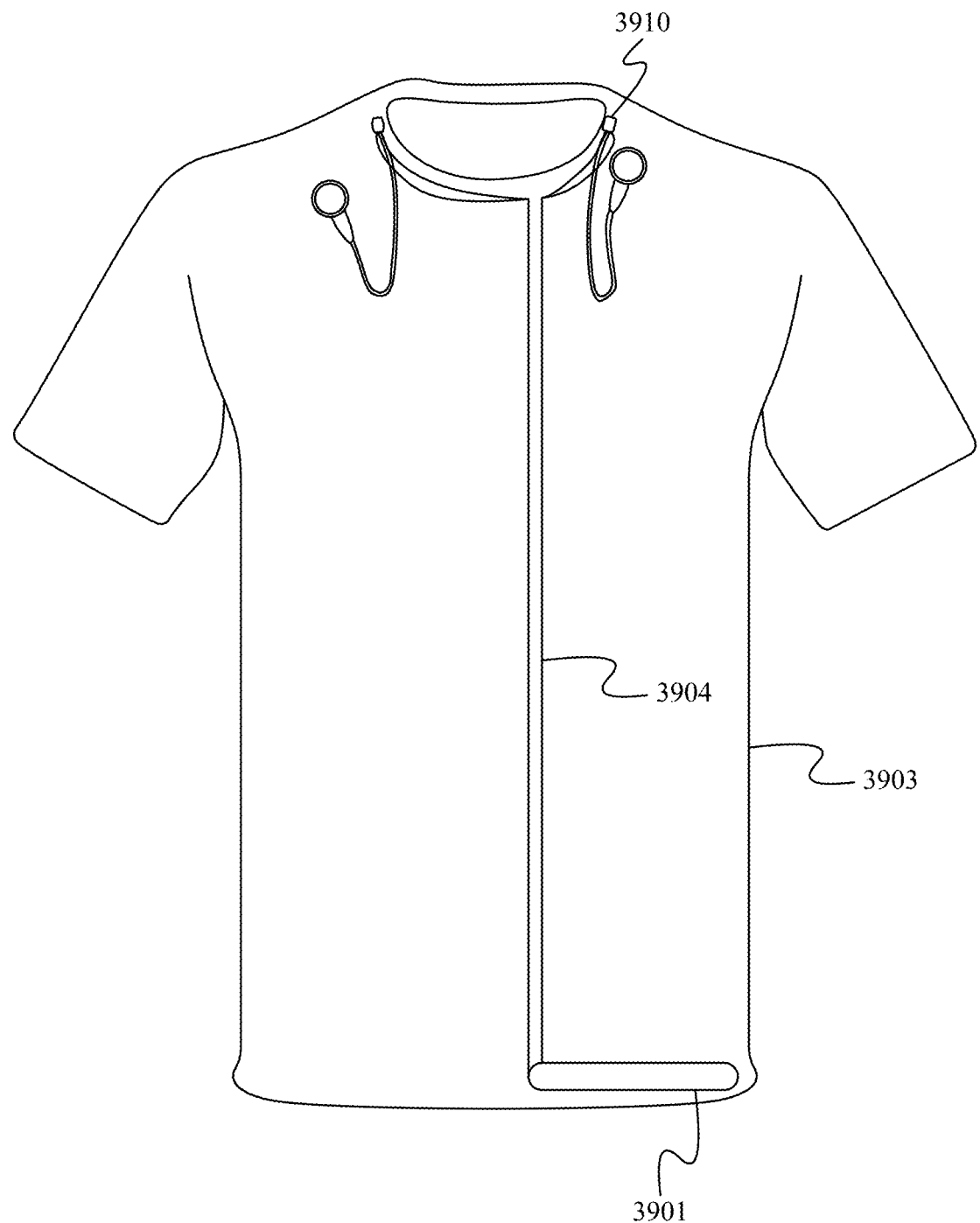
FIG. 39 illustrates a garment incorporating wiring for a bluetooth unit in accordance with some embodiments.

In some embodiments, circuitry for a bluetooth base unit is able to be incorporated in a garment. FIG. 39 illustrates a garment 3903 comprising wiring 3904 for a bluetooth unit 3901 incorporated into the garment 3903. Particularly, the wiring 3904 is able to be integrated into the woven or knit fabric and is able to be used to connect the bluetooth unit 3901 with the earphones 3975. In this manner, the bluetooth unit 3901 is able to be located remotely from the earphones 3975. In some embodiments, one or more connectors for the earphones 3975 are able to be integrated near a collar of the garment 3903. The wiring 3904 is able to be woven or knitted into the garment 3903 and the wiring 3904 can be routed to the bluetooth unit 3901 at a remote location on the garment 3903.

Figure 40A:
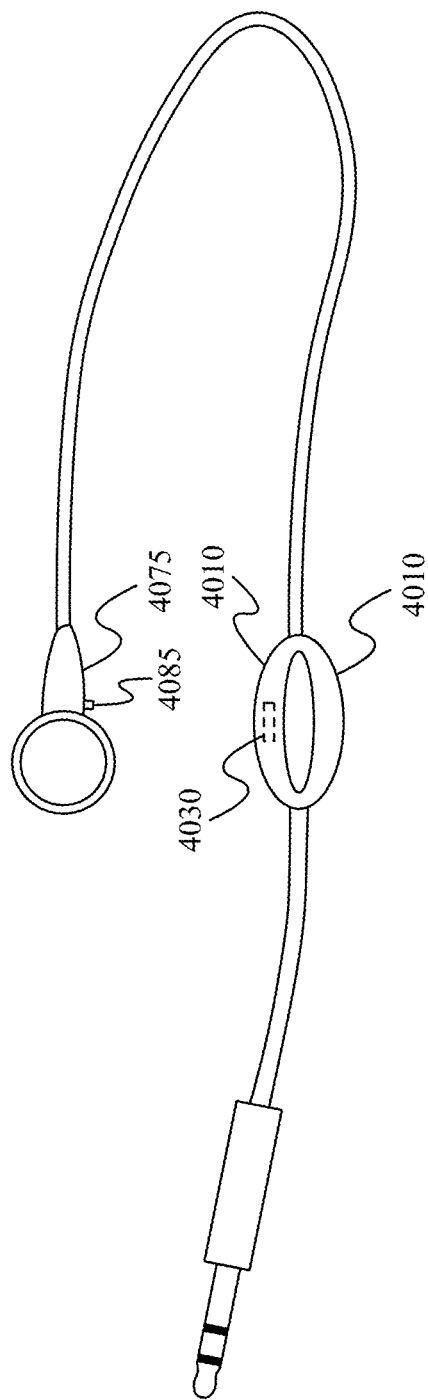
FIGS. 40A and 40B illustrate an earphones cord comprising a magnetically attractable surface in accordance with some embodiments.
Figure 40B:
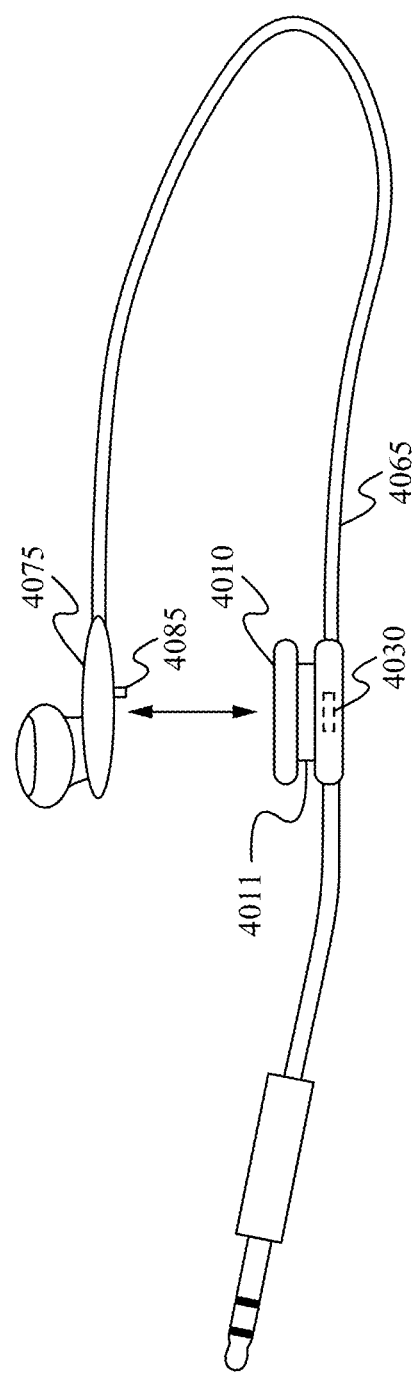

In some embodiments, a magnetically attractable surface is able to be coupled to a cord of the earphones. FIGS. 40A and 40B illustrate a magnetically attractable surface 4010 and magnetic sensor 4030, such as described above and incorporated with a cord 4065 of a set of earphones 4075. A magnet 4085 of the earphones 4075 is able to couple with the magnetically attractable surface 4010. An earphones engagement detector 4030 is able to send a signal to an electronic device and/or a bluetooth base unit based on an engagement of the earphones 4075 with the magnetically attractable surface 4010. As described above, when the earphones 4075 are coupled to the magnetically attractable surface 4010 the system knows that the earphones are not currently being used by a user. In some embodiments, the earphones 4065 comprise a magnetically attractable surface 4010 and a groove 4011 for coupling with a button hole of a user's shirt.

Figure 41:
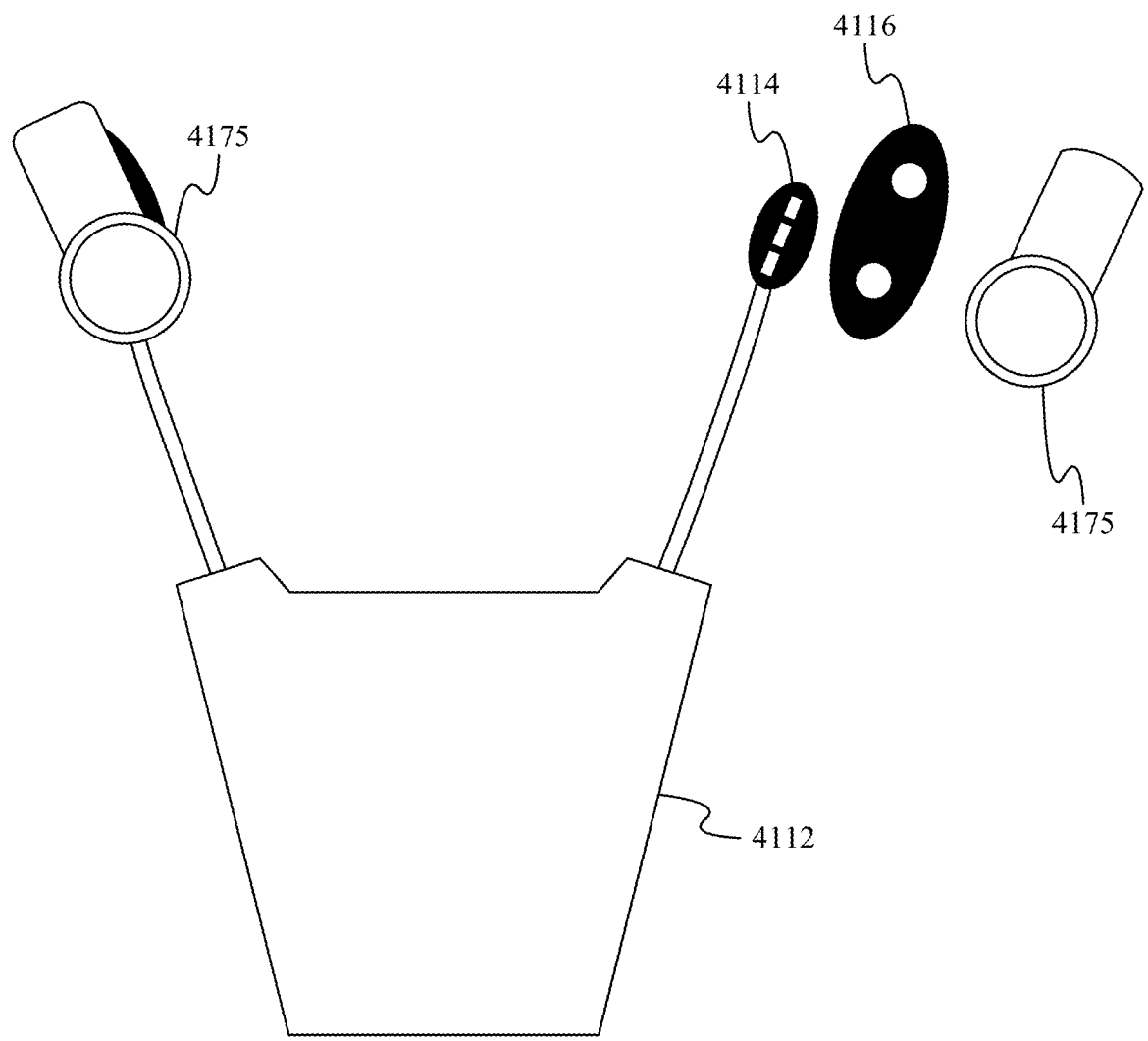
FIG. 41 illustrates a battery pack for a set of earphones in accordance with some embodiments.
Figure 42:
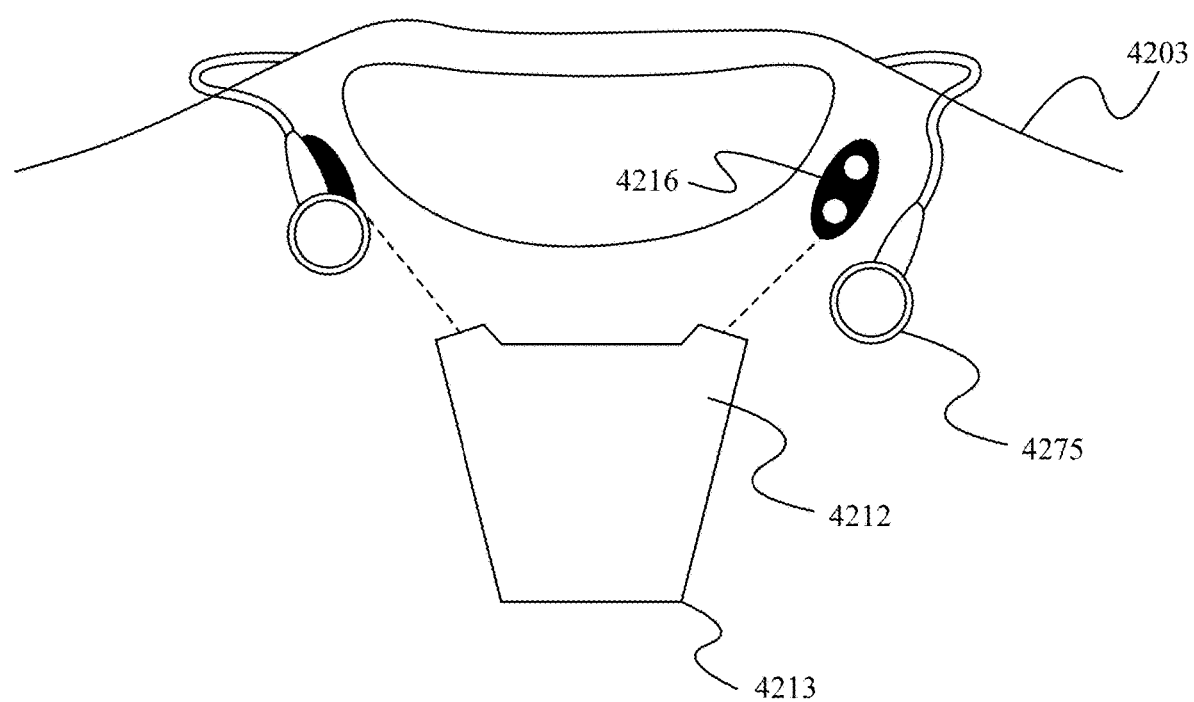
FIG. 42 illustrates a battery pack for a set of earphones coupled to a garment in accordance with some embodiments.

FIG. 41 illustrates a battery pack for and a charging port for a wireless earphones in accordance with some embodiments. As shown within FIG. 41, a charger port 4116 is able to attach to a garment, such as described above. The charger port 4116 is able to be glued, fused, sewn, riveted, or clamped to an outer surface of the garment. Alternatively, in some embodiments, magnets and/or a magnetically attractable surface are integrated into the weaving or knitting process when the garment is manufactured. Particularly, the magnets and/or magnetically attractable surface is able to be attached to an inside or an outside of the garment by any appropriately desired method. For example, in some embodiments, the magnets and/or magnetically attractable surface are encased by fusing, welding, sewing, riveting, or clamping fabric or other material over the magnets and/or magnetically attractable surface from either the outside or the inside of the garment. The earphones 4175 are able to charge when attached to the charger port 4116 attached to a garment. In some embodiments, a charger attachment 4114 is able to couple to the earphones 4175 and a battery pack 4112 worn inside the garment. As shown within FIG. 42, a battery 4212 is able to fit within a pocket 4213 of the garment and the earphones 4275 are able to attach to the charger port 4216 for charging.

Figure 43:
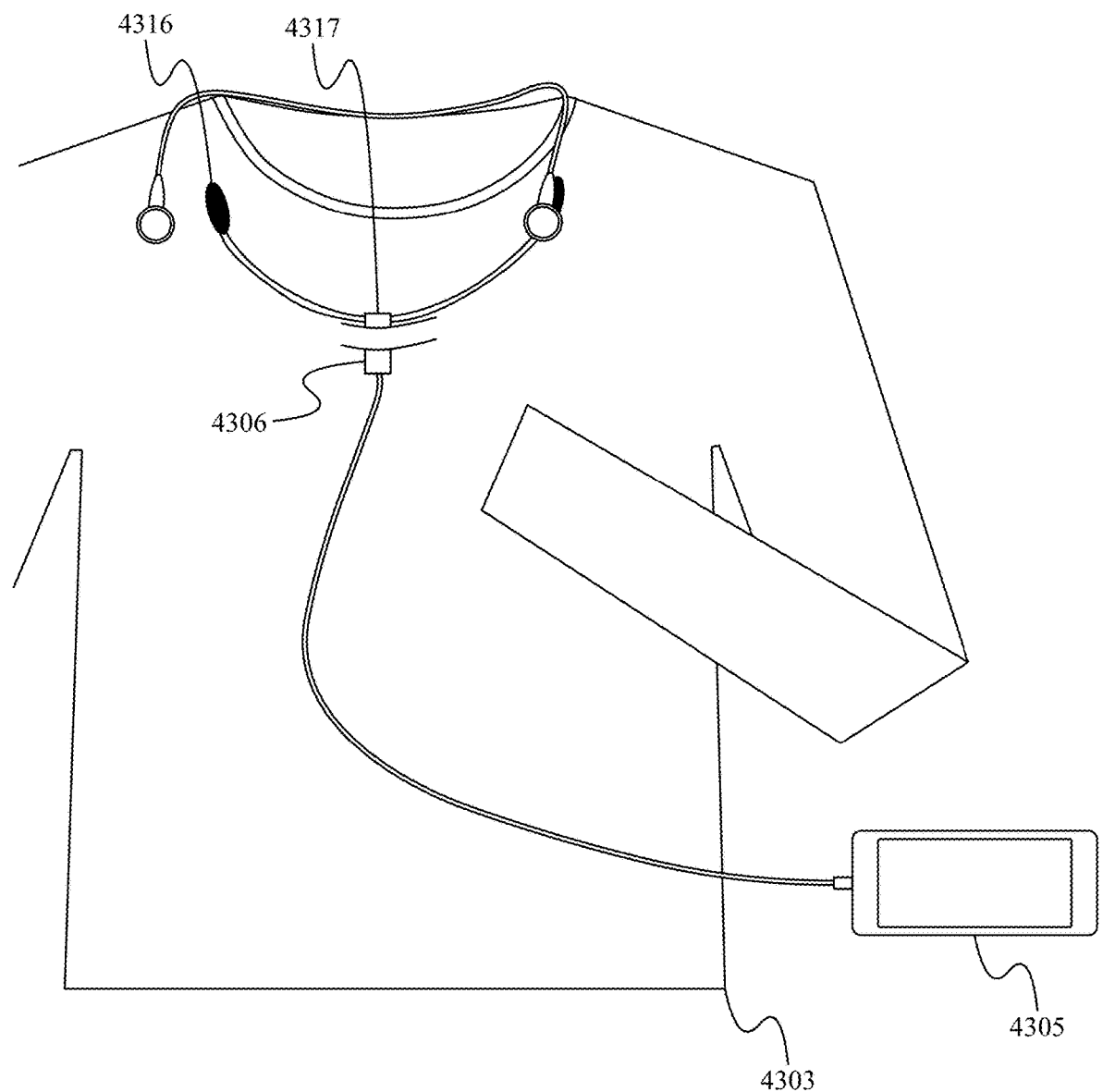
FIG. 43 illustrates a garment comprising a plurality of docking points for a set of earphones in accordance with some embodiments.

In some embodiments, a garment is able to comprise a plurality of docking points for removably receiving a set of earphones. FIG. 43 illustrates a garment 4303 comprising a plurality of docking points 4316. In some embodiments, the docking points 4316 comprise a magnetically attractable surface and an earphones engagement detector, such as described above. As shown within FIG. 43, in some embodiments, an electronic device 4305 is able to connect to the docking points 4316 through a connector 4306. In some embodiments, the electronic device 4305 is charged when it is coupled to the connector 4036. For example, in some embodiments, the garment 4303 is able to comprise a battery pack, such as described above.

Figure 44:
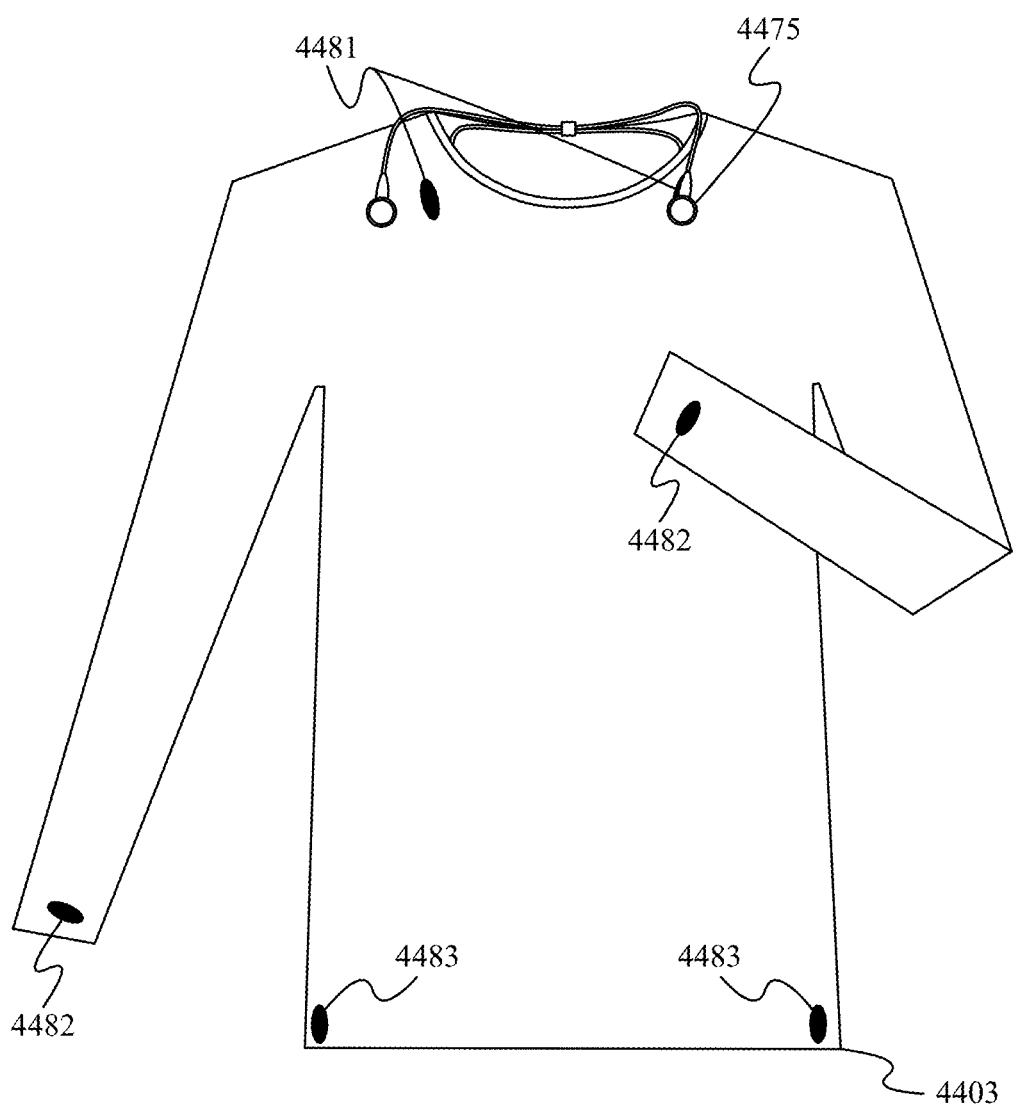
FIG. 44 illustrates a garment comprising one or more sensors for sensing one or more movements of a user wearing the garment in accordance with some embodiments.

In further embodiments, a garment is able to comprise one or more sensors for sensing a motion of a user as the garment is being worn by a user. FIG. 44 illustrates a garment 4403 comprising one or more sensors for sensing a body position of a user. As shown within FIG. 44, the garment 4403 comprises one or more shoulder sensors 4481 for sending upper body data such as body twist, torso angle, and other relative movements of the user. The one or more shoulder sensors 4481 are able to provide contextual data for the proper operation of a bluetooth device. In some embodiments, the garment 4403 comprises one or more cuff sensors 4482. In some embodiments, the one or more cuff sensors 4482 comprise accelerometers for tracking movement of the user's arms and providing contextual information relating to the user's actions and body position. As further shown within FIG. 44, in some embodiments the garment 4403 comprises one or more hip sensors 4484 for providing contextual information about the rotation of the pelvis and the mid-section of the user. Based on a motion of the user, a control device coupled to the garment 4403 and the one or more sensors is able to send a signal to a remotely coupled electronic device. In some embodiments, the signal comprises a signal to operate the electronic device as determined by a movement of the user.

Figure 45:
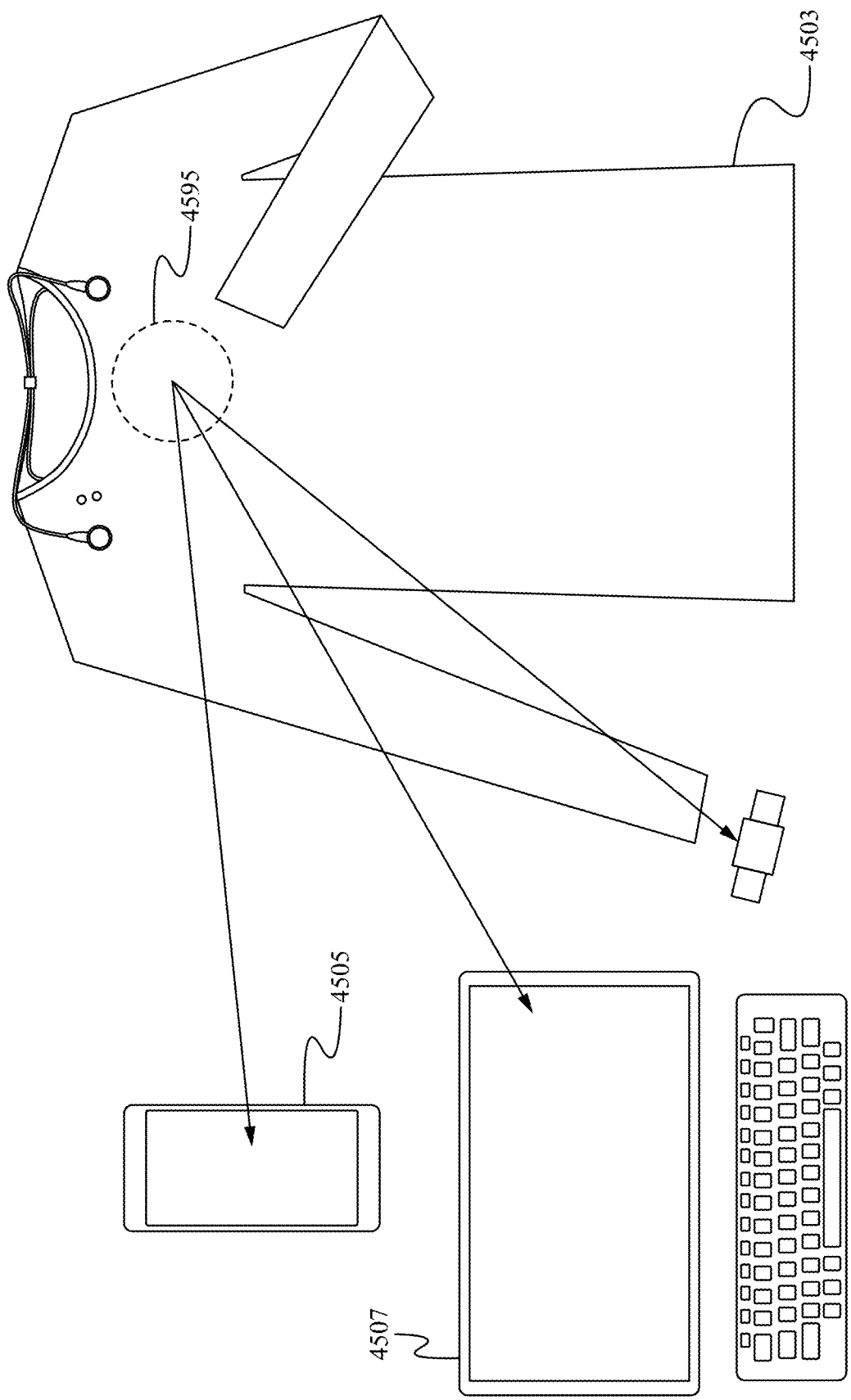
FIG. 45 illustrates a garment for communicating with one or more electronic devices in accordance with some embodiments.

As shown within FIG. 45, in some embodiments, a wireless control device 4595 is able to communicate with one or more electronic devices, such as a smart phone 4505 and a computer 4507 or other bluetooth enable device based on a movement of the user while the user is wearing the garment 4503. Particularly, a user is able to control one or more electronic devices based on user input as determined by motion of the user. For example, in some embodiments, as a user moves in front of the electronic device, they are able to open and/or run one or more applications on the electronic device. In this manner, a user is able to pick up an electronic viewing device and see their applications, layouts, pictures, and other data. The user is instantly able to access their own music, data, email, and social media accounts.

In some embodiments, the wireless control device 4595 communicates with the one or more electronic devices such that the one or more electronic devices are able to understand when a user is performing certain actions. For example, one or more sensors such as an accelerometer of the wireless control device 4595 is able to sense when a user is typing and thus disable the track pad to avoid inadvertent mouse movements. Particularly, a combination of clothing and/or other sensors creates an added level of contextual awareness as the user utilizes one more electronic devices.

In some embodiments, the one or more mounting bases and/or charging ports such as described above comprise a standard form magnetic earbud mount. In this manner the earphones are able to be detachable such that the mounting bases and/or charging ports are able to couple with a variety of different manufactured earphones. Particularly, in some embodiments, the mounting base is able to comprises a standardized form. In some embodiments, the mounting base comprises a 3.5 mm jack four coupling with a set of earphones. However, the mounting base is able to comprise any appropriately sized jack for coupling with a set of earphones. In some embodiments, a mounting base is able to couple the earphones around a neck of the user.

As described above, in one aspect, a set of earphones is able to comprise one or more sensors for sensing a location of the earphones. The one or more sensors enable earphones such as a pair of bluetooth earphones wirelessly coupled to a bluetooth enabled electronic device, the capability to understand the configuration of use of the earphones. Based on a location and use or non-use of the earphones, one or more contextual responses is able to be applied for a given action. For example, if the earphones are being used, then sound is routed through the earphones to a user and if the earphones are not being used, then sound is routed through a speaker of the electronic device. In addition, the earphones are able to couple with a garment and be held by the garment as the earphones are being used. Further, the garment is able to also comprise one or more sensors for sensing a motion of a user as the garment is being used. Thus, allowing the user to control one or more electronic devices through a series of user generated movements. In this manner, one or more sensors are able to contextualize a series of user generated movements to control one or more electronic devices.

Figure 46:
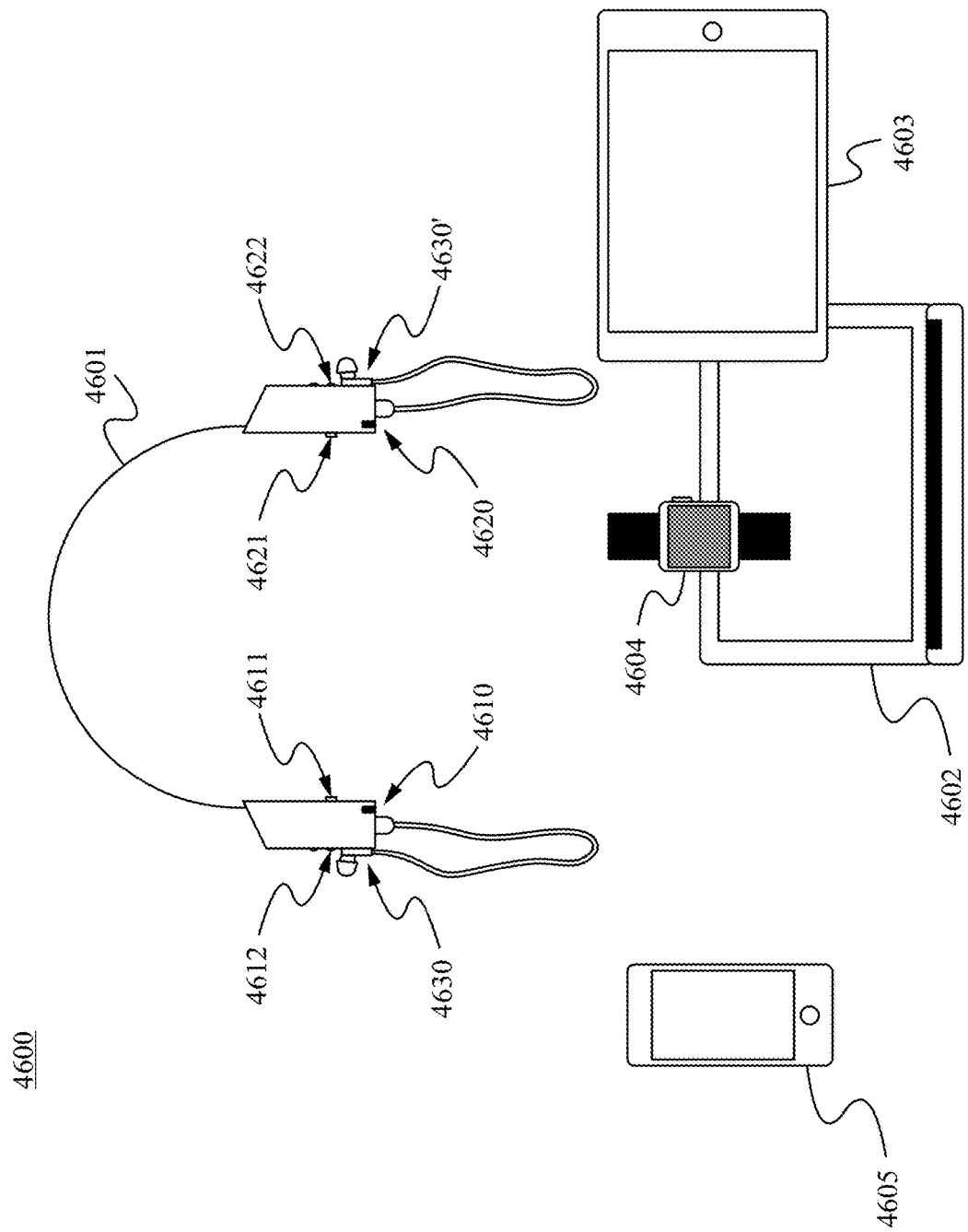
FIG. 46 illustrates an earphones holding system in accordance with some embodiments.

Referring now to FIG. 46, an earphones holding system is depicted therein. The earphones system 4600 comprises a first base unit 4610, a second base unit 4620 and a neckband 4601 coupled to and connecting the first base unit 4610 with the second base unit 4620. As shown within FIG. 46, an earbud 4630 is configured to couple with the first base unit 4610 and an earbud 4630' is configured to couple with the second base unit 4620. In some embodiments, the first base unit 4610 is configured to wirelessly connect with a smart phone 4605 and the second base unit is configured to wirelessly connect with one or more of a computer 4602, a tablet 4603, and a watch 4604. However, the first base unit 4610 and the second base unit are able to connect with any device as appropriately desired. In some embodiments, the first base unit 4610 and the second base unit 4620 utilize a bluetooth connection. In some embodiments, the neckband 4601 enables a user to wear the system 4600 around the neck and securely hold the system at a convenient location.

In some embodiments, the earbud 4630 couples with the first base unit 4610 with a magnetic coupling and the earbud 4630' couples with the second base unit 4620 with a magnetic coupling. In some embodiments, based on an engagement of the earbud 4630 with the first base unit 4610 and the earbud 4630' with the second base unit 4620, a signal is sent to the electronic devices coupled with the first base unit 4610 and the second base unit 4620.

As shown within FIG. 46, the first base unit 4610 is coupled to the smart phone 4605. In some embodiments, the first base unit 4610 is configured for optimized phone operations. The second base unit 4620 is coupled to one or more of a computer 4602, a tablet 4603, and a watch 4604. The second base unit 4620 in combination with the first base unit 4610 allow a user to receive incoming calls while still listening to music or watching a show. Particularly, a unit to unit mixer 4621 adjusts the sound level of the first base unit 4610 and the second base unit 4620 so that a user is able to listen to different audio from the first base unit 4610 and the second base unit 4620. In some embodiments, one or both of the first base unit 4610 and the second base unit 4620 comprise an ambient sound mixer for adjusting a volume of ambient and/or outside sounds while the headphones are being used.

Figures 47A, 47B, 47C:
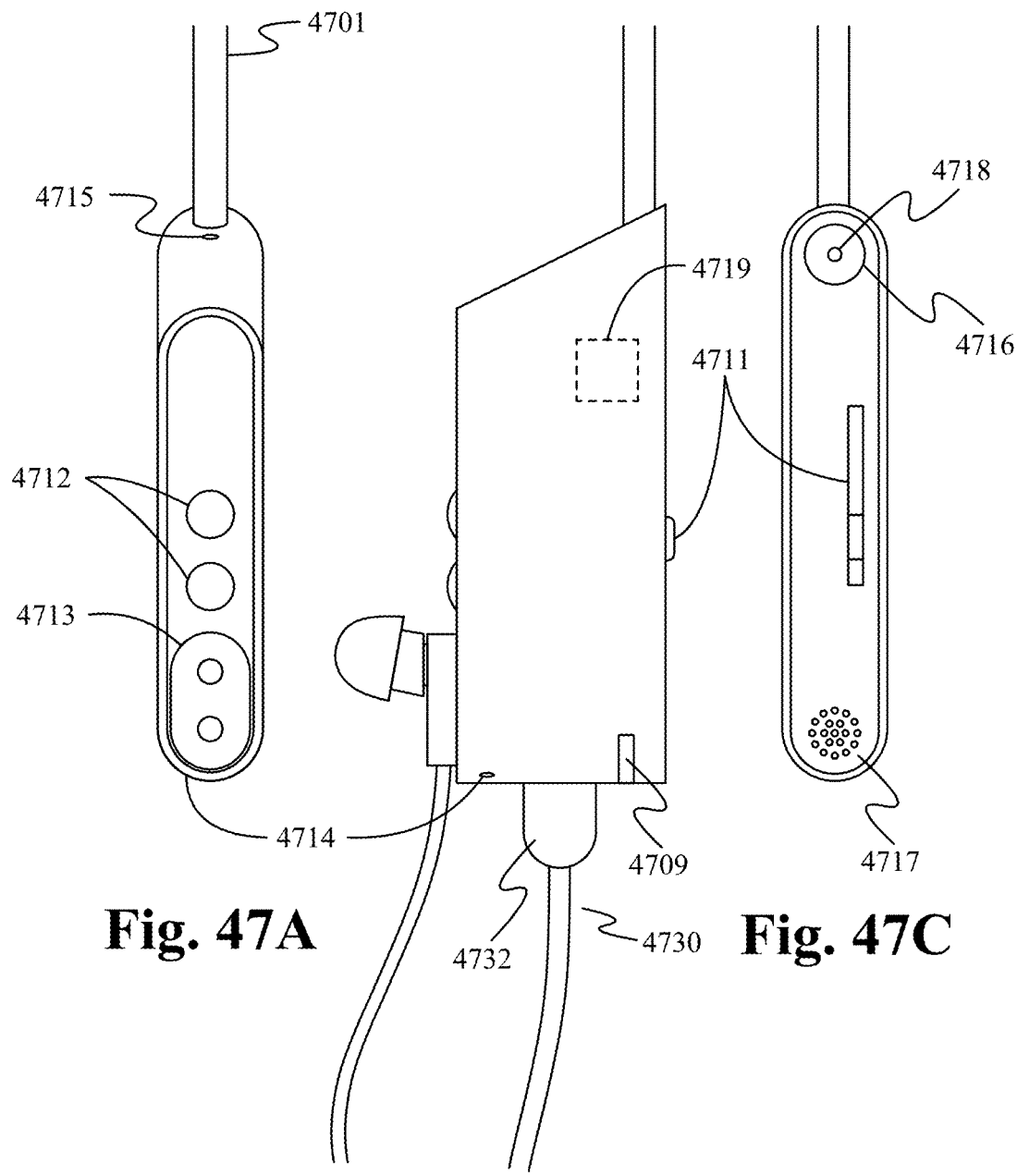
FIG. 47A-47C illustrate an earphones holding device in accordance with some embodiments.

FIGS. 47A-47C illustrate the first base unit 4710 in accordance with some embodiments. As shown within FIG. 47A, the first base unit 4710 comprises a dual microphone 4715, one or more unit volume controls 4712, an earbud mount 4713, an ambient noise microphone 4714, and a neckband connection 4701. As shown within FIG. 47B, in some embodiments, the first base unit 4710 comprises an accelerometer 4719 and LED task lighting 4709. In some embodiments, the accelerometer 4719 is configured to sense a movement of the first base unit. As shown within FIG. 47C, the first base unit 4710 comprises an on/off switch 4716, a status indicator 4718, ambient sound integration 4711 and an audio speaker 4717. The ambient sound integration 4711 is configured to adjust an amount of ambient sound heard through an earbud 4730 when it is connected to the first base unit 4711. In some embodiments, the first base unit 4710 is configured for optimizing phone use and battery efficiency. In some embodiments, the earbud 4730 comprises a USB-C connector 4732. However, the earbud 4730 is able to comprise any appropriately desired connector. In some embodiments, the earbud 4730 is able to be charged when it is coupled with the first base unit 4710.

FIGS. 48A-48C illustrate the second base unit 4820 in accordance with some embodiments. As shown within FIG. 48A, the first base unit 4820 comprises a dual microphone 4825, one or more unit volume controls 4822, an earbud mount 4823, and a neckband connection 4801. As shown within FIG. 48B, in some embodiments, the first base unit 4820 comprises an accelerometer 4829 and LED task lighting 4809. As shown within FIG. 48C, the first base unit 4820 comprises an on/off switch 4826, a status indicator 4828, a unit-to-unit audio balance 4811 and an audio speaker 4827. The unit-to-unit audio balance 4821 is configured to adjust a relative volume level of the first base unit 4810 and the second base unit 4820 when the first base unit 4810 and the second base unit 4820 are playing different audio, such as a call from a smart phone and music from a tablet. In some embodiments, the second base unit 4820 is optimized for multipoint connections. In some embodiments, the earbud 4830' comprises a USB-C 4832' connector. However, the earbud 4830' is able to comprise any appropriately desired connector. In some embodiments, the earbud 4830' is able to be charged when it is coupled with the second base unit 4820.

In some embodiments, the earbud mount 4713 and the earbud mount 4813 comprise one or more magnets and/or magnetically attractable surfaces for magnetically coupling with the earbuds. In some embodiments, the a call from the smart phone is able to be answered and/or terminated based on a removal and an attachment of the earbuds with the earbud mounts. In some embodiments, the magnetic earbuds enable a user to place an electronic device in do-not-disturb mode based on a coupling of the earbuds with the earbud mounts. Particularly, the magnetic earbuds enable a user to pause and/play music and other sound based on intuitive use of the earbuds. In some embodiments, the earbud mount 4713 and the earbud mount 4813 are clickable to control one or more functions of an electronic device coupled to the first unit 4710 and the second unit 4820.

In some embodiments, one or more sensors within the first base unit 4710 and the second base unit 4820 are able to sense when the earbuds are docked with the earbud mounts and therefore know when the earphones are being used and not being used. Audio can then be routed appropriately to the external speakers of the first base unit and the second base unit instead of through the earphones. Thus, the user is able to hear what they otherwise wouldn't.

The system such as described above comprises a first base unit and a second base unit with earbud mounts for releasably receiving a set of earbuds. As described above, the system is able to be used to control one or more remotely connected devices such as a smart phone, a tablet, a computer, and a watch. As will be apparent to someone of ordinary skill in the art, the system is able to control any appropriately desired device. Additionally, the earbud mounts in combination with the base unit accelerometers, and earbud accelerometers are able to sense a location of the earbuds and the base units and contextually adjusts a level of played audio and/or control one or more remotely connected electronic devices.

For example, in some embodiments, a phone call is answered when one or both of the earbuds are removed from the earbud mounts, the earbud mount is pressed, and/or a user nods their head twice. Additionally, in some embodiments, an incoming call is sent to voicemail by double clicking the earbud mounts, and/or shaking the head twice. In some embodiments, a call is terminated by attaching both earbuds to the earbud mounts, and/or double tapping the earbud mount.

In further embodiments, the system pauses music when the earbuds are coupled with the earbud mounts, the earbuds are coupled to each other, and/or the earbud mount is double tapped. In some embodiments, music is unpaused by removing both earbuds from the earbud mounts, detaching earbuds from each other, and/or double tapping the earbud mount. In some embodiments, music is advanced by double clicking the earbud mounts. In some embodiments, the earbud mounts are triple tapped to go back one music track.

In further embodiments a connected electronic device is put in do-not-disturb mode by connecting the earbuds to each other. In some embodiments, pressing both volume buttons of the system turns the task LED light one and off. In some embodiments, the task light of the first base unit and the task light of the second base unit are independently operated. In some embodiments, the volume buttons operate the task light for 15 seconds and pushing the volume button in cycles the task light between dim white, medium white, bright white, dim red, medium red, and bright red. In some embodiments, the last color and intensity of the task light is set to memory.

Particularly, the system is able to be programmed to perform a variety of tasks including controlling a plurality of electronic devices based on a movement of the earbuds and/or the first base unit and the second base unit.

As described above, the first base unit and the second base unit are configured to wirelessly connect with a plurality of different devices. In some embodiments, the first base unit and the second base unit comprise two separate bluetooth chips, one in the first base unit optimized for phone connection, and one in the second base unit capable of connecting to a plurality of devices, such as described above. In some embodiments, the first base unit and the second base unit comprise separate on/off switches for each unit. In some embodiments, the first base unit and the second base unit are able to be utilized separately.

Additionally, as described above, the first base unit and the second base unit are able to simultaneously transmit separate audio. For example, a user is able to take a phone call through the first base unit while listening to music through the second base unit. In some embodiments, the audio is able to be routed through the external speaker of the first base unit and the second base unit. As described above, the balance of sound between the first base unit and the second base unit is adjustable so that the units are able to be used simultaneously. In some embodiments, a level of ambient noise heard through the earphones is adjustable.

In some embodiments, the system is able to updated by connecting to the internet. For example, in some embodiments, updates and/or one or more programs are able to be downloaded and stored within a memory module of the system. For example, in some embodiments, sound equalizer, task LED controls, the capability for additional head and tap gestures, customizable audio alerts, an exercise assistant, an audio language translator, updates to the active noise reduction, group pairing which allows multiple devices to be chained together so that music and/or programs are able to be shared with friends, external sensors such as temperature and/or environmental sensors, remote controls for other devices are all downloadable.

In some embodiments, if the battery of the first base unit is low, then the first base unit is able to access the battery of the second base unit and if the battery of the second base unit is low, then the second base unit is able to access the battery of the first base unit for extended life.

In some embodiments, the earbuds comprise multiple sensors such as an accelerometer, an infrared sensor, and an oxygen sensor. In some embodiments, the earbuds such as described above, are able to attach to devices with USB-C connectors and charge through the USB-C connection. However, as will be apparent to someone of ordinary skill in the art, the earphones are able to connect with and be charged by any appropriately desired connection. In some embodiments, the system is able to be used with only one earbud. In some embodiments the system is able to be used with generic earphones without magnets.

Figure 49:
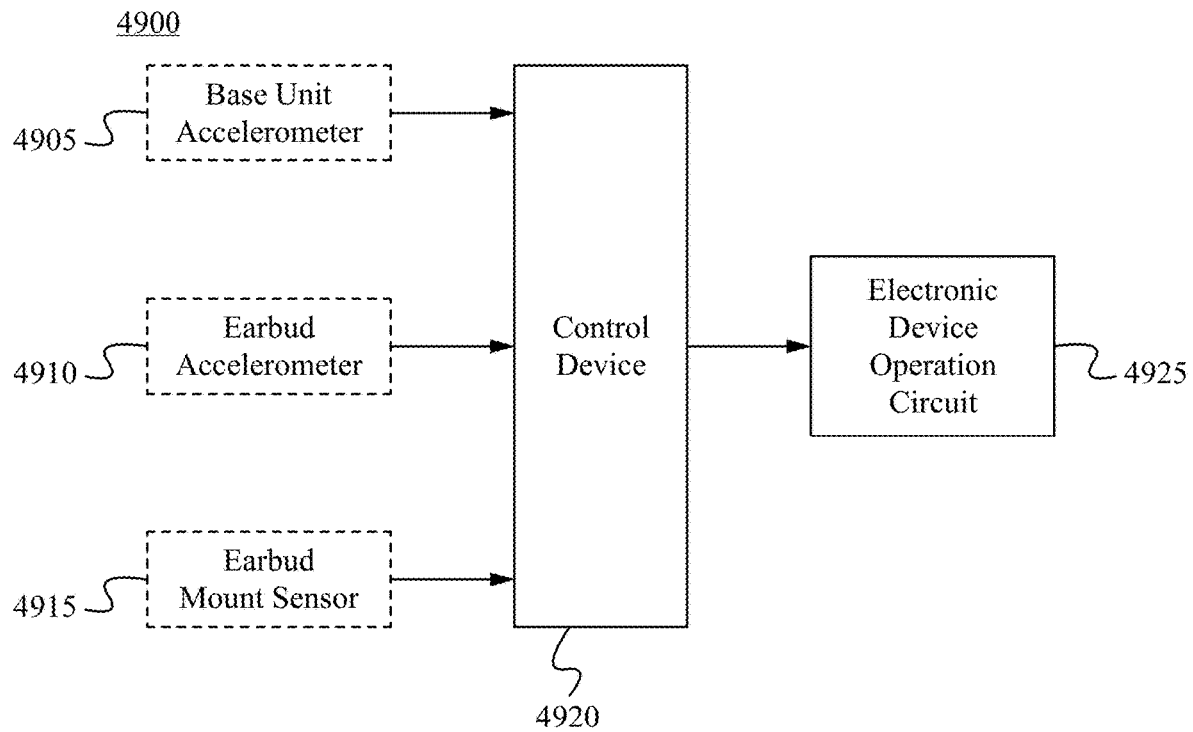
FIG. 49 illustrates schematic view of an earphone holding system in accordance with some embodiments.

FIG. 49 illustrates a schematic view showing the components of an earphones holding device, such as a first base unit and a second base unit, as described above. The device 4900 comprises one or more sensors for sensing an action of an earbud and/or a base unit, such as described in reference to the first base unit and the second base unit, as described above. The one or more sensors send a signal to the control device 4920 which sends a signal to an electronic device operation circuit 4925 based on the signal from the one or more sensors. In some embodiments, the device 4900 is a component of one or both of the first base unit and the second base unit, such as described above.

In some embodiments, the sensor comprises a base unit accelerometer 4905, which senses a movement of a base unit. In some embodiments, such as described above, the base unit is placed next to a torso of a user. In these embodiments, the base unit is able to sense a movement of the torso of the user. The base unit accelerometer 4905 sends a signal to the control device 4920 based on a movement of the user's torso and the control device 4920 sends a signal to the electronic device operation circuit 4925 which operates an electronic device as determined by a movement of the user. In some embodiments, the sensor comprises an earbud accelerometer 4910, which senses a movement of an earbud. The earbud accelerometer 4910 sends a signal to the control device 4920 based on a movement of the earbud and the control device 4920 sends a signal to the electronic device operation circuit 4925 which operates an electronic device as determined by a movement of the user.

In further embodiments, the device 4900 comprises an earbud mount sensor 4915 for sensing one or both of an engagements of an earbud and a tapping of the sensor by the user. The earbud mount sensor 4915 sends a signal to the control device 4920 based on an engagements of an earbud and a tapping of the sensor by the user and the control device 4920 sends a signal to the electronic device operation circuit 4925 which operates an electronic device as determined by the engagements of an earbud and the tapping of the sensor by the user.

Based on the accelerometers, the device 4900 understands when an earbud is docked and when the earbud is moving in unison with the unit it's attached to. In this configuration the device 4900 is able to understand that the earbud is or is not in use and route audio from an electronic device appropriately. For example, if an earbud is not in use, then audio feedbacks (ringer, text notification, clicks and other feedbacks heard when interacting with a phone or other device) are routed to an external speakers of the device.

In some embodiments, when an earbud is disconnected from a first base unit and an earbud is disconnected from a second base unit, the two accelerometers will move asynchronously indicating that the earbuds are likely in use. This conditional state can be further confirmed by the relative movement of an opposing earbud. If the other earbud is moving in ways consistent with placement in the opposing ear the device can be assured the earbuds are, in fact, in use. Likewise, two earbuds hanging loose would produce an asynchronous signal indicating they are not in use by the user. Audio would then be routed through the base unit instead of through the earbuds. Whenever the earbuds are connected to a base unit the two accelerometers will move synchronously. This indicates the earbuds are not in use and functionality of the device can be programmed for that conditional state.

An "in use" state would be identified by the accelerometers in the earbuds reporting x/y/z coordinates in a predictable and unified manner. Head turns to the right or left would generate opposing z and −z data. A nod of the head would produce coordinated x and z data. All common head movements could be catalogued to identify "in use" conditions so that audio can be appropriately routed to the user. In a docked configuration the earbuds and base units move in unison indicating that the earbuds are not in use, and therefore audio should be routed to another location other than the earbuds.

In some embodiments, accelerometers in the first base unit, the second base unit and both earbuds allows the device to enhance augmented reality applications. The ability to track head movements distinct from shoulder and body position enables unique contextual intelligence. Additionally, this adds a level of positional awareness relative to recorded or computer generated sound. Changes in head and body position can generate changes in the sound delivered to a user giving an augmented sense of sound based on relative location. In some embodiments, one or more accelerometers within the earbuds allow a user to utilize head gestures to answer a call and/or send an incoming call to voicemail, such as described above. In some embodiments, accelerometers in the first base unit and the second base unit allow tap gestures to answer calls and/or send an incoming call to voicemail.

In some embodiments, removing an earbud from an earbud mount is sensed by the earbud mount sensor and produces a signature "click" via the accelerometers on the earbud and the base unit. This signature movement can be used to initiate the answer function for an incoming phone call or to start play of paused music. This signature movement can be enhanced by including any accompanying movements, such as the signature of the earbud moving upward toward the ears. Reverse of these actions would be used to pause music or terminate phone calls.

When earbuds are in use torso movements are able to be isolated from head movements. Functionality can be applied in a wide range of applications, such as orienting sound in 3D space relative to the user's head and body position. This separation of movement can also be used for activating actions on a mobile device. The motion of shaking or nodding the head (relative to the body) can be used to answer a phone call or send an incoming phone call to voicemail without the use of hands.

Additionally, in some embodiments, attaching earbuds to opposing base units expands functionality. Whereas attaching an earbud to its own base unit would produce one action, attaching to the opposite unit produces an alternate action. For example, attaching an earbud to its own base unit terminates a call, while attaching the earbud to the opposing base unit activates the base unit speakers instead. Returning the earbuds to their own base units would then terminate the call. When the earbuds are in use the accelerometers in the base units can be used to initiate functions. The unique signature of a double tap on the case can be used to answer an incoming call or advance to the next song track. If earbuds are docked to the base a double tap is able to answer an incoming call, but since the earbuds are not in use, the audio of the incoming call would be routed to the external speakers on the device. Audio could then be transferred to the earbuds if they are removed from the docks and moved to the ears.

In some embodiments, a standard corded over-the-ear headphones are attached and have all the functionality of the accelerometers by using an auxillary connector with a built-in accelerometer.

Figure 50:
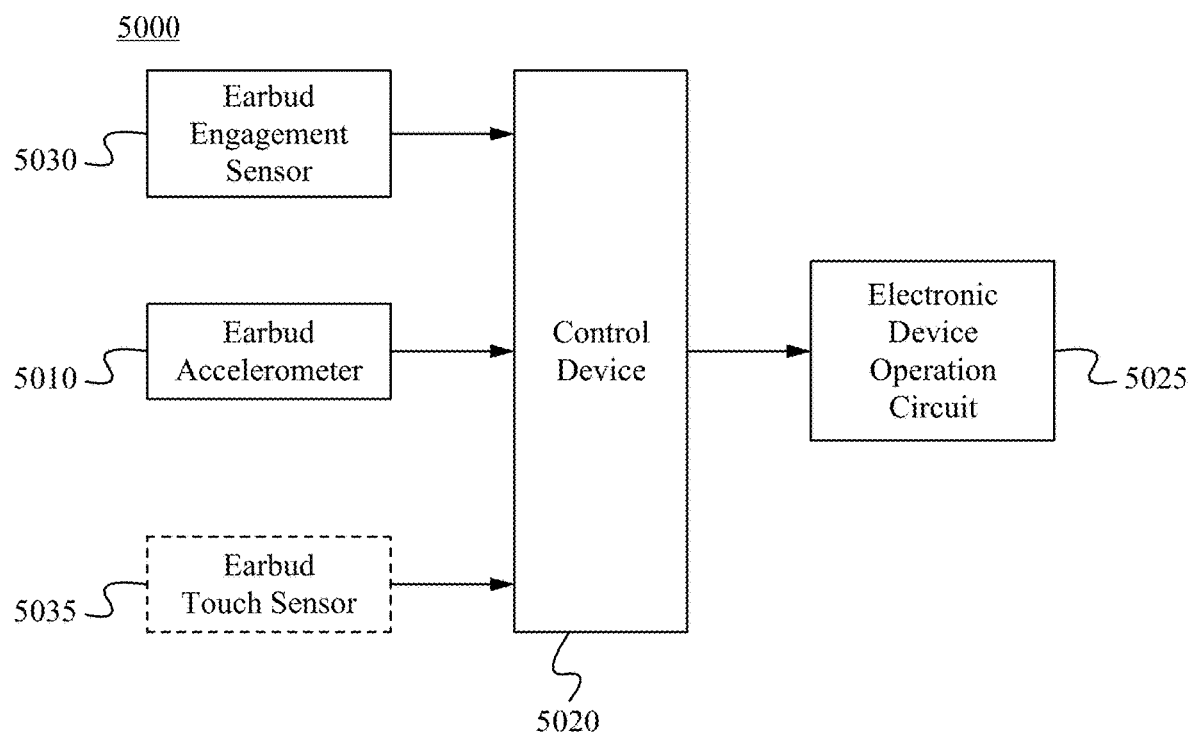
FIG. 50 illustrates a schematic view of an earphones device in accordance with some embodiments.

FIG. 50 illustrates a schematic view of an earphone device in accordance with some embodiments. The earphones earphone device 5000 comprises an earbud engagement sensor 5030 for sensing an engagement of a earbud with an object, an earbud accelerometer 5010, a control device 5020 and an electronic device operation circuit 5025. In some embodiments, the earbud engagement sensor 5030 is configured to sense an engagement of an earbud with a magnetically attractable surface and/or an engagement of the earbud with an opposing earbud. In some embodiments, the system 5000 is a component of one or both of the earbuds, such as described above.

The earbud engagement sensor 5030 sends a signal to the control device 5020 based on an engagement of the earbud with an object and the control device 5020 sends a signal to the electronic device operation circuit 5025 which operates an electronic device as determined by engagement status of the earbud. The earbud accelerometer 5010 sends a signal to the control device 5020 based on a movement of the earbud and the control device 5020 sends a signal to the electronic device operation circuit 5025 which operates an electronic device as determined by a movement of the earbud.

As further shown within FIG. 50, in some embodiments, the earphones device 5000 comprises a touch sensor 5035 for sensing a touch of the earphones. The touch sensor 5035 sends a signal to the control device 5020 based on one or more touches of the earbud and the control device 5020 sends a signal to the electronic device operation circuit 5025 which operates an electronic device as determined by the one or more touches of the earbud. The touch sensor 5035 sends a signal to the control device 5020 based on one or more touches of the earbud and the control device 5020 sends a signal to the electronic device operation circuit 5025 which operates an electronic device as determined by the one or more touches.

The earbud accelerometers, such as described above, are configured to sense unique movement signatures. For example, two earbuds being attached to each other generates a unique signature telling the system to perform specific functions, such as placing an active call on hold. Additionally, in some embodiments, the earbud touch sensor is able to similarly operate audio played through the earphones.

In some embodiments, the magnetic attachments of the earbuds produce a unique signature by way of the accelerometers when they "snap" together or are removed from each other. The combination of the two accelerometers producing a similar synchronous signal will indicate where the earbud(s) is (are) being connected or disconnected. With this the device "understands" the state of use or change of state of the earbuds. The device is able to be programmed to perform functions or respond to inputs in ways that are appropriate for each possible conditional state or change of state. Different orientations of the earbuds produce a unique x/y/z axial movements when attached that are able to be used to produce alternate functions or modes.

In some embodiments, the first base unit and the second base unit are usable with an external case. FIGS. 51A-51C illustrate an external case for coupling with a first base unit, such as described above. The external case 5111 comprises a microphone hole 5112, a neckband hole 5113, an opening for a LED light 5114, a USB opening 5115, and an accessory slot 5116. In some embodiments, the accessory slot is configured to receive tweezers. However, the accessory slot 5116 is able to receive any appropriately desired accessory.

In some embodiments, the first base unit and the second base unit are usable with an external case. FIGS. 52A-52C illustrate an external case for coupling with a first base unit, such as described above. The external case 5211 comprises a microphone hole 5212, a neckband hole 5213, an opening for a LED light 5214, a USB opening 5215, and an accessory slot 5216. In some embodiments, the accessory slot is configured to receive tweezers. However, the accessory slot 5216 is able to receive any appropriately desired accessory.

FIG. 53 illustrates an external case 5411 coupled with a base unit. In some embodiments, the external case 5411 is slid onto a base unit. In some embodiments, the external case 5411 snap fits to a base unit. However, the external case 5411 is able to couple with a base unit by any appropriately desired manner. In some embodiments, the first base unit and the second base unit are able to be customized before coupling with a customized external case. In some embodiments, the external case 5411 removably couples with the first base unit and the second base unit.

FIGS. 54A-54C illustrate a set of earphones usable with the system and devices, such as described above. As shown within FIG. 54A, the earphones 5430 comprise one or more magnets 5432 for removably coupling with a magnet and/or a magnetically attractable surface of the first base unit and the second base unit, such as described above. The earphones 5430 also comprise an accelerometer 5431 for sensing a movement of the earphones 5430, such as described above. Additionally, the earphones 5430 comprise a touch sensor 5436, such as also described above. In some embodiments, the earphones 5430 comprise a flat cord. In some embodiments, the earphones 5430 comprise a USB-C connector 5434 for connecting and/or charging the earphones. In some embodiments, the earphones comprise a removable tip 5435 for fitting the earphones to a particular size.

Figure 55:
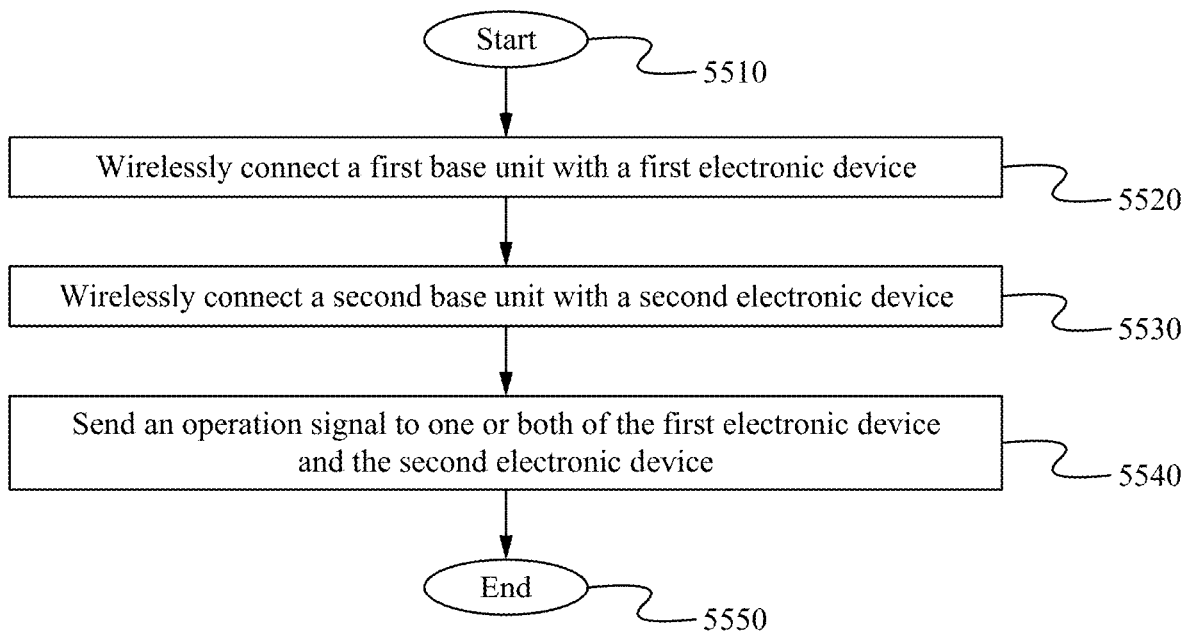
FIG. 55 illustrates a method of simultaneously operating a plurality of electronic devices in accordance with some embodiments.

FIG. 55 illustrates a method of simultaneously operating a plurality of electronic devices in accordance with some embodiments. The method begins in the step S510. In the step S520, a first base unit is wirelessly connected to a first electronic device and in the step S530 a second base unit is wirelessly connected to a second electronic device. In some embodiments, first electronic device comprises a smart phone. In some embodiments, the second electronic device comprises one of a tablet, a computer, and a watch. In some embodiments, the second base unit wireless connects to a plurality of electronic devices. In the step S540, an operation signal is sent to one or both of the first electronic device and the second electronic device.

In some embodiments, the operation signal is dependent on an interaction of an earbud with one or both of the first base unit and the second base unit. In further embodiments, the operation signal is dependent on a movement of the earbud. In some embodiments, the operation signal is dependent on a movement of one or both of the first base unit and the second base unit.

In some embodiments, the method further comprises receiving audio from one of the first electronic device at the first base unit and receiving audio from the second electronic device at the second base unit. In some embodiments, audio from the first electronic device is transmitted by an first earbud coupled to the first base unit and audio from the second electronic device is transmitted by a second earbud different than the first earbud and coupled to the second base unit. In further embodiments, audio from the first electronic device is transmitted by an external speaker of the first base unit and audio from the second electronic device is transmitted by an external speaker of the second base unit. In some embodiments, audio simultaneously is received from the first electronic device at the first base unit and from the second electronic device at the second base unit. In some of these embodiments, the level of volume from the first electronic device and the level of volume from the second electronic are adjustable. The method ends in the step S550.

Figure 56:
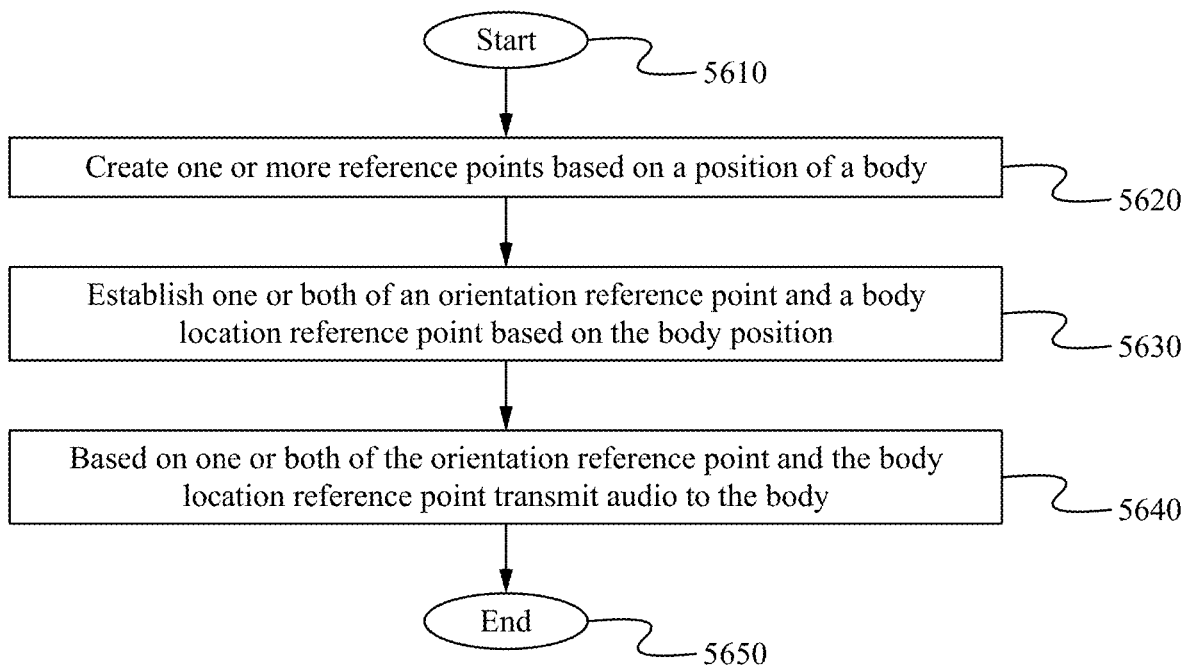
FIG. 56 illustrates a method of transmitting audio from one or more electronic devices in accordance with some embodiments.

FIG. 56 illustrates a method of transmitting audio from one or more electronic devices in accordance with some embodiments. The method begins in the step S610. In the step S620, one or more reference points are created based on a position of a body. For example, in some embodiments, four separate reference points are created using accelerometers of one or more earbuds and one more base units, such as described above. Particularly, in some embodiments, four accelerometers are used to monitor head movements relative to shoulders and torso, such as described above. In the step S630, one or both of an orientation reference point and a body location reference point are established. The orientation reference point and the body location reference point are able to be established using the one or more accelerometers, such as described above. In the step S640, based on the orientation reference point and the body location reference point, audio is transmitted to the body. In some embodiments, the audio is routed to the body through one or more earbuds. Alternatively or in conjunction, the audio is routed to the body through one or more external speakers.

Establishing the one or more reference points allows a position of the body to effectively be known to the sound source such that the manner in which the sound reaches the listener's ears can be modified to reflect how sound reaches the user as the user moves. This enables the sound to adjust to a movement of the user such that the sound is referenced relative to the user and to the user's relative body and head relationship i space.

Establishing the one or more reference points can also be used as a reference to allow the user to adjust their virtual reference to the sound sources. With music this could have the effect of making it seem as though the user were far from the performer, up close, or even give the sense that they're on stage with the performers, walking amongst them. Establishing the one or more reference points can also be used in video gaming to help simulate the user moving through the field of play relative to sounds around them. Similarly, the one or more reference points can allow the user to physically move through a space and have the relative sound adjust according to their position within a sound space.

As described above, in operation one or more base units and one or more earbuds are able to comprise one or more sensors for sensing a location of the earbuds and a location of the one or more base units. The one or more sensors in combination with one or more user controls enable earbuds such as bluetooth earbuds wirelessly coupled with a plurality of electronic devices, the capability to understand the configuration of use of the earphones. Based on a location, a use or non-use of the earphones, and a location of the one or more base units, one or more contextual responses is able to be applied for a given action.

The plurality of sensors incorporated within the base unit and the earbuds offers a unique configuration in that there are two accelerometer a base unit hanging around the neck and accelerometers in the earbuds. This means the systems and devices are able to sense head movements separate from upper body movements. In this, the balance of audio channels can be adjusted on the fly to enable a sense of sound relative to a source. This means that even when the source of a sound remains constant, the relative nature of the sound arriving to each ear is able to change relative to head and body movements. This results in a fuller and more realistic sense of sound within a space or relative position to a sound source.

Additionally, the systems and devices are able to be applied to gaming and computer gaming. With the above described sensor configuration a sound source can be programmed into games giving the user better positional awareness. This is especially advantageous when applied to 3D gaming. The system is able to adjust the sound relative to head position and torso movements, which enhances the realism of the gaming experience.

Additionally, utilizing a first base unit and a second base unit enhances the ability for a coupled electronic device to utilize language translation. Utilizing a dual base unit configuration means more people speaking have a unit that is in close proximity to their voice.

Moreover, the devices and systems are able to be customized by adding a protective case in a variety of configurations. Additionally, in some embodiments, one more upgrades are able to downloaded to enhance system and device capabilities.

In some embodiments, the one or more accelerometers of the earbuds are used to sense a moving speed of a user while the earbuds are being worn.

Figure 57:
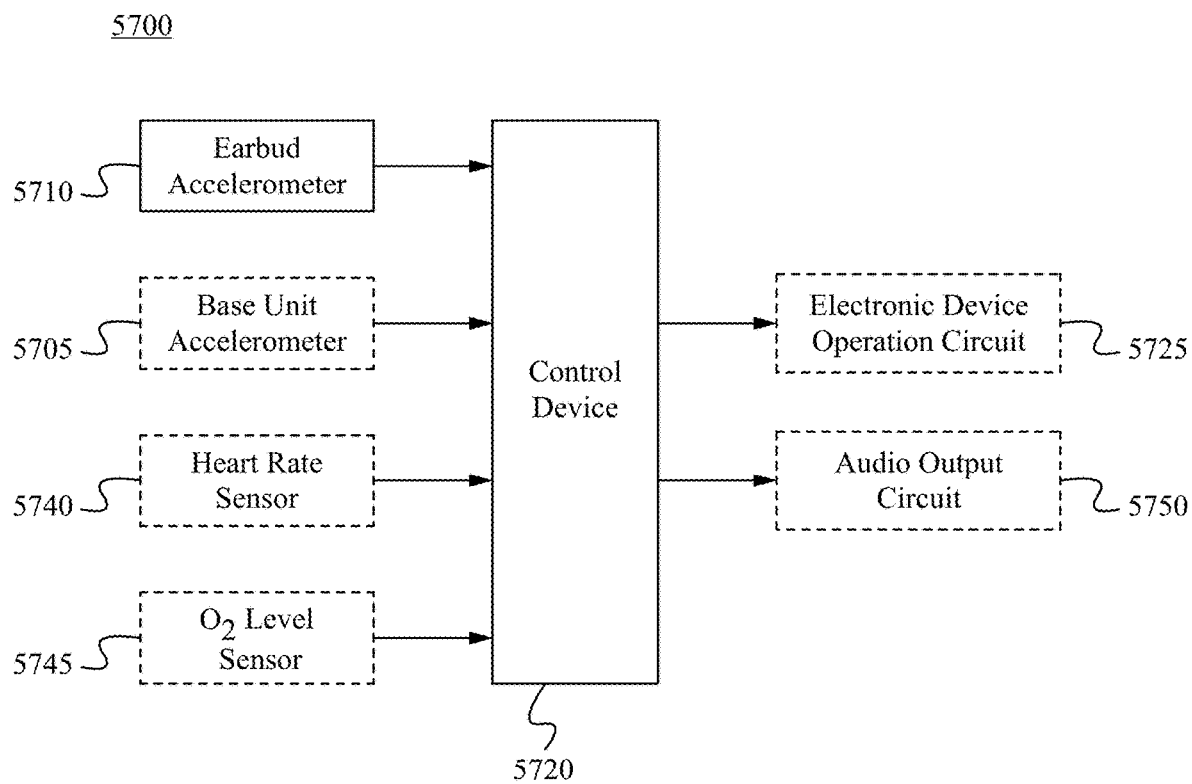
FIG. 57 illustrates a schematic view of a system for transmitting audio to a user in accordance with some embodiments.

Referring now to FIG. 57, a schematic view of a system for transmitting audio to a user is depicted therein. As shown within FIG. 57, the system 5700 comprises one or more earbud accelerometers 5710 for sensing a moving pace of a user when an earbud is being worn by the user, an audio output circuit 5750 configured to output an audio message based on the moving pace of the user, an electronic device operation circuit 5725 configured to operate a remotely connected electronic device, and a control device 5720. The control device 5720 is coupled to the one or more earbud accelerometers 5710, the electronic device operation circuit 5725, and the audio output circuit 5750. The one or more earbud accelerometers 5710 send a signal to the control device 5720 based on the moving pace of the user and the control device 5720 sends a signal to one or both of the audio output circuit 5750 to output an audio message and the electronic device operation circuit 5725 to operate an electronic device.

In some embodiments, a beat or rhythm of the audio from the electronic device substantially matches the moving pace of the user based on the moving pace of the user as sensed by the one or more accelerometers. In some embodiments, the electronic device operation circuit 5725 sends a signal to the electronic device to increase the beat or rhythm of the audio from the electronic device when the moving pace of the user increases. Additionally, in some embodiments, the electronic device operation circuit 5725 sends a signal to the electronic device to decrease the beat or rhythm of the audio from the electronic device when the moving pace of the user decreases. Particularly, the electronic device operation circuit 5725 is able to send a signal to adjust the beat or rhythm of the audio from the electronic device remotely connected to the one or more earbuds. The system 5700 is able to adjust the rate of audio delivered to the user and match the running and/or walking pace of the user.

Similarly, in some embodiments, an audio message from the audio output circuit 5750 is able to comprise the moving pace of the user. In some embodiments, the audio message comprises an alert that the user has slowed from a previous moving pace. Alternatively, in some embodiments, the audio message comprises an alert that the user has sped up from a previous moving pace. Particularly, the one or more earbud accelerometers 5710 are able to continuously send signals to the control device 5720 based on the moving speed of the user and based on the moving speed of the user, the audio output circuit 5750 sends an audio message to the user.

In some embodiments, the system 5700 is able to compare the pace of the user as determined by the one or more earbud accelerometers 5710 to a previous pace. For example, in some embodiments, an average pace of the user during a predetermined interval is stored on a memory module of the electronic device. Alternatively, or in conjunction, the average pace of the user during the predetermined interval is stored within a storage device coupled to the electronic device. In some embodiments, the average pace of the user during the predetermined interval is compared to a previously stored average pace and the audio output circuit 5750 outputs an audio message.

In further embodiments, the system 5700 comprises one or more base unit accelerometers 5705 for sensing a moving speed of a base unit worn by the user, such as described above. The one or more base unit accelerometers 5705 send a signal to the control device 5720 based on the moving speed of the user and the control device 5720 sends a signal to one or both of the audio output circuit 5750 to output an audio message and the electronic device operation circuit 5725 to operate an electronic device.

As further shown within FIG. 57, in some embodiments, the system 5700 comprises a heart rate sensor 5740 for sensing a heart rate of the user and an oxygen level sensor 5745 for sensing an oxygen level of the user. The control device 5720 is coupled to the heart rate sensor 5740 and the oxygen level sensor 5745. The heart rate sensor 5740 sends a signal to the control device based on the heart rate of the user and the oxygen level sensor 5745 send a signal to the control device 5720 based on the oxygen level of the user and the control device 5720 sends a signal to one or both of the audio output circuit 5750 to output an audio message and the electronic device operation circuit 5725 to operate an electronic device. For example, in some embodiments, the heart rate sensor 5740 is able to send a signal to the control device 5720 that the user's heart rate is above a certain level and the control device 5720 sends a signal to the audio operation circuit 5750 which sends an alert to the user. Alternatively, in some embodiments, the heart rate sensor 5740 is able to send a signal to the control device 5720 that the user's heart rate has fallen below a certain level and the control device 5720 sends a signal to the audio operation circuit 5750 which sends an alert to the user. Similarly, in some embodiments, the oxygen level sensor 5745 is able to send a signal to the control device 5720 that the user's oxygen level is above a certain level and the control device 5720 sends a signal to the audio operation circuit 5750 which sends an alert to the user. Alternatively, in some embodiments, the oxygen level sensor 5745 is able to send a signal to the control device 5720 that the user's oxygen level has fallen below a certain level and the control device 5720 sends a signal to the audio operation circuit 5750 which sends an alert to the user.

Figures 58A, 58B:
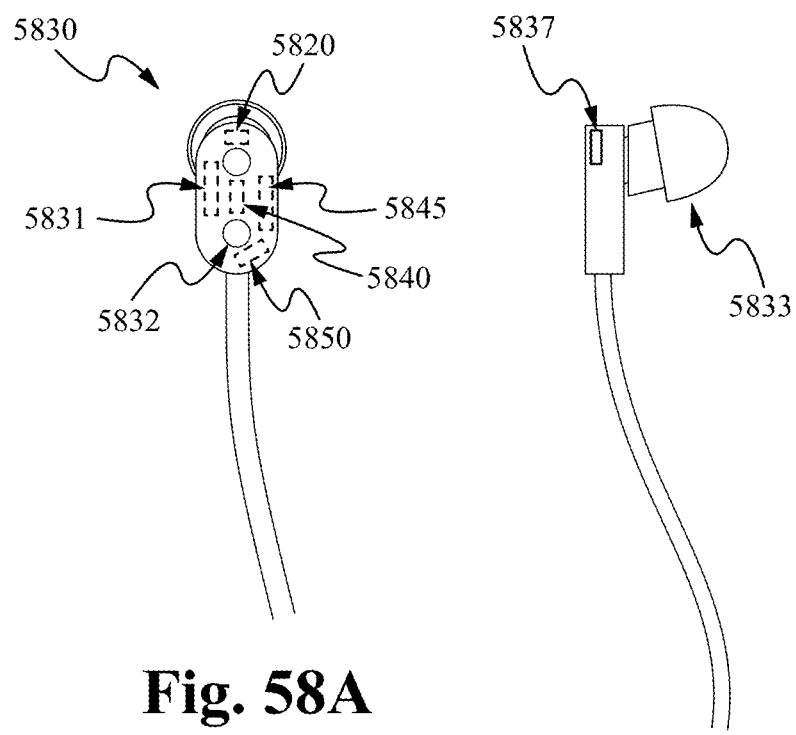
FIGS. 58A and 58B illustrate an earbud in accordance with some embodiments.

FIGS. 58A and 58B illustrate an earbud in accordance with some embodiments. As shown within FIGS. 58A and 58B, the earbud 5830 an earbud accelerometer 5831 for sensing a moving pace of a user when the earbud is being worn by the user. In some embodiments, the earbud comprises a control device 5820, such as described above. The control device 5820 receives a signal from the earbud the earbud accelerometer 5831 and sends a signal to an electronic device operation circuit which operates a remotely connected electronic device based on the signal from the earbud accelerometer 5831. In some embodiments, the earbud 5830 comprises one or more magnets 5832 for removably coupling with a base unit, such as described above.

In some embodiments, a beat or rhythm of the audio from the electronic device substantially matches the moving pace of the user based on the moving pace of the user as sensed by the one or more accelerometers. In some embodiments, the electronic device operation circuit sends a signal to the electronic device to increase the beat or rhythm of the audio from the electronic device when the moving pace of the user increases. Additionally, in some embodiments, the electronic device operation circuit sends a signal to the electronic device to decrease the beat of the audio from the electronic device when the moving pace of the user decreases. Particularly, the electronic device operation circuit is able to send a signal to adjust the beat or rhythm of the audio from the electronic device remotely connected to the one or more earbuds.

In some embodiments, the earbud 5830 comprises an audio output circuit 5850, such as described above. As described above, the control device 5820 sends a signal to the audio output circuit 5850 based on a signal from the earbud accelerometer 5831 and the audio output circuit 5850 outputs an audio message. An audio message from an audio output circuit 5850 is able to comprise the moving pace of the user. In some embodiments, the audio message comprises an alert that the user has slowed from a previous moving pace. Alternatively, in some embodiments, the audio message comprises an alert that the user has sped up from a previous moving pace. Particularly, the one or more earbud accelerometers 5831 is able to continuously send signals to the control device 5820 based on the moving speed of the user and based on the moving speed of the user, the audio output circuit 5850 sends an audio message to the user.

As shown within FIGS. 58A and 58B, in some embodiments, the earbud 5830 comprises a heart rate sensor 5840 for sensing a heart rate of the user and an oxygen level sensor 5845 for sensing an oxygen level of the user. The control device 5820 is coupled to the heart rate sensor 5840 and the oxygen level sensor 5845. The heart rate sensor 5840 sends a signal to the control device based on the heart rate of the user and the oxygen level sensor 5845 send a signal to the control device 5820 based on the oxygen level of the user and the control device 5820 sends a signal to one or both of the audio output circuit 5850 to output an audio message and the electronic device operation circuit 5825 to operate an electronic device. For example, in some embodiments, the heart rate sensor 5840 is able to send a signal to the control device 5820 that the user's heart rate is above a certain level and the control device 5820 sends a signal to the audio operation circuit 5850 which sends an alert to the user. Alternatively, in some embodiments, the heart rate sensor 5840 is able to send a signal to the control device 5820 that the user's heart rate has fallen below a certain level and the control device 5820 sends a signal to the audio operation circuit 5850 which sends an alert to the user. Similarly, in some embodiments, the oxygen level sensor 5845 is able to send a signal to the control device 5820 that the user's oxygen level is above a certain level and the control device 5820 sends a signal to the audio operation circuit 5850 which sends an alert to the user. Alternatively, in some embodiments, the oxygen level sensor 5845 is able to send a signal to the control device 5820 that the user's oxygen level has fallen below a certain level and the control device 5820 sends a signal to the audio operation circuit 5850 which sends an alert to the user.

As further shown within FIGS. 58A and 58B, in some embodiments, the earbud 5830 comprises a memory module 5837 and/or a replaceable tip 5833.

Figure 59:
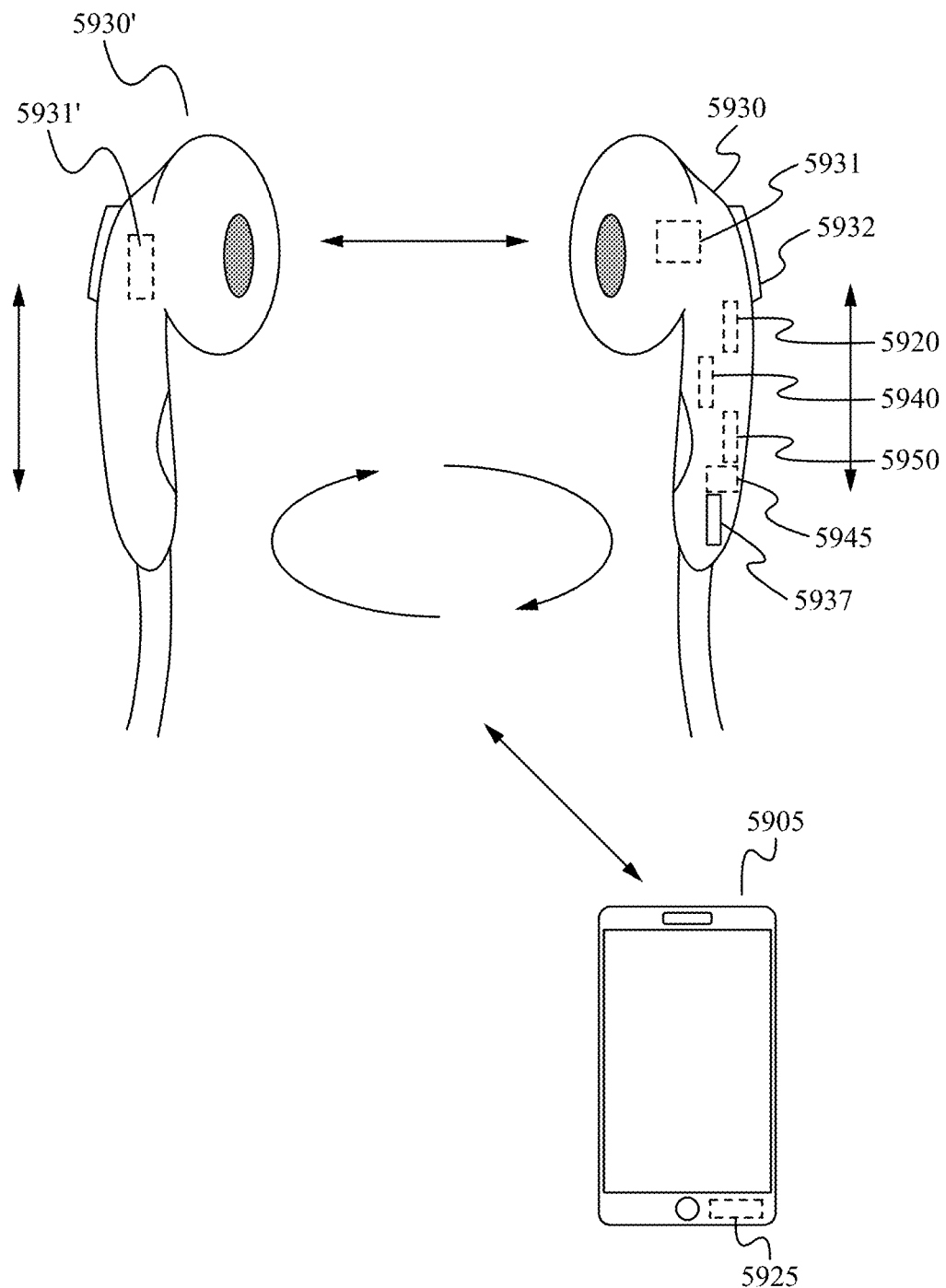
FIG. 59 illustrates a set of earphones in connection with an electronic device in accordance with some embodiments.

FIG. 59 illustrates a set of earphones in connection with an electronic device, such as described above. As described above, based on a movement of the earbud 5930 as sensed by the accelerometer 5931 and movement of the earbud 5930' as sensed by one or more accelerometer 5931', a signal is sent to an electronic device activation circuit 5925 which operates the electronic device. As described above, in some embodiments, the earbud 5930 comprises an audio output circuit 5850, a heart rate sensor 5940 and an oxygen level sensor 5945. In some embodiments, the earbud 5930 comprises a memory module 5937.

In some embodiments, the control device 5920 and the earbuds communicate with a program stored within a memory of the electronic device 5905. In some embodiments, a user is able to enter information into the program such that the program is able communicate with the user. For example, in some embodiments, the program loaded onto the electronic device 5905 is able to pace a user's run and workout. The pace of the music is able to match the pace of the user, such as described above. In some embodiments, a user's run and/or workout is able to be stored. For example, in some embodiments, the pace of the user as determined by the one or more earbud accelerometers 5931 is compared to a previous pace. For example, in some embodiments, such as described above, the average pace of the user during a predetermined interval is stored on a memory module of the electronic device. Alternatively, or in conjunction, the average pace of the user during the predetermined interval is stored within a storage device coupled to the electronic device. The average pace of the user during the predetermined interval is able to be compared to the previously stored average pace and the audio output circuit 5950 is able to output an audio message based on a comparison with the user's current pace and/or time.

Figure 60:
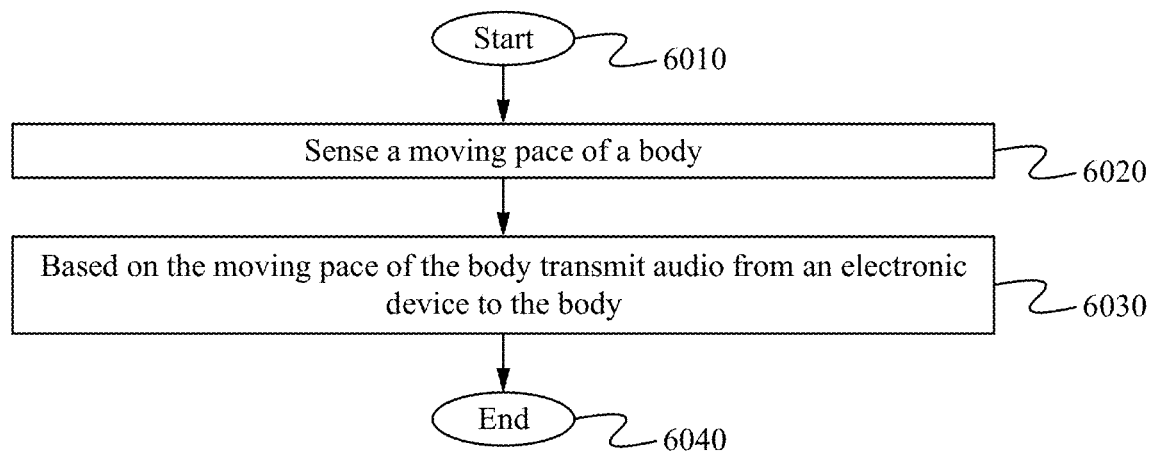
FIG. 60 illustrates a method of transmitting audio to a user in accordance with some embodiments.

FIG. 60 illustrates a method of transmitting audio to a user. The method begins in the step 6010. In the step 6020 a moving pace of a body is sensed. In some embodiments, the moving pace of the body is sensed using one or more earbud accelerometers, such as described above. In the step 6030, based on the moving pace of the body, audio is transmitted from an electronic device to the body. In some embodiments, a beat or rhythm of the audio from the electronic device substantially matches the moving pace of the body. In some embodiments, the beat or rhythm of the audio from the electronic device is increased when the moving pace of the body increases. Alternatively, the beat or rhythm of the audio from the electronic device is decreased when the moving pace of the body decreases. In some embodiments, the method further comprises sending an audio message to the body. In some embodiments, the audio message is based on the moving pace of the body. The method ends in the step 6040.

In some embodiments, an earbud is able to comprise one or more external connectors for removably coupling the earbud with an additional article. The earbud is additionally able to comprise a magnet for removably coupling with an additional earbud. In some embodiments, the one or more earbuds are configured to removably couple with a base unit. Based on a coupling and decoupling of the one or more earbuds with the base unit, a signal is sent to control a remotely located electronic device.

Referring now to FIGS. 61A and 61B, an earbud is depicted therein. The earbud 6100 comprises an earbud body 6130, one or more external connectors 6131 for removably coupling the earbud 6100 with an additional article and a replaceable tip 6133. Although, only one earbud 6100 is shown within FIGS. 61A and 61B, as would be apparent to someone of ordinary skill in the art, the earbud 6100 is usable with an additional earbud 6100 so that a user can use an earbud 6100 in each ear. In some embodiments, the earbud 6100 is configured to removably couple with an additional article such as a drawstring 6140 of a jacket or a hooded sweatshirt through the one or more external connectors 6131. However, the earbud 6100 is able to removably couple with any appropriately desired object. For example, in some embodiments the earbud 6100 is configured to removably couple with a belt, a necklace, a shirt collar or other item of doting. In some embodiments, the one or more external connectors 6131 comprise one or more molded loops. Alternatively, in some embodiments, the one or more connectors 6131 comprise one or more clips.

As shown within FIG. 61B, the earbud 6100 is coupled to a drawstring 6140. As described above, the earbud 6100 is able to couple with the drawstring 6140 through the one or more external connectors 6131. For example, in some embodiments the one or more external connectors 6131 wrap around and/or clip to the drawstring 6140 so that the earbud 6100 is securely held by the drawstring 6140. In some embodiments, the earbud 6100 is usable while it is coupled to the drawstring 6140. In this manner the user is able to place the earbud 6110 in their ear to listen to audio through the earbud 6100 and then let the earbud 6100 freely hang when not in use.

As further shown within FIG. 61B, in some embodiments, the earbud 6100 comprises one or more magnets 6132. In some embodiments, the earbud 6100 is able to be attached to one or more magnets of an opposing earbud. As described above, in some embodiments the coupling and/or the decoupling of the one or more magnets with each other is able to control a remotely located electronic device. Particularly, the earbud 6100 is able to receive transmitted audio from a remotely located electronic device. As shown within FIGS. 61A and 61B, in some embodiments, the earbud 6100 comprises a wireless earbud 6100.

In some embodiments, the earbud is configured to couple with an external power supply. FIGS. 62A and 62B illustrate an earbud 6200, such as described above. The earbud 6200 comprises an earbud body 6230, one or more external connectors for removably coupling the earbud 6200 with an additional article and a replaceable tip 6233. As shown within Figured 62A and 62B, in some embodiments, the earbud 6200 comprises a power port 6235 and are able to couple with a power connection 6241. As shown within Figured 62A and 62B, in some embodiments the power cord is a component of the drawstring 6240.

Figure 63:
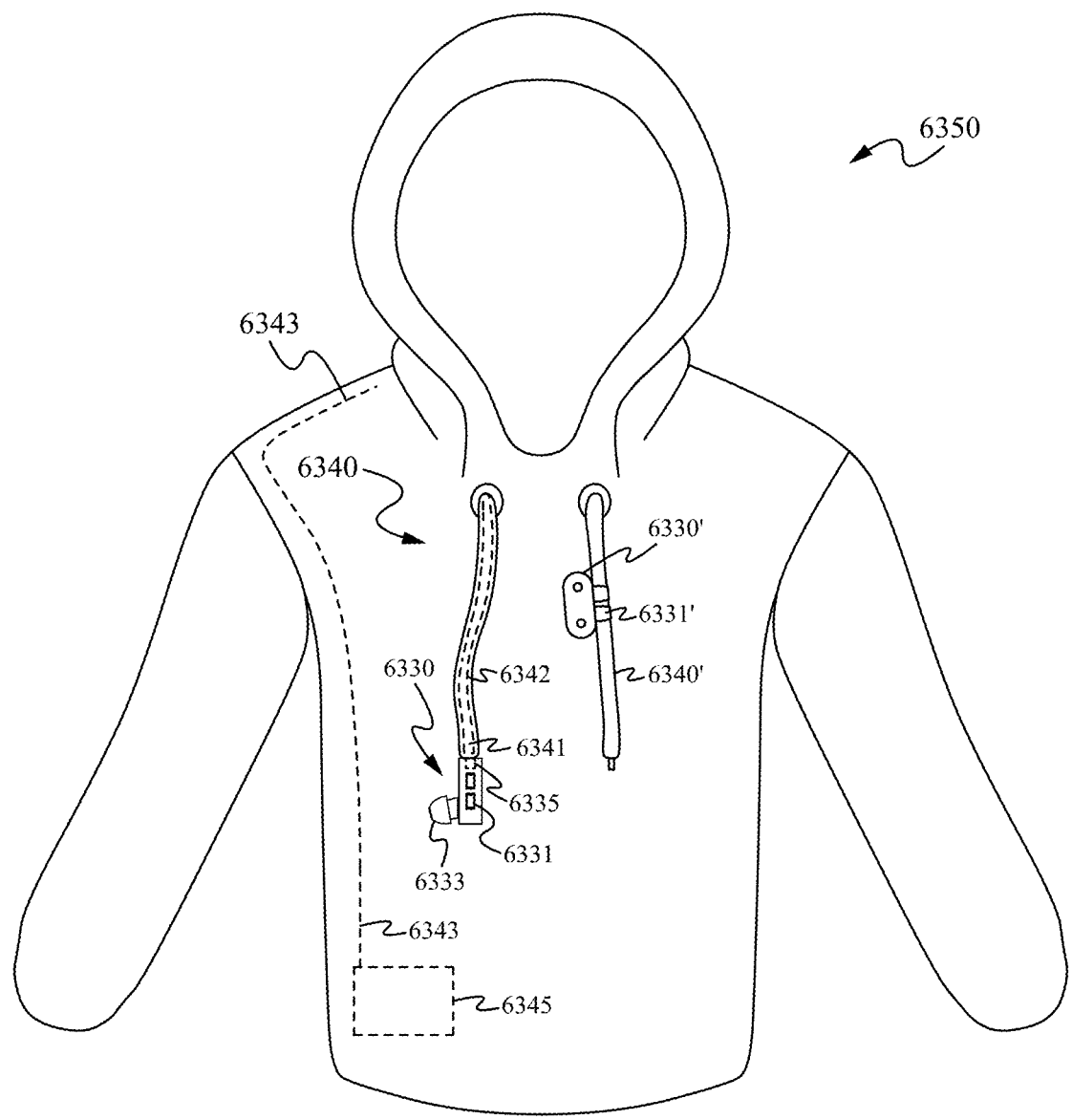
FIG. 63 illustrates an earphones holding system in accordance with some embodiments.

FIG. 63 illustrates an earbud holding system in accordance with further embodiments. As shown within FIG. 63, an earbud holding system 6300 comprises a set of earphones comprising a first earbud 6330 and a second earbud 6330' each comprising one or more connectors 6331 for removably coupling the earphones with an additional article 6350 and a power supply 6345 embedded within the additional article 6350. In some embodiments, the first earbud 6330 and the second earbud 6330' also each comprise an earbud body 6330 and 6330' and a replaceable tip 6233 and 6233'. As shown within FIG. 63, the additional article 6350 comprises a sweatshirt. However, as described above, and as will be apparent to someone of ordinary skill in the art, the set of earphones is able to removably couple with any appropriately desired additional object.

The first earbud 6330 is coupled to drawstring 6340 of the sweatshirt by coupling with a power connection 6341. As shown within FIG. 63, in some embodiments, the power connection 6341 is a component of the drawstring 6340. Particularly, the drawstring 6340 is able to comprises circuitry 6342 embedded within the drawstring 6340. The circuitry 6342 of the drawstring 6340 is couples to the power supply 6345 through circuitry 6343 of the sweatshirt. In some embodiments, the circuitry of the sweatshirt 6343 is embedded within the material of the sweatshirt. As described above, in some embodiments, the power supply 6345 is able to be embedded within the sweatshirt. In this manner, the set of earphones is able to charged while a user is wearing the sweatshirt.

As further shown within FIG. 63, the second earbud 6330' is coupled to a drawstring 6140'. As described above, the earbud 6330' is able to couple with the drawstring 6140' through the one or more external connectors 6131'. For example, in some embodiments the one or more external connectors 6131' wrap around and/or clip to the drawstring 6140' so that the earbud 6330' is securely held by the drawstring 6140.

In some embodiments, the first earbud 6330 is usable while coupled to the drawstring 6340 and the second earbud 6330' is usable while coupled to the drawstring 6340. As described above, in this manner the user is able to place the first earbud 6330 and the second earbud 6330' in their ears to listen to audio and then let the earbuds freely hang when not in use.

In some embodiments, the first earbud 6330 and the second earbud 6330' comprise one or more magnets. In some embodiments, the first earbud 6330 and the second earbud 6330' are able to be removably coupled together. As described above, in some embodiments the coupling and/or the decoupling of the one or more magnets with each other is able to control a remotely located electronic device. Particularly, the earbuds are able to receive transmitted audio from a remotely located electronic device. In some embodiments, the set of earphones comprise wireless earphones and are able to wirelessly communicate with a remotely located electronic device.

Figure 64:
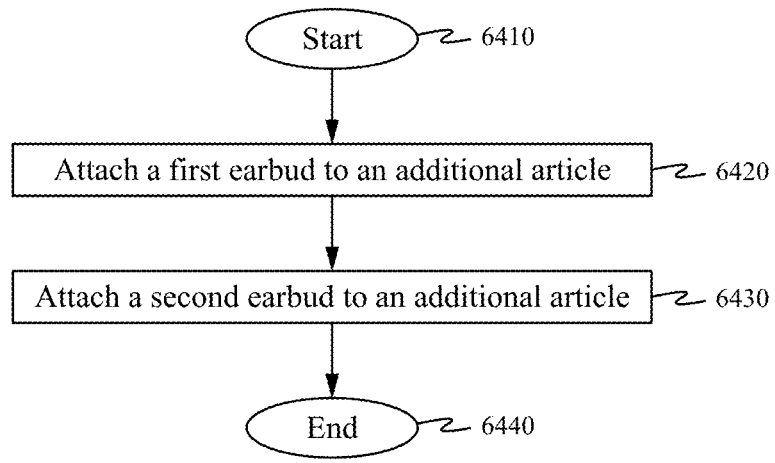
FIG. 64 illustrates a method of securing a set of earphones in accordance with some embodiments.

FIG. 64 illustrates a method of securing a set of earphones. The method begins in the step 6410. In the step 6420, a first earbud is attached to an additional article and in the step 6430 a second earbud is attached to the additional article. The first earbud and the second earbud are attached to the additional article using one or more external connectors of the first earbud and the second earbud. In some embodiments, the one or more external connectors comprise a clip. Alternatively, in some embodiments, the one or more external connectors comprise one or more molded loops. In some embodiments, the additional article comprises an item of clothing. Particularly, the additional article is able to comprise any appropriately desired item. In some embodiments, the set of earphones is usable when coupled to the additional article. In some embodiments, the set of earphones comprise one or more magnets. In some embodiments, the set of earphones comprise wireless earphones. In further embodiments, the method comprises coupling the set of earphones with an external power supply. The method ends ins the step 6440.

Figure 65:
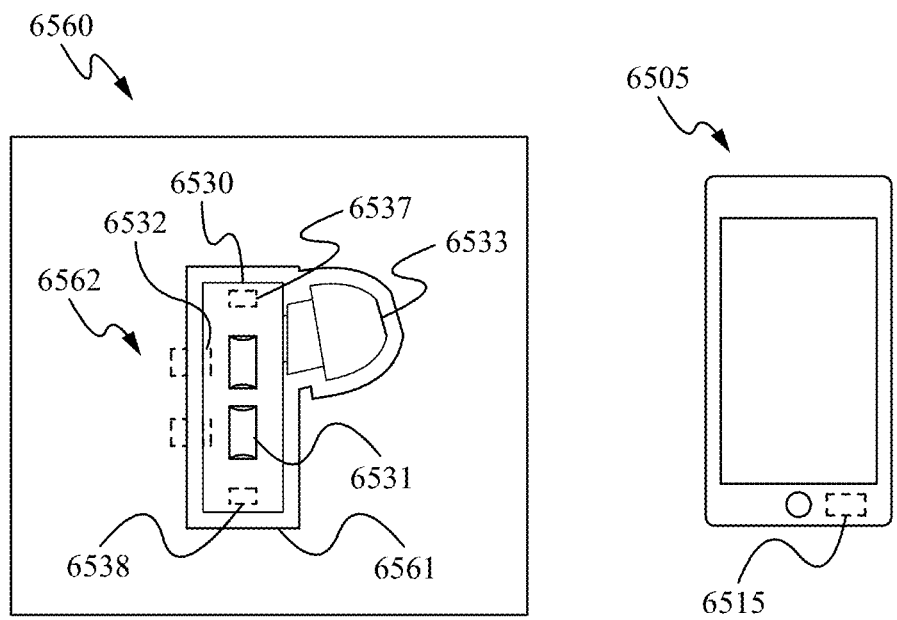
FIG. 65 illustrates a system for securing one or more wireless earbuds in accordance with some embodiments.

FIG. 65 illustrates a system for securing one or more wireless earbuds in accordance with further embodiments. As shown within FIG. 65, one or more earbuds are configured to removably couple with a base unit. Detaching and re-attaching the one or more earbuds from the base unit sends one or more control commands to a remotely located electronic device. The system 6500 comprises one or more wireless earbuds 6530 removably coupled with a base unit 6560. The one or more earbuds 6530 comprise one or more earbud magnets 6532, an earbud engagement engagement detector 6537 and an electronic device controller 6538. In some embodiments, the one or more earbuds 6530 comprise one or more external connectors 6531 for removably coupling with an additional article and a removable tip 6533, such as described above. The one or more earbuds 6530 are configured to removably couple with the base unit 6560. In some embodiments, the one or more magnets 6531 of the earbuds 6530 securely and removably couple with one or more magnets 6562 of the base unit 6560. In some embodiments, the one or more earbuds 6530 fit within a form fitting opening 6561 of the base unit 6560.

The earbud engagement detector 6537 is configured to detect a coupling of the one or more earbud magnets 6531 with the one or more magnets 6562 of the base unit. Based on a coupling and/or a decoupling of the one or more earbud magnets 6531 with the one or more magnets 6562 of the base unit, the earbud engagement detector 6537 sends a signal to the electronic device controller 6538. The electronic device controller 6538 processes the signal from the earbud engagement detector 6537 and sends a signal to the electronic device activation circuit 6515 based on the signal from the earbud engagement detector 6537 and the electronic device activation circuit 6515 operates an electronic device 6505 based on the signal received from the electronic device controller 6538. In some embodiments, the electronic device 6505 comprises a phone, a tablet, or a watch. However, the earphones can be configured to control any appropriately desired electronic device. For example, in some embodiments, the electronic device controller 6505 is configured to send a signal to a stereo or television set and/or an audio receiver.

The electronic device controller 6538 is coupled to receive and send activation and deactivation signals when the one or more earbuds 6530 are decoupled from and coupled to the one or more magnets 6562 of the base unit 6560. For example, in some embodiments, the electronic device controller 6538 sends a signal to activate/de-activate the electronic device, turn up or turn down the volume, change the playing media, and/or change the program being operated by the electronic device 6505. Particularly, the electronic device controller 6538 is able to send any appropriate desired control signal to the electronic device 6505, such as described above.

For example, in some embodiments, the earbud engagement detector 6537 sends a signal to the electronic device controller 6538 that the one or more earbuds 6530 have been decoupled from the one or more magnets 6562 of the base unit. In response, the electronic device controller 6538 processes the signal from the earbud engagement detector 6537 and sends a signal to the electronic device activation circuit 6515 to wirelessly connect to the earbuds 6530. Alternatively, or in conjunction, in some embodiments, the electronic device controller 6538 processes the signal from the earbud engagement detector 6537 and sends a signal to the electronic device activation circuit 6515 to transmit audio to the earbuds 6530. In some embodiments, the electronic device controller 6538 sends a signal to the electronic device activation circuit 6515 to answer a telephone call. Alternatively, in some embodiments, the electronic device controller 6538 sends a signal to the electronic device activation circuit 6515 to transfer audio from one or more speakers of the electronic device 6505 to the one or more earbuds 6530.

In some embodiments, the base unit 6560 is configured to charge the one or more wireless earbuds 6530 when the one or more earbuds 6530 are coupled with the base unit 6560. In some embodiments, the one or more earbuds 6530 are configured to power on when the one or more earbuds 6530 are decoupled from the base unit 6560. In some embodiments, the base unit 6560 comprises a case for the one or more earbuds 6530.

In some embodiments, the signal sent by the electronic device controller 6538 to the electronic device activation circuit 6515 and the signal sent by the electronic device activation circuit 6515 to the electronic device 6505 comprise one or more of infrared, infrared laser, radio frequency, wireless, WiFi, and Bluetooth®. However, the signal sent by the electronic device controller 6538 and the electronic device activation circuit 6515 are able to comprise any wireless signal as known in the art. Alternatively, in some embodiments, the signal sent by the electronic device controller 6538 and the electronic device activation circuit 6515 comprise a wired signal.

Figure 66:
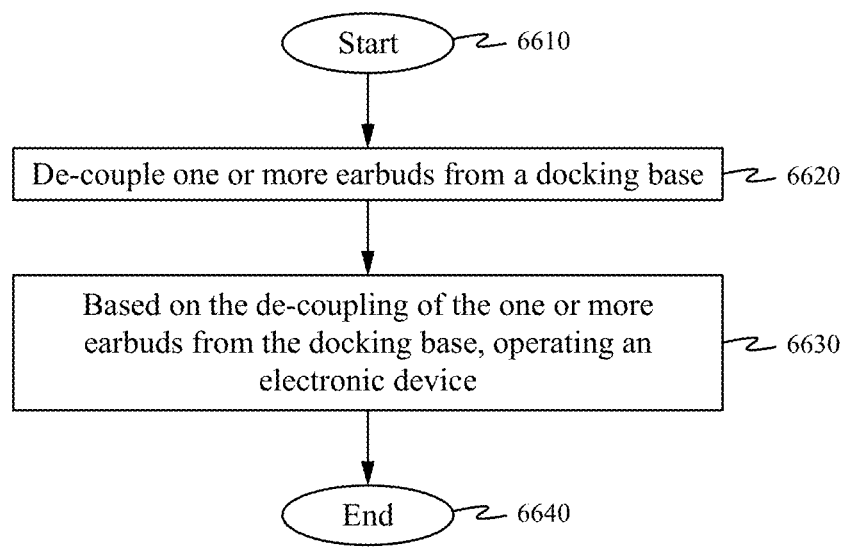
FIG. 66 illustrates a method of securing one or more wireless earbuds in accordance with some embodiments.

FIG. 66 illustrates a method of securing one or more wireless earbuds in accordance with some embodiments. The method begins in the step 6610. In the step 6620 one or more earbuds are decoupled from a docking base. In some embodiments, the base unit comprises a magnet for removably coupling with an earbud magnet to secure the one or more wireless earbuds. Then, in the step 6630, based on the decoupling of the one or more earbuds from the base unit, an electronic device is operated. In some embodiments, the base unit is configured to charge the one or more wireless earbuds when coupled with the docking base. The base unit is able to comprise a form fitting opening for receiving the one or more earbuds. In some embodiments, the base unit comprises a case for the one or more earbuds. In some embodiments, the one or more earbuds are configured to power on when decoupled from the base unit. In some embodiments, the one or more earbuds are configured to automatically connect to the electronic device when decoupled from the base unit. In some embodiments, the electronic device controller sends a signal to the electronic device to answer a telephone call when the one or more earbuds are decoupled. In some embodiments, the electronic device controller sends a signal to stop receiving audio from the electronic device when the one or more earbuds are recoupled with the base unit. The method ends in the step 6640.

In operation, one or more connectors embedded with an earbud and/or a set of earphones are used to removably attach the earbud and/or a set of earphones with an additional article. Based on an attachment with the additional article a wireless earbud and/or a set of earphones is able to placed in a secure location when not being used. Additionally, the earbud and/or a set of earphones are able to comprise magnets for removably coupling with each other. The earbuds and/or the set of earphones are configured to removably couple with a base unit. Based on a coupling and decoupling of the one or more earbuds with the base unit, a signal is sent to control a remotely located electronic device. Accordingly, the invention described herein has many advantages.

The presently claimed invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made to the embodiments chosen for illustration without departing from the spirit and scope of the invention.

What is claimed is:

1. A system for securing one or more wireless earbuds, the system comprising:
    a. one or more wireless earbuds, each earbud comprising:
        i. an earbud engagement detector; and
        ii. an electronic device controller; and
    b. a base unit comprising a docking base for removably coupling with the one or more wireless earbuds, wherein the earbud engagement detector is configured to detect a coupling of the earbud with the docking base magnet and the electronic device controller is configured to operate an electronic device based on the coupling and the decoupling of the earbud and the docking base, wherein playing audio is able to be transferred from the electronic device to the one or more wireless earbuds when the one or more wireless earbuds are decoupled from the base unit.

2. The system of claim 1, wherein the base unit is configured to charge the one or more wireless earbuds when coupled with the docking base.

3. The system of claim 1, wherein the docking base comprises a form fitting opening for receiving the one or more earbuds.

4. The system of claim 1, wherein the docking base comprises a case for the one or more earbuds.

5. The system of claim 1, wherein the one or more earbuds are configured to power on when decoupled from the base unit.

6. The system of claim 1, wherein the one or more earbuds are configured to automatically connect to the electronic device when decoupled from the docking base.

7. The system of claim 1, wherein the electronic device controller sends a signal to the electronic device to answer a telephone call when the one or more earbuds are decoupled from the docking base.

8. The system of claim 1, wherein the electronic device controller sends a signal to transfer audio from one or more speakers of the electronic device to the one or more earbuds when the one or more earbuds are decoupled from the docking base.

9. A method of securing one or more wireless earbuds, the method comprising:
    a. decoupling one or more earbuds from a docking base, wherein the base unit comprises a form fitting opening for removably coupling with an earbud magnet to secure the one or more wireless earbuds; and
    b. based on the decoupling of the one or more earbuds from the base unit, operating an electronic device, wherein playing audio is able to be transferred from the electronic device to the one or more wireless earbuds when the one or more wireless earbuds are decoupled from the base unit.

10. The method of claim 9, wherein the electronic device controller sends a signal to the electronic device to answer a telephone call when the one or more earbuds are decoupled.

11. The method of claim 9, wherein the electronic device controller sends a signal to stop receiving audio from the electronic device when the one or more earbuds are recoupled with the base unit.

12. A system for securing one or more wireless earbuds, the system comprising:
    a. one or more wireless earbuds, each earbud comprising:
        i. a magnetic surface;
        ii. an earbud engagement detector; and
        iii. an electronic device controller; and
    b. a base unit comprising a docking base for removably coupling with the one or more wireless earbuds, wherein the earbud engagement detector is configured to detect a coupling of the earbud with the docking base and the electronic device controller is configured to operate an electronic device based on the coupling and the decoupling of the earbud and the docking base, wherein playing audio is able to be transferred from the electronic device to the one or more wireless earbuds when the one or more wireless earbuds are decoupled from the base unit.

13. The system of claim 12, wherein the base unit is configured to charge the one or more wireless earbuds when coupled with the docking base.

14. The system of claim 12, wherein the base unit comprises a form fitting opening for receiving the one or more earbuds.

15. The system of claim 12, wherein the base unit comprises a case for the one or more earbuds.

16. The system of claim 15, wherein upon opening of the case, the one or more earbuds are able to wirelessly connect with the electronic device.

17. The system of claim 12, wherein the one or more earbuds are configured to power on when decoupled from the base unit.

18. The system of claim 12, wherein the one or more earbuds are configured to automatically connect to the electronic device when decoupled from the base unit.

19. The system of claim 12, wherein the electronic device controller sends a signal to the electronic device to answer a telephone call when the one or more earbuds are decoupled from the base unit.

20. The system of claim 12, wherein the electronic device controller sends a signal to transfer audio from one or more speakers of the electronic device to the one or more earbuds when the one or more earbuds are decoupled from the base unit.

21. A system for securing one or more wireless earbuds, the system comprising:
  a. one or more wireless earbuds, each earbud comprising:
    i. an earbud engagement detector; and
    ii. an electronic device controller; and
  b. a base unit comprising a docking base, wherein the earbud engagement detector is configured to detect a coupling of the earbud with the docking base and the electronic device controller is configured to operate an electronic device based on the coupling and the decoupling of the earbud and the docking base, wherein playing audio is able to be transferred from the electronic device to the one or more wireless earbuds when the one or more wireless earbuds are decoupled from the base unit.

22. The system of claim 21, wherein the base unit is configured to charge the one or more wireless earbuds when coupled with the docking base.

23. The system of claim 21, wherein the base unit comprises a form fitting opening for receiving the one or more earbuds.

24. The system of claim 21, wherein the base unit comprises a case for the one or more earbuds.

25. The system of claim 24, wherein upon opening of the case, the one or more earbuds are able to wirelessly connect with the electronic device.

26. The system of claim 21, wherein the one or more earbuds are configured to power on when decoupled from the base unit.

27. The system of claim 21, wherein the one or more earbuds are configured to automatically connect to the electronic device when decoupled from the base unit.

28. The system of claim 21, wherein the electronic device controller sends a signal to the electronic device to answer a telephone call when the one or more earbuds are decoupled from the base unit.

29. The system of claim 21, wherein the electronic device controller sends a signal to transfer audio from one or more speakers of the electronic device to the one or more earbuds when the one or more earbuds are decoupled from the base unit.

30. The system of claim 21, wherein the earbud engagement detector detects the coupling of the earbud with the base unit by detecting an engagement or disengagement of a magnet.

* * * * *